(12) United States Patent
Yoshikawa et al.

(10) Patent No.: US 12,517,581 B2
(45) Date of Patent: Jan. 6, 2026

(54) INCLINATION DETECTOR, LINE-OF-SIGHT DETECTION DEVICE, RETINAL PROJECTION DISPLAY DEVICE, HEAD-MOUNTED DISPLAY DEVICE, OPTOMETRIC DEVICE, VIRTUAL-REALITY DISPLAY APPARATUS, USER-CONDITION ESTIMATION APPARATUS, DRIVER-ASSISTANCE SYSTEM, METHOD OF DETECTING DEGREE OF INCLINATION OF THREE-DIMENSIONAL OBJECT, AND METHOD OF DETECTING LINE-OF-SIGHT

(71) Applicants: Masato Yoshikawa, Tokyo (JP); Suguru Sangu, Kanagawa (JP); Saori Yoshida, Tokyo (JP)

(72) Inventors: Masato Yoshikawa, Tokyo (JP); Suguru Sangu, Kanagawa (JP); Saori Yoshida, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/708,697

(22) PCT Filed: Dec. 8, 2022

(86) PCT No.: PCT/IB2022/061949
§ 371 (c)(1),
(2) Date: May 9, 2024

(87) PCT Pub. No.: WO2023/119040
PCT Pub. Date: Jun. 29, 2023

(65) Prior Publication Data
US 2025/0013297 A1    Jan. 9, 2025

(30) Foreign Application Priority Data

Dec. 23, 2021 (JP) .................................. 2021-209644
Oct. 24, 2022 (JP) .................................. 2022-170184

(51) Int. Cl.
*G06F 3/01* (2006.01)
(52) U.S. Cl.
CPC .................................. *G06F 3/013* (2013.01)
(58) Field of Classification Search
CPC ......................................................... G06F 3/013
See application file for complete search history.

(56) References Cited

U.S. PATENT DOCUMENTS 10,213,105 B2    2/2019   Sarkar
2006/0262398 A1  11/2006  Sangu et al.
(Continued)

FOREIGN PATENT DOCUMENTS

CN    113227878 A  *  8/2021  ............. G06F 3/013
JP    2020-087200 A    6/2020

OTHER PUBLICATIONS

International Search Report and Written Opinion issued on Mar. 15, 2023 in PCT/IB2022/061949 filed on Dec. 8, 2022, 13 pages.
(Continued)

*Primary Examiner* — Matthew A Eason
*Assistant Examiner* — Scott D Au
(74) *Attorney, Agent, or Firm* — XSENSUS LLP

(57) ABSTRACT

An inclination detector includes: multiple light emitters configured to emit multiple beams to an object: a photosensor having a light-receiving surface; and an output unit. The photosensor is configured to receive the multiple beams reflected from the object on the light-receiving surface and output an electrical signal based on light intensity of the multiple beams received on the light-receiving surface. The output unit configured to output a result of detection of a degree of inclination of the object based on the electrical signal output from the photosensor. The photosensor is disposed at a position at which the light intensity of the multiple beams that are emitted from the multiple light
(Continued)

emitters, reflected at the object, and received at the photosensor changes according to the degree of inclination of the object.

21 Claims, 39 Drawing Sheets

(56) References Cited

U.S. PATENT DOCUMENTS

| | | | |
|---|---|---|---|
| 2015/0253765 A1* | 9/2015 | Katsuda | B25J 9/163 |
| | | | 700/121 |
| 2016/0166146 A1 | 6/2016 | Sarkar | |
| 2018/0210547 A1 | 7/2018 | Sarkar | |
| 2019/0286228 A1 | 9/2019 | Sangu | |
| 2020/0174564 A1 | 6/2020 | Sangu et al. | |
| 2020/0285058 A1 | 9/2020 | Sangu et al. | |
| 2021/0068652 A1 | 3/2021 | Nistico | |
| 2022/0221722 A1 | 7/2022 | Yoshida et al. | |
| 2023/0009290 A1* | 1/2023 | Iwasaki | G09G 5/02 |

OTHER PUBLICATIONS

Sangu Suguru et al: "Ultracompact eye and pupil tracking device using VCSEL arrays and position sensitive detector", Spie Proceedings; [Proceedings of SPIEISSN 0227-786X], SPIE, US, vol. 11310, Feb. 19, 2020 (Feb. 19, 2020), pp. 113101F-1-113101F-11.

Sarkar N et al: "A resonant eye-tracking microsystem for velocity estimation of saccades and foveated rendering", 2017 IEEE 30th International Conference on Micro Electro Mechanical Systems(MEMES), IEEE,Jan. 22, 2017(Jan. 22, 2017), pp. 304-307.

Tseng Vincent Wen-Sheng et al: "Digital biomarker of mental fatigue" NPJ Digital Medicine, vol. 4, No. 1, Mar. 11, 2021 (Mar. 11, 2021), 5 pages.

Zargari Marandi Ramtin et al: "Eye movement characteristics reflected fatigue development in both young and elderly individuals", Scientific Reports, vol. 8, No. 1, Sep. 3, 2018 (Sep. 3, 2018), pp. 1-10.

Wang Yan et al: "Assessment of eye fatigue caused by head-mounted displays using eye-tracking", BioMedical Engineering, Nov. 15, 2019 (Nov. 15, 2019), 19 pages.

* cited by examiner

FIG. 2
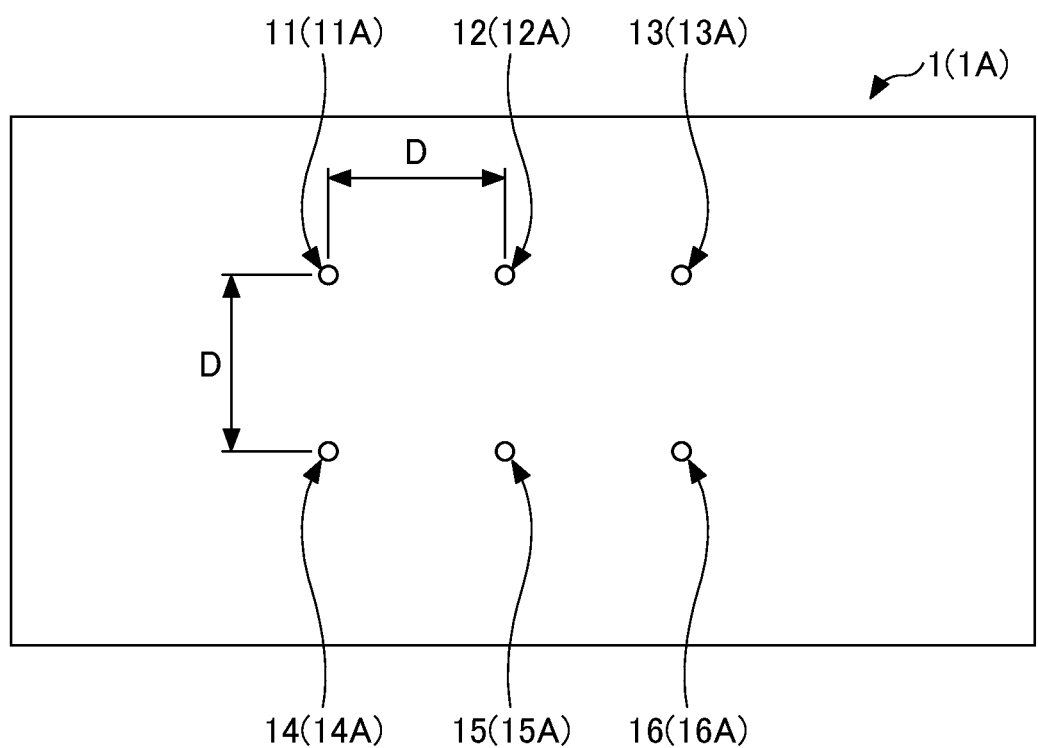
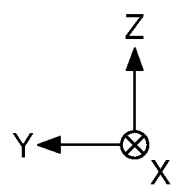

COMPARATIVE EXAMPLE

COMPARATIVE EXAMPLE

COMPARATIVE EXAMPLE

INCLINATION DETECTOR, LINE-OF-SIGHT DETECTION DEVICE, RETINAL PROJECTION DISPLAY DEVICE, HEAD-MOUNTED DISPLAY DEVICE, OPTOMETRIC DEVICE, VIRTUAL-REALITY DISPLAY APPARATUS, USER-CONDITION ESTIMATION APPARATUS, DRIVER-ASSISTANCE SYSTEM, METHOD OF DETECTING DEGREE OF INCLINATION OF THREE-DIMENSIONAL OBJECT, AND METHOD OF DETECTING LINE-OF-SIGHT

CROSS-REFERENCE TO RELATED APPLICATIONS

This patent application is based on PCT filing PCT/IB2022/061949, filed on Dec. 8, 2022, which claims priority from Japanese Patent Application Nos. 2021-209644, filed on Dec. 23, 2021 and 2022-170184, filed on Oct. 24, 2022, the entire disclosures of each are hereby incorporated by reference herein.

TECHNICAL FIELD

The present disclosure relates to an inclination detection apparatus, a line-of-sight detection device, a retinal projection display device, a head-mounted display device, an optometric device, a virtual-reality display apparatus, a user-condition estimation apparatus, a driver-assistance system, a method of detecting a degree of inclination of a three-dimensional object, and a method of detecting a line-of-sight.

BACKGROUND ART

Inclination detectors are developed: an inclination detector detects the degree of inclination of an object based on light reflected from the object after being emitted to the object. Such an inclination detector is used in various applications such as a line-of-sight detection device that detects a line-of-sight direction based on the inclination of the eyeball of a person as an object, a retinal projection display device including the line-of-sight detection device, a head-mounted display device, and an optometric device.

Another example of the inclination detector has a configuration that causes a micro-electromechanical systems (MEMS) mirror to scan a laser beam over eyeball to detect the light reflected from the eyeball scanned with the laser beam.

CITATION LIST

Patent Literature

[PTL 1]
U.S. Pat. No. 10,213,105

SUMMARY OF INVENTION

Technical Problem

An inclination detector is to have a simple configuration. It is an object to achieve an inclination detector having a simple configuration.

Solution to Problem

An inclination detector includes: multiple light emitters configured to emit multiple beams to an object; a photosensor having a light-receiving surface configured to: receive the multiple beams reflected from the object on the light-receiving surface; and output an electrical signal based on light intensity of the multiple beams received on the light-receiving surface; and an output unit configured to output a result of detection of a degree of inclination of the object based on the electrical signal output from the photosensor. The photosensor is disposed at a position at which the light intensity of the multiple beams that are emitted from the multiple light emitters, reflected at the object, and received at the photosensor changes according to the degree of inclination of the object.

Advantageous Effects of Invention

Embodiments of the present disclosure provides an inclination detection apparatus of a simple configuration.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 2 is a diagram of a vertical-cavity surface-emitting laser (VCSEL) array according to a first embodiments of the present disclosure.

DESCRIPTION OF EMBODIMENTS

Figure 1:
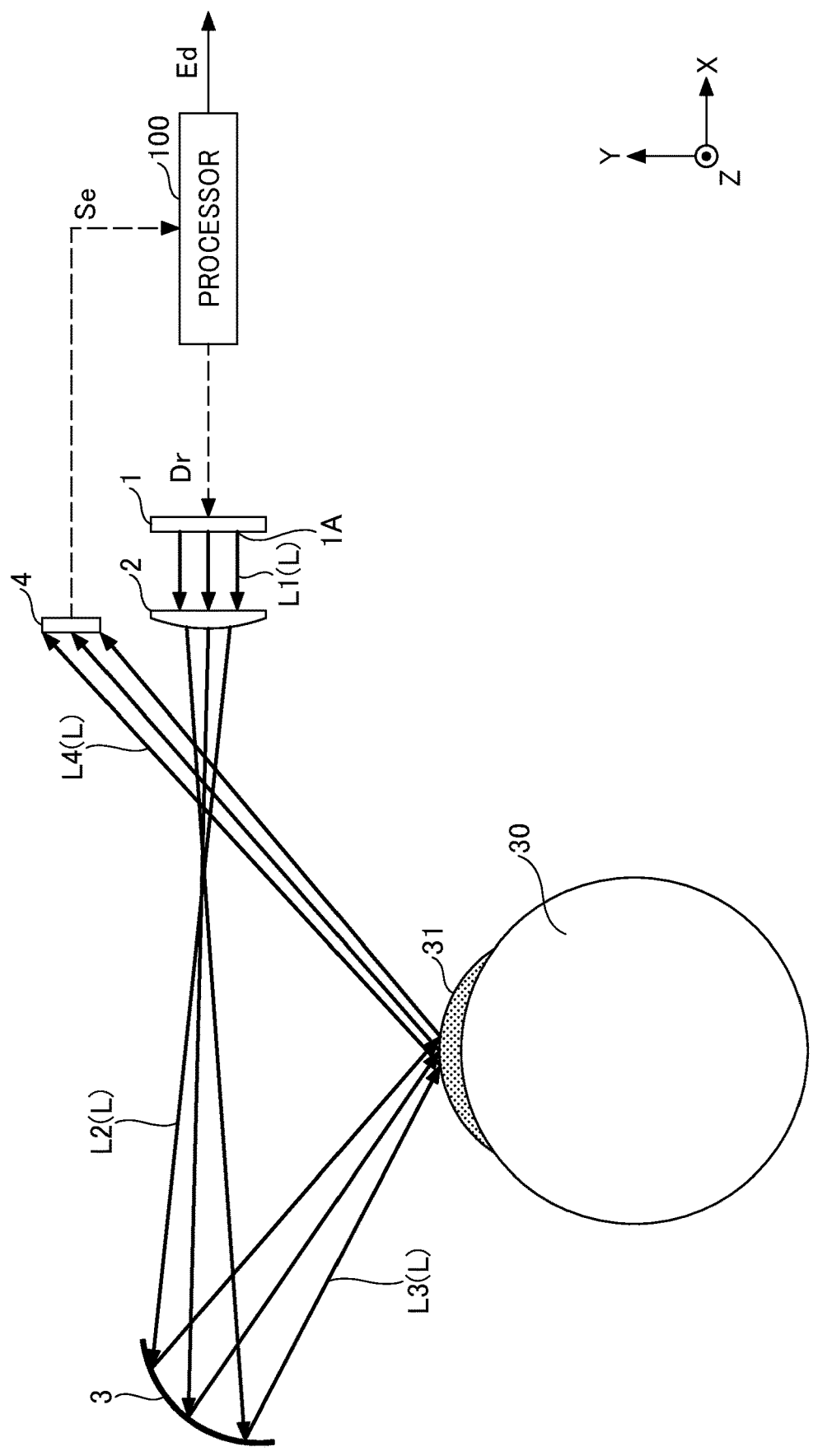
FIG. 1 is an illustration of the entire configuration of a line-of-sight detection device according to an embodiment of the present disclosure.

The terminology used herein is for the purpose of describing particular embodiments only and is not intended to be limiting of the present invention. As used herein, the singular forms "a," "an," and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present disclosure are described referring to the drawings. In the drawings, the same components are denoted by the same reference number, and redundant description thereof will be appropriately omitted.

The embodiments described below are examples of inclination detectors for embodying the technical idea of the present disclosure, and the present disclosure is not limited to the embodiments described below. Unless otherwise specified, shapes of components, relative arrangements thereof, and values of parameters described below are not intended to limit the scope of the present invention but are intended to exemplify the scope of the present invention. The relative positions of the elements illustrated in the drawings are exaggerated for purpose of clear illustration.

In the drawings described below, directions may be indicated by an X-axis, a Y-axis, and a Z-axis. Multiple light emitters of an inclination detector according to an embodiment emits laser beams from the light emitting-surface in an X-direction parallel to the X-axis. A Y-direction parallel to the Y-axis is a prescribed direction within the light-emitting surface. A Z-direction parallel to the Z-axis is perpendicular to the prescribed direction (i.e., the Y-direction) within the light-emitting surface.

In addition, a direction indicated by an arrow in the X-direction is referred to as a +X-direction, a direction opposite to the +X-direction is referred to as a −X-direction, a direction indicated by an arrow in the Y-direction is referred to as a +Y-direction, a direction opposite to the +Y-direction is referred to as a −Y-direction, a direction indicated by an arrow in the Z-direction is referred to as a +Z-direction, and a direction opposite to the +Z-direction is referred to as a −Z-direction. In one embodiment, the multiple light emitters emit light in the −X-direction. However, these directions do not limit the orientation of the inclination detector during use, and the inclination detector may be oriented in any direction.

An inclination detector according to an embodiment of the present disclosure includes multiple light emitters configured to emit light beams; a photosensor configured to receive light beams reflected from an object and output electrical signals according to intensities of the received light beams; and an output unit configured to output a detected inclination of the object based on the received electrical signals. The photosensor receives multiple light beams reflected from the object inclined at substantially the same degree after being emitted from the multiple light emitters.

An inclination detector according to an embodiment of the present disclosure detects the tilt of an object based on light beams hitting the object after being emitted from multiple light emitters. Such an inclination detector has a simple configuration without the use of a movable section such as a micro-electromechanical system (MEMS) mirror and a driver that drives the movable section. Further, the inclination detector tracks the motion of the object by using a photosensor such as a photodiode that receives multiple light beams reflected from the object after being emitted from multiple light emitters and outputs an electrical signal according to the intensity of the received light beams. Such a photosensor has more simple configuration than those of other types of photosensors such as a position sensitive detector (PSD). The configuration of the driver that drives the photosensor is also simple. As described above, embodiments of the present disclosure provides an inclination detector with a simple configuration.

The object according to the present embodiment is, for example, a human eye, or an eyeball. The eyeball is inclined toward the line of vision or line of sight of its subject. The inclination detector is, for example, a line-of-sight detection device that outputs the detection results of the inclination of eyeball as the line-of-sight direction information of a subject (information about the line-of-sight direction of a subject). The information on the degree of inclination of the eyeball (referred to simply as eyeball inclination information) includes not only the information that directly indicates the angle of inclination but also the information about an angle of inclination other than the angle of inclination of the eyeball.

For example, the information about the line-of-sight direction detected by the line-of-sight detection device is used by eye tracking devices or optometric devices. Alternatively, the line-of-sight direction information is used to correct the position of the projected image or the image data according to the line-of-sight when an image is projected onto a retina or the like by, for example, a retinal projection display device or a head-mounted display (HMD).

In the following description, the line-of-sight detection device is described as an example of the inclination detector. The eyeball is an example of an object and also an example of a three-dimensional object. Although the right eye of a human is illustrated in the drawings of the embodiment, the function and the effect of the line-of-sight detection device are the same even if the eye is the left eye. Also in the case where the two line-of-sight detection devices are applied to the eyeballs of both eyes, the functions and effects of the line-of-sight detection devices are the same.

Embodiment

Configuration Example of Line-of-Sight Detection Device 10
Overall Configuration FIG. 1 is an illustration of the entire configuration of a line-of-sight detection device 10 according to an embodiment of the present disclosure. As illustrated in FIG. 1, the line-of-sight detection device 10 includes a VCSEL array 1, a lens 2, a concave mirror 3, a photodiode 4 as a detector, and a processor 100. The lens 2 and the concave mirror 3 serve as an incident position controller.

The line-of-sight detection device 10 causes the processor 100 to output a drive signal Dr to the VCSEL array 1 and further causes the VCSEL array 1 to emit a laser beam L1. The laser beam L1 emitted from the VCSEL array 1 is once condensed by the lens 2 and then diverges as the laser beam L1 gets closer to the concave mirror 3, striking on the concave mirror 3. The laser beam L1 emitted through the lens 2 is referred to as a laser beam L2.

The laser beam L2 incident on the concave mirror 3 reflects off the concave mirror 3 toward the eyeball 30, and then strikes on the cornea 31 of the eyeball 30. The laser beam L2 reflected off the concave mirror 3 is referred to as a laser beam L3. The laser beam L3 striking on the cornea 31 reflects off the cornea 31 and strikes on the photodiode 4. The laser beam L3 reflected off the cornea 31 (or the eyeball 30) is referred to as a laser beam L4. The photodiode 4 receives the laser beam L4 reflected off the cornea 31 of the eyeball 30 and outputs an electrical signal Se based on the light intensity of the received laser beam L4 to the processor 100.

The processor 100 detects a degree of the inclination of the eyeball 30 based on the electrical signal Se output from the photodiode 4, and outputs line-of-sight direction information Ed as the detection results to an external device. The external device is, for example, an eye tracking device, an optometric device, a retina projection display device, or a head mounted display (HMD) that uses the line-of-sight direction information Ed. Alternatively, the external device is a storage device that stores the line-of-sight direction information Ed, a display device that displays the line-of-sight direction information Ed, or a transmission device that transmits the line-of-sight direction information Ed.

The laser beams L1, L2, L3, and L4 have different states such as a position of an optical path through which the laser beam propagates and a divergence angle of the propagated laser beam, but have the same function and property as the laser beam used for the line-of-sight detection. The laser beams L1, L2, L3, and L4 are collectively be referred to as a laser beam L when not particularly distinguished from each other.

The VCSEL array 1 is an example of multiple light emitters. The VCSEL array 1 includes, for example, multiple VCSEL elements two-dimensionally arranged in an X-direction and a Y-direction which are two directions along a light-emitting surface 1A included in the VCSEL array 1.

Each of the multiple VCSEL elements included in the VCSEL array 1 corresponds to a light emitter.

The VCSEL array 1, for example, emits the laser beam L1 having directivity and a finite divergence angle through the multiple VCSEL elements in the −X-direction.

The laser light L1 corresponds to light emitted from the light emitters. The line-of-sight detection device 10 individually and independently drives each of the multiple VCSEL elements included in the VCSEL array 1 in accordance with the drive signal Dr output from the processor 100, and causes the multiple VCSEL elements included in the VCSEL array 1 to selectively emit the laser beams L1.

The line-of-sight detection device 10, for example, causes any of the multiple VCSEL elements included in the VCSEL array 1 to emit the laser beams L1. Particularly in the present embodiment, the line-of-sight detection device 10 causes multiple VCSEL elements included in the VCSEL array 1 to emit multiple laser beams L1. Further, the line-of-sight detection device 10 selectively and sequentially switch the multiple laser beams L1.

Preferably, the wavelength of the laser beam L is within wavelengths of near-infrared light, which is invisible light such that the visual recognition of a subject whose line of sight is detected will not be interrupted. For example, the wavelength of the near-infrared light is 700 nm or greater and 2500 nm or less. However, the wavelength of the laser beam L is not limited to the wavelength of near-infrared light, and visible light may be used. For example, the wavelength of the visible light is 360 nm or greater and 830 nm or less. The VCSEL array 1 is separately described in detail with reference to FIG. 2.

The lens 2 and the concave mirror 3 serve as an incident position controller that controls the incident positions of the laser beams L4 striking on the photodiode 4 after being emitted from the multiple VCSEL elements as the laser beams L1 and reflected by eyeball 30 as the laser beams L4. The lens 2 and the concave mirror 3 control the position at which the laser beams L4 strike on the photodiode 4 by converting the divergence angles of the laser beams L1.

The lens 2 is a converging element having a positive refractive power. The lens 2 is provided to have its focal point lies between the lens 2 and the concave mirror 3. The laser beams L2 passed through the lens 2 are once focused on the focal point of the lens 2, and then diverge as the laser beams L2 get closer to the concave mirror 3, striking on the concave mirror 3. The lens 2 causes the laser beams L2 to strike on a large area within the concave mirror 3 and further causes the laser beams L3 reflected off the concave mirror 3 to strike on a large area of eyeball 30. This allows an enlarged detection range of the line-of-sight detection by the line-of-sight detection device 10. The lens 2 serves to control the positions of the laser beams L2 striking on the concave mirror 3 (the incident positions at which the laser beams L2 are incident on the concave mirror 3, or the incident position of the laser beams L on the concave mirror 3) by refracting the laser beams L1 emitted from the multiple VCSEL elements. This allows enlargement of the detection range of the line-of-sight direction by the line-of-sight detection device 10.

However, the incident position of the laser beams L on the concave mirror 3 can also be controlled by adjusting the relative position between the VCSEL elements included in the VCSEL array 1. Since the adjustment of the relative position between the VCSEL elements can control the incident position of the laser beams L on the concave mirror 3 without using the lens 2, it is preferable in terms of downsizing the line-of-sight detection device 10 and simplifying the configuration of the line-of-sight detection device 10 by reducing the number of components. The lens 2 allows the control of the incident position of the laser beams L on the concave mirror 3 by adjusting the focal length of the lens 2 and the position of the lens 2, and thus allows simplification of the manufacture of the line-of-sight detection device 10.

The concave mirror 3 serves to reflect the laser beams L2 striking thereon and converge the laser beams L3 reflected off the concave mirror 3 as the laser beams L3 get closer to eyeball 30. The concave mirror 3 serves as a converging reflector. The concave mirror 3 has the center of curvature on the side on which the laser beams L2 strike.

The laser beams L3 strikes on the vicinity of the cornea 31 of the eyeball 30. The center of curvature of the concave mirror 3 is located off the optical axis of the laser beams L between the VCSEL array 1 and the concave mirror 3. With this arrangement, the VCSEL 1 and the concave mirror 3 constitute an off-axis optical system. In other words, the optical axis of the laser beams L is the central axis of a laser beam as the laser beams L.

Although the concave mirror 3 is exemplified in the present embodiment, a configuration in which a convex lens and a plane mirror are combined, a wavefront control element such as a hologram, a diffractive optical element may be provided instead of the concave mirror 3 as long as the laser beams L are converged as the laser beams L get closer to the eyeball 30. The concave mirror 3 allows the user of fewer components and the reduction in the size of the line-of-sight detection device 10. The concave mirror 3 having a high reflectance advantageously reduces a light amount loss. The wavefront control element and the diffractive optical element are easy to position, and thus facilitates the manufacture of the line-of-sight detection device 10.

The concave surface of the concave mirror 3, for example, has an anamorphic aspherical surface having different curvatures in orthogonal two directions, which intersect with the optical axis of the laser beam L3. The concave mirror 3 with such an anamorphic aspherical surface reduces the diameter of the laser beam L4 striking on the light receiving surface of the photodiode 4 and thus isotropically shapes the beam. For example, if the radius of curvature of the concave mirror 3 in the Y-direction in FIG. 1 is smaller than the radius of curvature of the concave mirror 3 in the Z-direction, an isotropic beam is shaped. The laser beam L4 is an example of light reflected by an object.

The incident angle of the laser beam L3 on the eyeball 30 is adjusted so that the laser beam L3 is incident on the cornea 31 at a predetermined angle when the eyeball 30 is facing forward. The incident angle of the laser beam L3 to the eyeball 30 is an angle formed by the optical axis of the laser beam L3 and a tangent plane of the eyeball 30 including a point of intersection of the optical axis of the laser beam L3 and the front face of the eyeball 30.

The predetermined angle corresponding to the incident angle of the laser beam L3 on eyeball 30 is preferably large enough to prevent the concave mirror 3 from being included within the field of view of a subject whose line-of-sight is detected. The viewing angle of the subject on the side where the nose of the subject lies is typically 60 degrees where a direction in which the subject is facing forward has a zero degree angle (i.e., the reference direction). For this reason, the incident angle of the laser beams L3 on eyeball 30 is preferably greater than or equal to substantially 60 with the direction in which the subject is facing forward as the reference direction in the line-of-sight detection device 10.

At least some of multiple laser beams L emitted from the multiple VCSEL elements in the VCSEL array 1 strike on the cornea 31 of eyeball 30 at a different position with a different incident angle from those of the other laser beams L emitted from the multiple VCSEL elements.

The surface of the cornea 31 of the eyeball 30 is a transparent body containing water and typically has a reflectance of about 2% or greater and 4% or less. The laser beams L3 striking on the cornea 31 of the eyeball 30 reflect off the cornea 31 and proceed as the laser beams L4 to the photodiode 4.

The photodiode 4 is an example of a photosensor that receives the laser beams L4 reflected off the eyeball 30 after being emitted from the VCSEL array 1 and outputs the electrical signal Se based on the light intensity of the laser beams L4 received. The photodiode 4 is preferably a silicon photodiode having a high sensitivity to visible light. The photodiode 4 is any of a PN-type photodiode, a PIN-type photodiode, and an avalanche photodiode (APD). From the viewpoint of simplifying the configuration of the line-of-sight detection device 10, the PN-type photodiode is particularly preferable. The electrical signal Se is, for example, a current signal or a voltage signal. The photodiode 4 includes, for example, one anode electrode and one cathode electrode and outputs an electrical signal based on the light intensity. However, the photodiode 4 does not include the configuration that includes two anode electrodes and one cathode electrode or includes two or more anode electrodes and two or more cathode electrodes, so as to output an electrical signal based on the position of light. Examples of the photodiode 4 capable of outputting an electrical signal based on the position of light include a position sensitive detector (PSD), a complementary metal oxide semiconductor (CMOS), and a charge coupled device (CCD). From the viewpoint of simplifying the configuration of the line-of-sight detection device 10, a photodiode that consumes less power than an image sensor is particularly desirable.

Particularly in the present embodiment, the photodiode 4 receives multiple laser beams L4 reflected off the eyeball 30 after being emitted from multiple VCSEL elements included in the VCSEL array 1 under the conditions that the eyeball 30 remains inclined at substantially the same degree.

The state in which the eyeball 30 remains inclined at substantially the same degree refers to the state in which the eyeball 30 remains inclined at ±3.0 degrees or less. The state in which the eyeball 30 remains inclined at substantially the same degree or substantially unchanged, for example, includes an involuntary eye movement that occurs when the eyeball 30 minutely oscillates within substantially ±3.0 degrees.

The processor 100 is an example of an output unit that outputs the detection results of the inclination of the eyeball 30 based on the electrical signal Se output from the photodiode 4. The configuration of the processor 100 is described in detail with reference to FIGS. 10 and 11.

Configuration Example of VCSEL Array 1

FIG. 2 is a diagram of a VCSEL array 1 according to an embodiment of the present disclosure. FIG. 2 is an illustration of the VCSEL array 1 as viewed in the −X-direction in which the VCSEL array 1 emits the laser beams L1.

The VCSEL array 1 includes VCSEL elements 11 to 16. The VCSEL element 11 has a light-emitting surface 11A, the VCSEL element 12 has a light-emitting surface 12A, and the VCSEL element 13 has a light-emitting surface 13A. The VCSEL element 14 has a light-emitting surface 14A, the VCSEL element 15 has a light-emitting surface 15A, and the VCSEL element 16 has a light-emitting surface 16A. Each of the light-emitting surfaces 11A to 16A is a surface from which a laser beam L1 is emitted. The light-emitting surface 1A of the VCSEL array 1 is a surface including all of the light-emitting surfaces 11A to 16A. The laser beams emitted from the VCSEL elements 11 to 16 are collectively referred to as the laser beams L1.

The VCSEL elements 11 to 16 are arranged in two different directions along the light-emitting surface 1A. The two different directions along the light-emitting surface 1A are the Y-direction and the Z-direction in FIG. 2. The VCSEL elements 11 to 16 are two-dimensionally arranged in the Y-direction and the Z-direction. Each of the Y-direction and the Z-direction is an example of a prescribed direction along, or parallel to the light-emitting surface included in the light emitter.

Particularly in the present embodiment, the intervals D between the VCSEL elements adjacent to each other among the VCSEL elements 11 to 16 in the Y-direction and the Z-direction are equal to each other. However, "equal" allows a difference that is generally recognized as an error, for example, a difference of 1/10 or less of the interval D. Even when such a difference is included, the operational effect of the line-of-sight detection device 10 can be obtained.

The arrangement of the VCSEL elements 11 to 16 may be a one-dimensional arrangement, but is preferably a two-dimensional arrangement in terms of expanding the detection range of the line-of-sight direction by the line-of-sight detection device 10.

The multiple light emitters are not limited to the VCSEL array 1, and may include multiple laser diodes (LDs) or light-emitting diodes (LEDs).

In the present embodiment, the VCSEL array 1 including the VCSEL elements 11 to 16 as the multiple light emitters is exemplified, but at least a part of the multiple light emitters may be a pulsed laser beam source that emits a pulsed laser beam L1. In addition, the multiple light emitters may be configured by combining multiple types of light sources as light emitters. For example, the multiple light emitters can be configured by combining an LD that continuously emits the laser beam L1 and a pulse laser beam source that pulse-emits the laser beam L1, and can be configured by combining multiple LDs that emit the laser beam L1 having different wavelengths.

The VCSEL array 1 facilitates in-plane integration of multiple light emitters and thus allows a reduction in the size of the line-of-sight detection device 10. In addition, the VCSEL array 1 can stabilize the light amount (or the light intensity) of the laser beam L even when the laser beam L having a small light intensity is emitted. Such a VCSEL array 1 allows a high-accurate detection of the line-of-sight direction while reducing the light intensity of the laser beam L striking the eyeball 30.

Each of the laser beams L1 emitted from the VCSEL elements 11 to 16 is diffracted at the opening of a corresponding VCSEL element of the VCSEL elements 11 to 16 in the VCSEL array 1, and thus diverges as it gets closer to the lens 2. The divergence angle of the laser beam L1 can be controlled by the aperture shape of each of the VCSEL elements 11 to 16. The area of the aperture of each of the VCSEL elements 11 to 16 is preferably small to reduce power consumption.

The relative position between the VCSEL elements 11 to 16 is determined in advance, and is referred to when an estimation model used for the detection of the line-of-sight direction by the processor 100 is created.

The line-of-sight detection device 10 detects the line-of-sight direction based on the relative position between the VCSEL elements 11 to 16 as illustrated in FIG. 2 used to create the estimation model.

Incidence Example of Laser Beams L4 on Photodiode 4

Figure 3A:
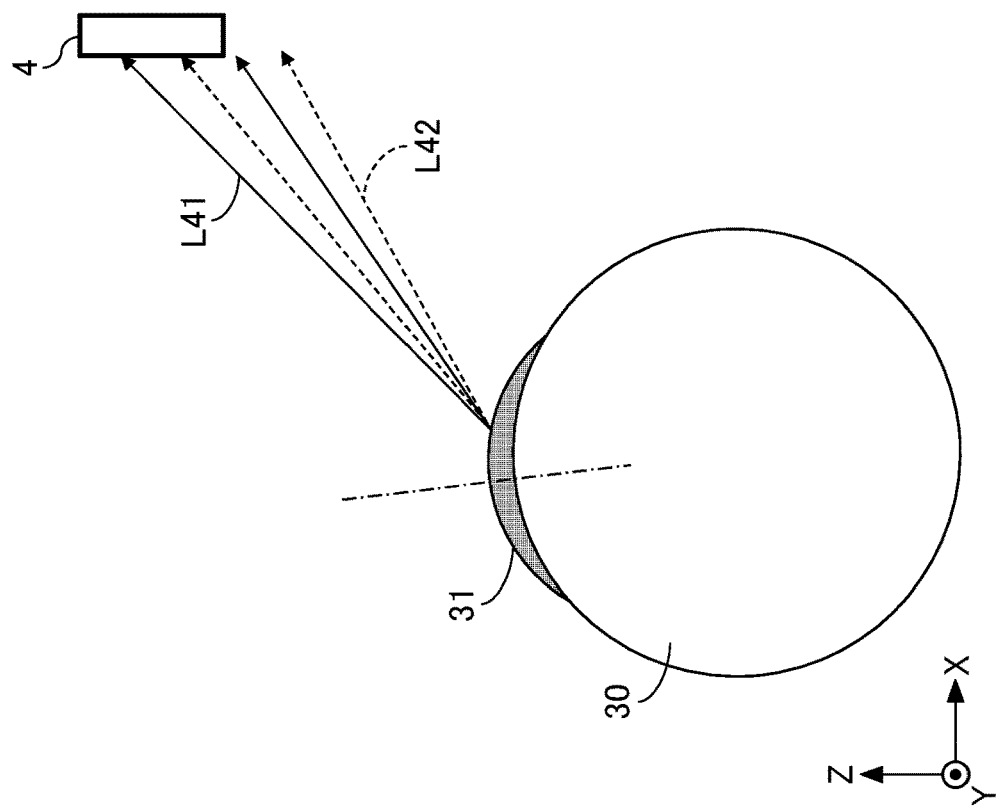
FIGS. 3A, 3B, and 3C are illustrations of a laser beam incident on a photodiode according to an embodiment.
Figure 3B:
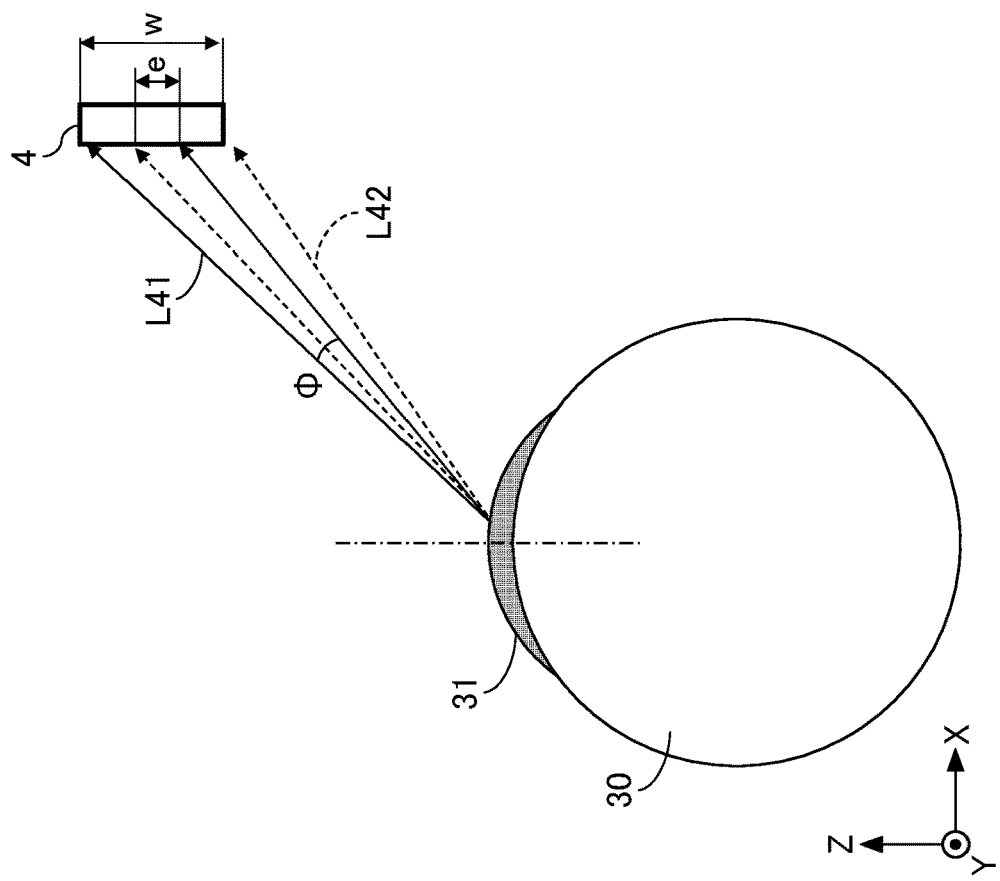
Figure 3C:
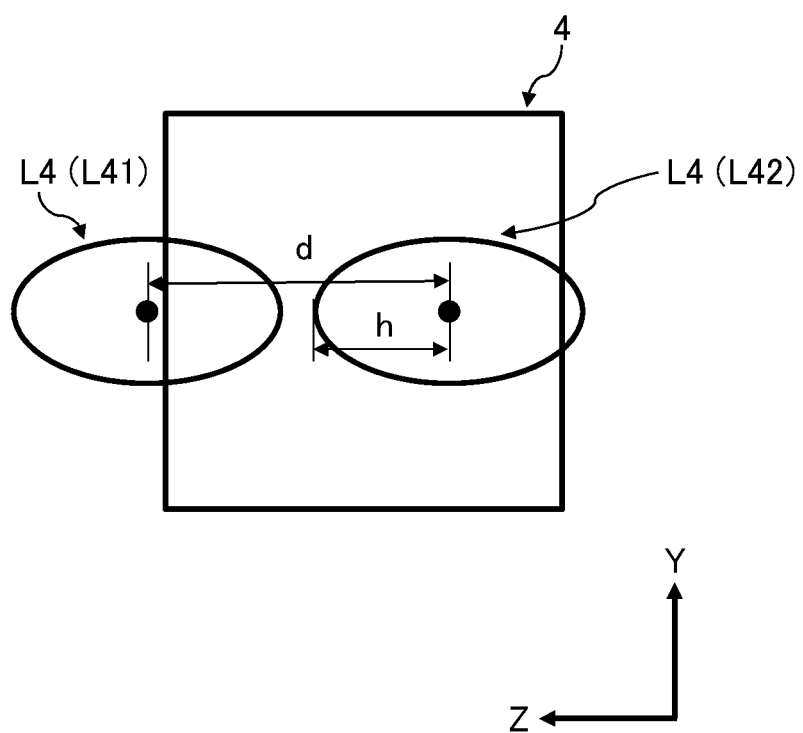
Figure 4B:
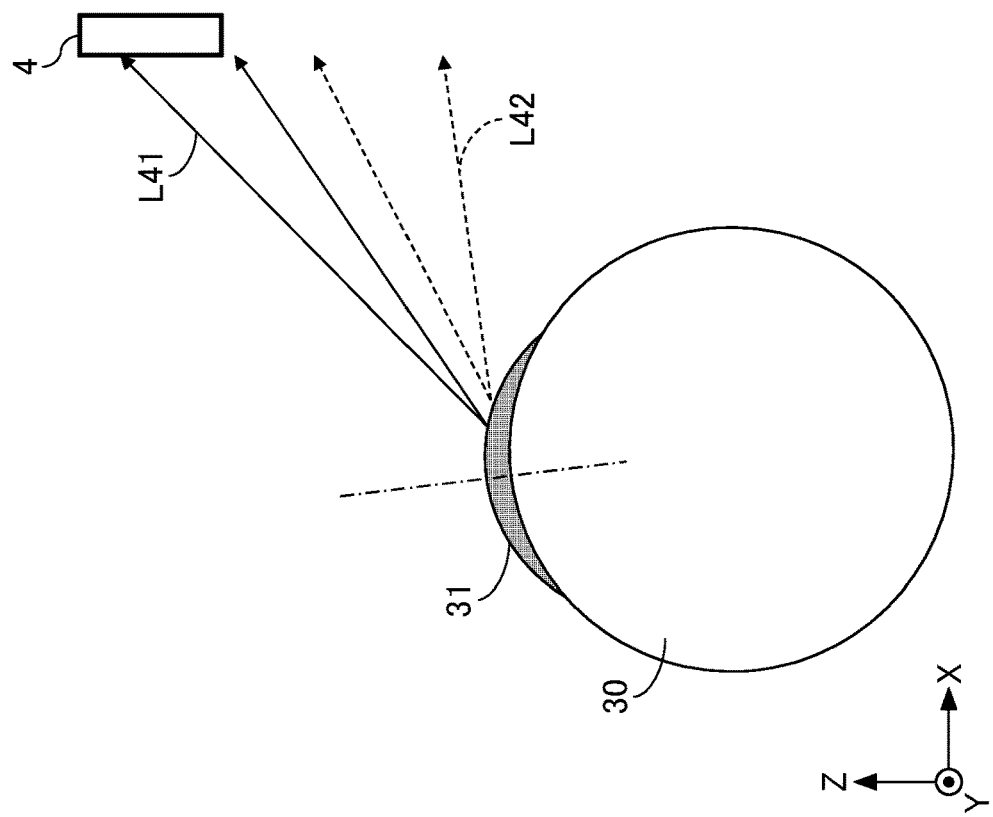
FIGS. 4A and 4B are illustrations of a laser beam incident on a photodiode according to a comparative example.
Figure 4A:
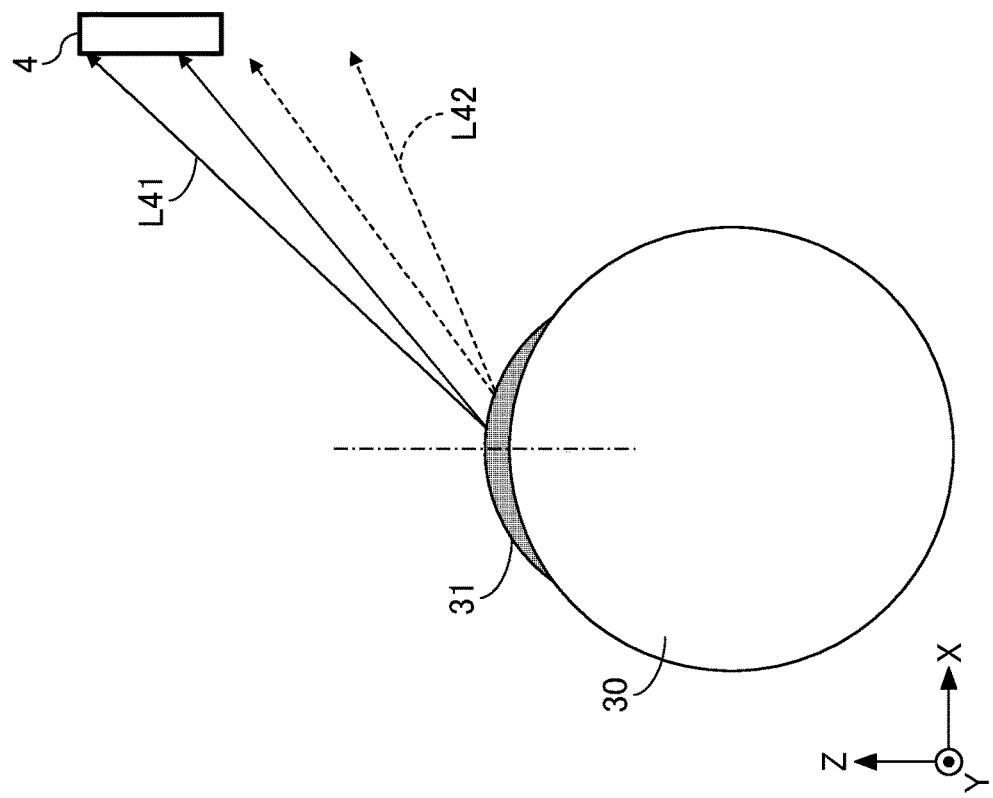

The incidence of the laser beams L4 on the photodiode 4 is described with reference to FIGS. 3A, 3B, 3C, 4A, and 4B. FIGS. 3A, 3B, and 3C are illustrations of laser beams L4 incident on a photodiode 4 according to an embodiment. FIGS. 4A and 4B are illustrations of laser beams incident on a photodiode according to a comparative example.

As illustrated in FIG. 3A, the laser beams L4 strike on a light-receiving surface 41 of the photodiode 4 when the line-of-sight direction 50 of eyeball 30 is coincide with the direction in which the subject is facing forward. The laser beams L4 include a laser beam L41 and a laser beam L42. The laser beam L41 and laser beam L42 are collectively be referred to as the laser beams L4 when not particularly distinguished from each other. Each of the laser beams L41 and L42 diverges toward the photosensor, or the photodiode 4. As illustrated in FIG. 3A, the laser beam L41 has a divergence angle φ, and all the laser beams L4 strike on the light-receiving surface 41 of the photodiode 4. However, all the laser beams L4 diverging toward the photodiode 4 may not be incident on the light-receiving surface 41 of the photodiode 4. For example, a part (some rays) of the laser beam L42 may pass through a −Y-side region of the light-receiving surface 41 (i.e., a downstream region from the light-receiving surface 41 in the −Y-direction), failing to strike on the light-receiving surface 41.

The laser beam L41 is emitted from one of the VCSEL elements 11 to 16, for example, the VCSEL element 11, passes through the lens 2, and reflects off the concave mirror 3 before striking on eyeball 30. Then, the laser beam L41 reflects off the eyeball 30 and thus strikes on the light-receiving surface 41 of the photodiode 4. The laser beam L42 is emitted from another VCSEL element (e.g., the VCSEL element 12) other than the VCSEL element 11 among the VCSEL elements 11 to 16, passes through the lens 2, and reflects off the concave mirror 3 before striking on eyeball 30. Then, the laser beam L42 reflects off the eyeball 30 and thus strikes on the light-receiving surface 41 of the photodiode 4. The VCSEL array 1 emits the laser beams L41 and L42.

Upon the laser beams L41 and L42 striking on the light-receiving surface of the photodiode 4, the photodiode 4 outputs electrical signals based on the light intensity of light received. With a change in the degree of the inclination of the eyeball FIG. 3B, the positions and angles at which the laser beams L41 and L42 strike on the surface of the eyeball also change. With a change in the position at which the laser beams L41 and L42 strike on the eyeball (i.e., the surface of the eyeball), an arrival position of light reflected off the eyeball at the photodiode 4 changes. When the eyeball 30 is tilted to the left as illustrated in FIG. 3B (i.e., the line-of-sight direction 50 is tilted to the left relative to the direction in which the subject is facing forward), the arrival positions of the laser beams L41 and L42 at the photodiode 4 are shifted in the −Y-direction.

The change in arrival positions changes the amount of light arriving at the light-receiving surface of the photodiode 4 and thus changes the intensity of the electrical signal output from the photo. More specifically, with a change in the arrival position of the laser beams L41 and L42 at the photodiode 4 as in FIG. 3B, a part of the laser beams L41 and L42 fail to arrive at, or strike on the light-receiving surface f the photodiode 4. Electrical signals P41 and P42 in the case of FIG. 3B are smaller than those in the case of FIG. 3A.

FIG. 3C is an illustration of the laser beams L4 when the light-receiving surface of the photodiode 4 is viewed in a YZ direction in the X-direction. In the present embodiment, the center-to-center distance d between the laser beam L41 and the laser beam L42 (i.e., the distance d between the center of the laser beam L41 and the center of laser beam L42) satisfies the following conditional expression:

$|h-w/2| \le d \le h+w/2$ where h is a beam radius of each of the laser beams striking on the light-receiving surface, and w is the length (a width) of the light-receiving surface in the Y-direction or the Z-direction. When the center-to-center distance d exceeds the upper limit, multiple laser beams fail to strike on the light-receiving surface of the photodiode 4, thus resulting in failure to estimate the degree of the inclination of the eyeball appropriately. When the center-to-center distance d falls below the lower limit, the amount of the laser beams L41 and L42 received by the photodiode 4 remains unchanged with a change in the degree of the inclination of the eyeball. This also results in failure to estimate the degree of the inclination of the eyeball appropriately.

In the present embodiment, the correlation between the degree of inclination of eyeball and the intensity of electric signal output from the photodiode 4 based on the multiple laser beams striking on the photodiode 4 are modeled. Using the modeled data, the degree of the inclination of the eyeball is estimated from the signal intensity based on the multiple laser beams, output from the photodiode 4.

FIGS. 4A and 4B are illustrations of a comparative example. Unlike FIGS. 3A, 3B, and 3C, the comparative example in FIGS. 4A and 4B fails to exhibit a change in the intensity of an electrical signal based on the laser beam L42 striking on the photodiode 4, output from the photodiode 4, due to a change in the degree of the inclination of the eyeball. Thus, the correlation between the degree of the inclination of the eyeball and the intensity of the electrical signals based on multiple laser beams striking on the photodiode 4, output from the photodiode 4, cannot be obtained from the comparative example in FIGS. 4A and 4B. In other words, the comparative example fails to estimate the degree of the inclination of the eyeball.

In the present embodiment, the distance D (see FIG. 2) between adjacent VCSEL elements among the VCSEL elements 11 to 16 is shorter than the length (or width) w of the light-receiving surface 41 of the photodiode 4 that receives the laser beams L4 reflected off the eyeball 30, in each of the Y-direction and the Z-direction.

Further, the laser beams L41 and L42 at least partially overlap each other on the light-receiving surface 41. An overlap region e (FIG. 3A) between the laser beams L41 and the laser beam L42 at least partly overlapping with each other on the light-receiving surface 41 is represented by a length of the overlap region in the Y-direction.

In the line-of-sight detection device 10, the interval between the adjacent VCSEL elements along the light-emitting surface 1A, the radius of curvature and the installation position of the lens 2, and the radius of curvature and the installation position of the concave mirror 3 are determined in advance so that the laser beams L4 are in the above-described state. The line-of-sight detection device 10 causes laser beams L4 to strike on the light-receiving surface 41 of the photodiode 4 and thus allows an increase in the beam size (beam diameter) of the laser beams L4 on the light-receiving surface 41 of the photodiode 4. Thus, the photodiode 4 can receive the laser beams L41 and L42 reflected off the eyeball 30 after being emitted from the VCSEL elements 11 and 12 of the VCSEL array 1.

When the beam diameter of the laser beam L4 on the light-receiving surface 41 of the photodiode 4 is increased, the probability that a part of the laser beam L4 deviates from the light-receiving surface 41 (i.e., a part of the laser beam L4 fails to strike on the light-receiving surface 41) increases when the degree of the inclination of the eye changes. As a result, the correlation between the degree of the inclination of the eyeball and the signal intensity output from the photodiode 4 increases. In view of such circumstances, the beam diameter of the laser beam L4 on the light-receiving surface 41 of the photodiode 4 is preferably larger. When the beam diameter of the laser beam L4 is equal to or longer than the length of the light-receiving surface of the photodiode 4 in a prescribed direction, the amount of change in the signal outputted from the photodiode 4 with respect to the degree of the inclination of the eyeball preferably increases.

However, the incidence of the laser beams L4 on the photodiode 4 is not limited to the state in FIGS. 3A, 3B, and 3C. In the line-of-sight detection device 10, the interval between the adjacent VCSEL elements along the light-emitting surface 1A, the radius of curvature and the installation position of the lens 2, and the radius of curvature and the installation position of the concave mirror 3 may be determined so that the laser beams L4 are in the state as illustrated in FIGS. 4A and 4B.

Hardware Configuration of Processor 100

The following describes the processor 100. FIG. 2 is a block diagram illustrating an example of the hardware configuration of the processor 100.

Figure 5:
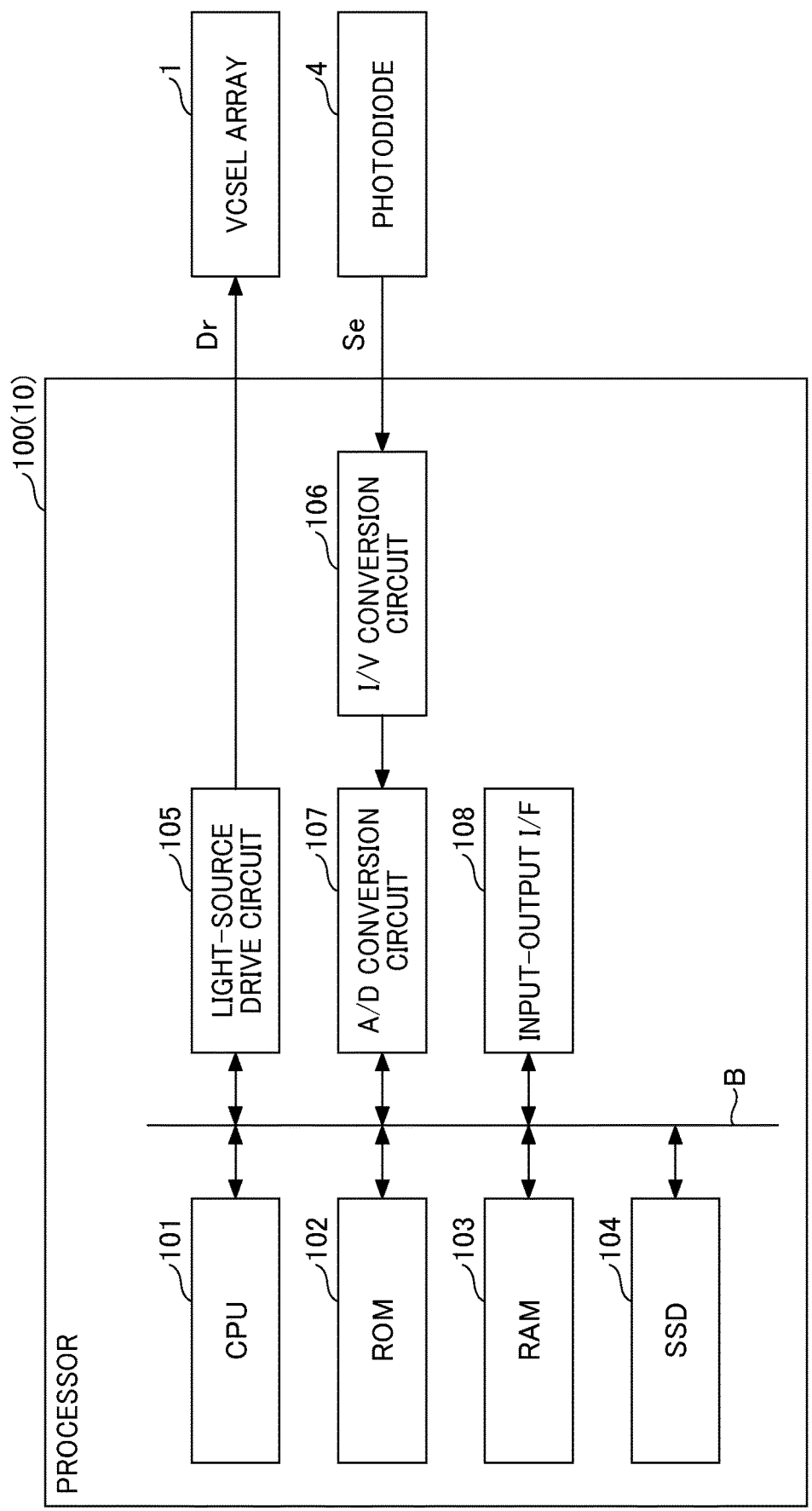
FIG. 5 is a block diagram of a hardware configuration of a processor according to an embodiment.

As illustrated in FIG. 5, the processor 100 includes a central processing unit (CPU) 101, a read only memory (ROM) 102, a random access memory (RAM) 103, and a solid state drive (SSD) 104. The processor 100 according to the present embodiment includes a light-source drive circuit 105, an intensity of current/volt (I/V) conversion circuit 106, an analog-to-digital (A/D) conversion circuit 107, and an input-output interface (I/F) 108. These components are communicably and electrically connected to each other via a system bus B.

The CPU 101 loads into the RAM 103 a program or data from a storage device such as the ROM 102 and the SSD 104 and performs processes. Accordingly, the controls or functions of the entirety of the processor 100, as will be described later in detail, are implemented.

The ROM 102 is a non-volatile semiconductor memory (storage device) that stores a program and data although the power is turned off. The ROM 102 stores a computer program or data that is executed when the processor 100 starts up, such as a basic input/output system (BIOS), the settings of the operating system (OS), and the settings of the network. The RAM 103 is a volatile semiconductor memory (storage device) that temporarily holds a program and data.

The SSD 104 is a non-volatile memory that stores a program that executes processing by the processor 100 and various data. Note that the SSD may be a hard disk drive (HDD).

The light-source drive circuit 105 according to the present embodiment is an electric circuit that is electrically connected to the VCSEL array 1 and outputs a drive signal Dr to the VCSEL array 1 in accordance with control signals so as to cause the VCSEL array 1 to emit light. In the present embodiment, the light-source drive circuit 105 includes a demultiplexer circuit that switches the output destination of the drive signal Dr. The drive signal Dr is a current signal. In some examples, the drive signal Dr is a voltage signal.

The I/V conversion circuit 106 is an electric circuit that is electrically connected to the photodiode 4 and outputs an analog voltage signal obtained by I/V converting the analog electric signal Se output from the photodiode 4.

The A/D conversion circuit 107 is an electric circuit that outputs a digital voltage signal obtained by A/D converting the analog voltage signal output from the I/V conversion circuit 106.

The input-output I/F 108 is an interface that enables communication between an external device and the processor 100.

Functional Configuration of Processor 100

Figure 6:
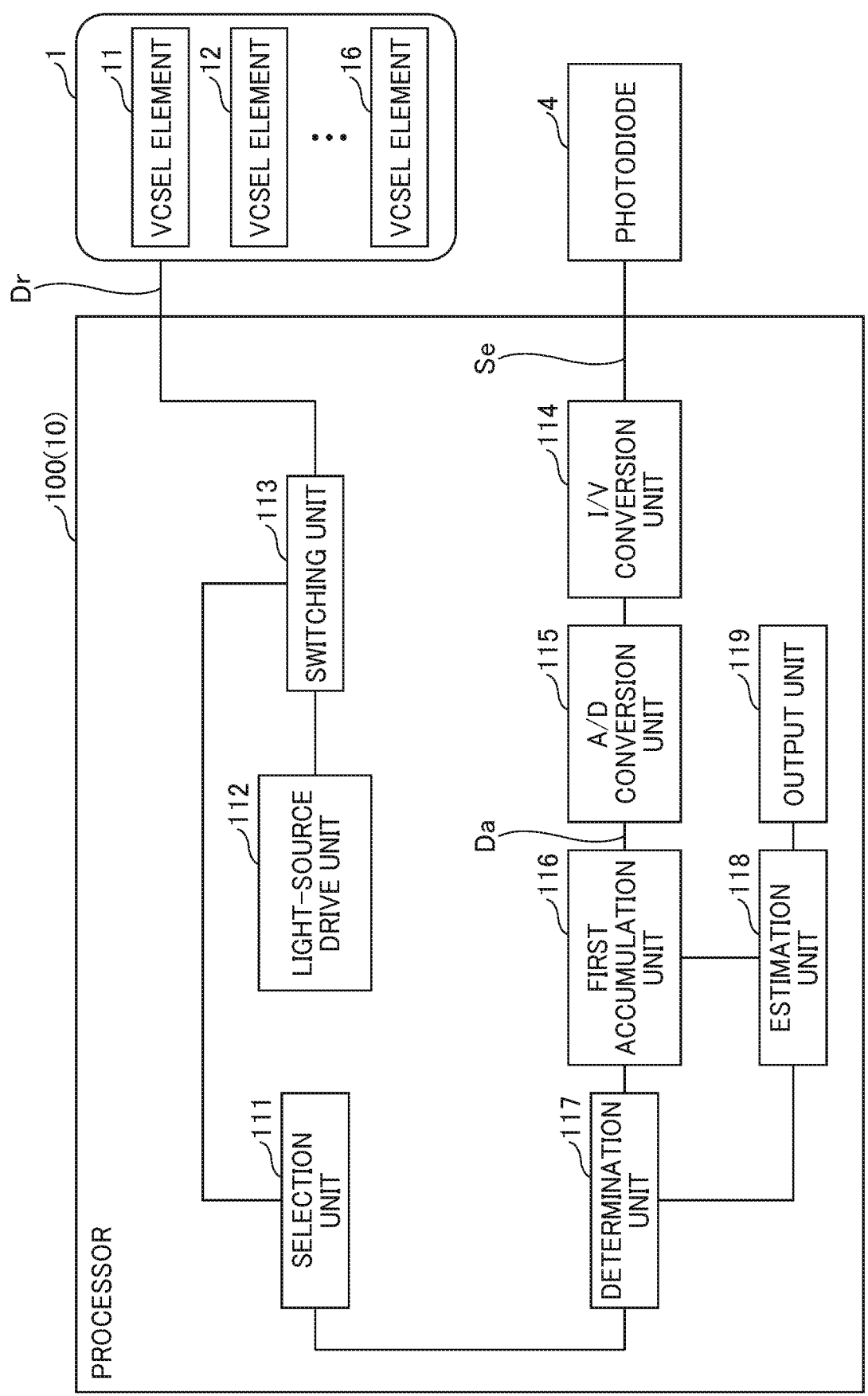
FIG. 6 is a block diagram of a functional configuration of the processor, according to a first embodiment.

FIG. 6 is a block diagram of a functional configuration of processor 100.

As illustrated in FIG. 6, the processor 100 includes a selection unit 111, a light-source drive unit 112, a switching unit 113, an I/V conversion unit 114, an A/D conversion unit 115, a first accumulation unit 116, a determination unit 117, an estimation unit 118, and an output unit 119.

The CPU 101 of the processor 100 executes program stored in the ROM 102 to implement the functions of the selection unit 111 and the estimation unit 118 and causes the light-source drive circuit 105 to implement the functions of the light-source drive unit 112 and the switching unit 113. Further, the processor 100 causes the I/V conversion circuit 106 and the A/D conversion circuit 107 to implement the functions of the I/V conversion unit 114 and the A/D conversion unit 115, causes the RAM 103 to implement the function of the first accumulation unit 116, and causes the input-output I/F 108 to implement the function of the output unit 119.

In some examples, the processor 100 causes an electric circuit such as an application-specific-integrated-circuit (ASIC) or a field programmable gate array (FPGA) to implement at least part of the functions described above. In some examples, the processor 100 causes multiple functional units to execute at least part of the above-described functions as distributed processing. Alternatively, an external device executes at least part of the above-described functions.

The selection unit 111 selects a VCSEL element to emit light from among the VCSEL elements 11 to 16 included in the VCSEL array 1, and outputs information indicating the selected VCSEL element to the switching unit 113. The number of VCSEL elements included in the VCSEL array 1, i.e., six, is merely an example. The number of VCSEL elements may be any number that is more than one.

The light-source drive unit 112 outputs a drive signal Dr for causing the VCSEL array 1 to emit light to the VCSEL element selected by the selection unit 111 via the switching unit 113.

The switching unit 113 switches between the VCSEL elements so that the drive signal Dr from the light-source drive unit 112 is output to the VCSEL element selected by the selection unit 111.

The I/V conversion unit 114 converts the electrical signal Se output from the photodiode 4 into an analog voltage signal, and outputs the converted voltage signal to the A/D conversion unit 115.

The A/D conversion unit 115 converts the analog voltage signal input from the I/V conversion unit 114 into digital voltage data Da, and then outputs the digital voltage data Da to the first accumulation unit 116.

The first accumulation unit 116 accumulates all the digital voltage data sets Da respectively corresponding to the VCSEL elements, input from the A/D conversion unit 115. The number of digital data sets Da is equal to the number of the VCSEL elements. The first accumulation unit 116 accumulates the digital voltage data sets Da and the VCSEL elements 11 to 16 in association with each other so that the digital voltage data sets Da and the VCSEL elements 11 to 16 can be referred to in the processing by the determination unit 117 and the estimation unit 118.

The determination unit 117 determines whether all the VCSEL elements 11 to 16 are caused to emit light.

For example, the determination unit 117 determines whether all of the VCSEL elements 11 to 16 are caused to emit light based on whether all the digital voltage data sets Da respectively corresponding to the VCSEL elements are accumulated in the first accumulation unit 116.

The estimation unit 118 calculates the line-of-sight direction information Ed using the digital voltage data Da stored in the first accumulation unit 116 and a previously created estimation model. The estimation unit 118 outputs the calculated line-of-sight direction information Ed to an external device through the output unit 119.

Processing Example by Processor 100

Figure 7:
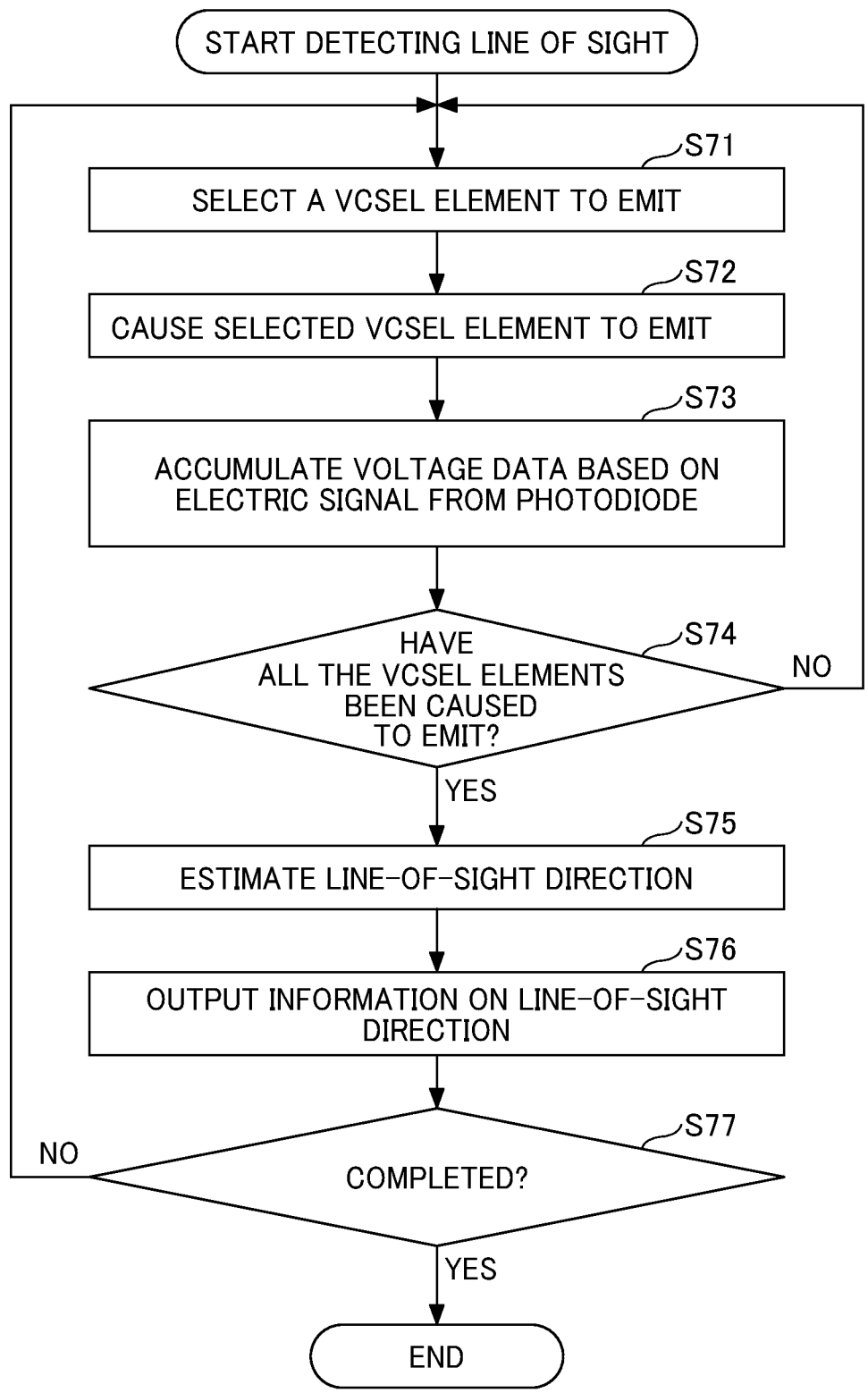
FIG. 7 is a flowchart of processing of the processor in FIG. 6.

FIG. 7 is a flowchart of processing performed by the processor 100, according to an embodiment. The processor 100 starts the process in FIG. 7 in response to, for example, a start operation input signal by a user of the line-of-sight detection device 10 (hereinafter simply referred to as a user).

In step S71, the processor 100 causes the selection unit 111 to select a VCSEL element to emit light from among the VCSEL elements 11 to 16 and outputs information indicating the selected VCSEL element to the switching unit 113.

Subsequently, in step S72, the processor 100 causes the light-source driving unit 112 to output a drive signal Dr to the selected VCSEL device through the switching unit 113. The VCSEL device to which the drive signal Dr is applied emits the laser bream L1 in accordance with the drive signal Dr. The laser beam L1 reflected off eyeball 30 strikes on the photodiode 4 as a laser beam L4 after passing through the lens 2 and reflecting off the concave mirror 3. The photodiode 4 outputs an electrical signal Se according to the light intensity of the laser beam L4 received, to the processor 100.

Subsequently, in step S73, the processor 100 converts the electrical signal Se into an analog voltage signal by the I/V conversion unit 114, and then converts the analog voltage signal into the digital voltage signal Da by the A/D conversion unit 115. The processor 100 causes the first accumulation unit 116 to accumulate the digital voltage data Da in association with the VCSEL element that has emitted light.

Subsequently, in step S74, the processor 100 causes the determination unit 117 to determine whether all the VCSEL elements 11 to 16 are caused to emit light.

In step S74, when the determination unit 117 determines that all the VCSEL elements 11 to 16 are not caused to emit light (NO in step S74), the processor 100 performs the processes in step S71 and the subsequent steps again. In this case, the processor 100 causes the selection unit 111 to select a VCSEL element that has not yet emitted light, and causes the selected VCSEL element to emit light.

When the determination unit 117 determines that all the VCSEL elements 11 to 16 are caused to emit light (YES in step S74), the processor 100 causes the estimation unit 118 to obtain the line-of-sight direction information Ed by calculation using six digital voltage data sets Da corresponding to the VCSEL elements 11 to 16 accumulated in the first accumulation unit 116 and an estimation model created in advance in step S75.

Subsequently, in step S76, the processor 100 outputs the line-of-sight direction information Ed obtained by the estimation unit 118 to the external device via the output unit 119.

Subsequently, in step S77, the processor 100 determines whether or not to end the processing in FIG. 7. For example, the processor 100 determines whether or not to end the processing in response to an end operation input signal or the like by the user.

When the processor 100 determines to end the process (YES in step S77), processor 100 ends the processing. When the processor 100 determines to not end the process (NO in step S77), the processor 100 performs the processes in step S71 and the subsequent steps again.

Through the processing in FIG. 7, the processor 100 outputs the line-of-sight direction information Ed based on the degree of inclination of the eyeball 30.

Example Estimation Model by Estimation Unit 118

The following describes an estimation model used in the estimation calculation by the estimation unit 118.

The estimation model is created by, for example, canonical correlation analysis (see, for example, Non-Patent Document, Akaho Shotaro, "Journal of the Japanese Institute of Neural Circuits", Vol. 20, No. 2 (2013), p. 62-72).

The canonical correlation analysis, which is a kind of a multivariate analysis, is a method of extracting a common component from two sets of high-dimensional data x and y. For example, assuming that the high-dimensional data x is the line-of-sight direction data and the high-dimensional data y is the digital voltage data Da, the high-dimensional data x and the digital voltage data y can be given by the following equations (1) and (2).

[Equation 1]

$$x = (\theta_x, \theta_z)^T \quad (1)$$

[Equation 2]

$$y = (P_1, P_2, \ldots, P_6)^T \quad (2)$$

In Equations (1) and (2), $\theta x$ is the horizontal line-of-sight direction (degrees), and $Oz$ is the vertical line-of-sight direction (degrees). Symbols P1 to P6 are digital voltage values Da corresponding to the respective light emitters. Further, x is two-dimensional data, and y is six-dimensional data.

The estimation unit 118 calculates scalar quantities u and v represented by the following equation (3) by performing an inner product operation on linear transformation vectors a and b with respect to two sets of high-dimensional data x and y. The number of dimensions of the linear transformation vector a is equal to the number of dimensions of the high-dimensional data x, and the number of dimensions of the linear transformation vector b is equal to the number of dimensions of the high-dimensional data y.

[Equation 3]

$$u(x) = a^T x, \ v(y) = b^T y \quad (3)$$

In Equation (3), the linear conversion vectors a and b are obtained to allow larger correlation coefficients of the scalar quantities u and v. The estimation unit 118 obtains the scalars u and v in the order of the largest correlation coefficient, the second largest correlation coefficient, and the third largest correlation coefficient.

The maximum number of sets of the scalar quantities u and v that can be obtained by the canonical correlation analysis is equal to the number of dimensions of data having a smaller number of dimensions among the original high-dimensional data. For example, as a result of analyzing the high-dimensional data represented by Equations (1) and (2) by the canonical correlation analysis, two sets of scalar quantities u and v are obtained.

Since there is a strong correlation between the scalar quantities u and v obtained by the canonical correlation analysis, the relation between the scalar quantities u and v can be approximated by a linear curve represented by Equation (4).

[Equation 4]

$$u = cv + d \quad (4)$$

The coefficients c and d in Equation (4) can be obtained by, for example, the least square method.

If two sets of the scalar quantities u and v represented by Equation (4) can be obtained by the canonical correlation analysis, the estimation unit 118 can calculate the estimated value of the line-of-sight direction by substituting the high-dimensional data y corresponding to each VCSEL element into the following simultaneous equations.

[Equation 5]

$$\begin{cases} a_1^T x = c_1 b_1^T y + d_1 \\ a_2^T x = c_2 b_2^T y + d_2 \end{cases} \quad (5)$$

The subscript of each variable in equation (5) is a variable corresponding to the correlation coefficient obtained by the canonical correlation analysis. For example, the linear transformation vectors corresponding to the correlation variables with the largest values can be represented as a1 and b1, and the linear approximation parameters of the scalars u and v can be represented as c1 and d1.

Also, the linear transformation vectors corresponding to the second largest correlation variable can be expressed as a2 and b2, and the linear approximation parameters of the scalars u and v can be expressed as c2 and d2.

Equation (5) is a mathematical expression representing an estimation model. When the digital voltage data Da corresponding to the high-dimensional data y is obtained, the estimation unit 118 can estimate the high-dimensional data x corresponding to the line-of-sight direction information Ed by substituting the digital voltage data Da into Equation (5).

In order to construct the estimation model by the canonical correlation analysis, sample data of the high-dimensional data x and y is created in advance before executing the estimation calculation of the line-of-sight direction. The sample data may be obtained by an experiment or may be obtained by an optical simulation.

As the number of sample data increases, the estimation accuracy by the estimation model is improved. In addition, in order to deal with individual differences of the eyeballs 30, multiple estimation models are created in advance, and an estimation model having the highest accuracy is selected or an estimation model is created for each eyeball 30, thereby improving estimation accuracy.

Simulation Result Example of Incident Position of Laser Beam L4 on Light-Receiving Surface 41

With reference to FIGS. 8 to 14, a description will be given of the optical simulation results indicating the incident positions of the laser beams L4 on the light-receiving surface 41 of the photodiode 4 after being emitted from the VCSEL array 1 and reflected off eyeball 30.

Figure 8:
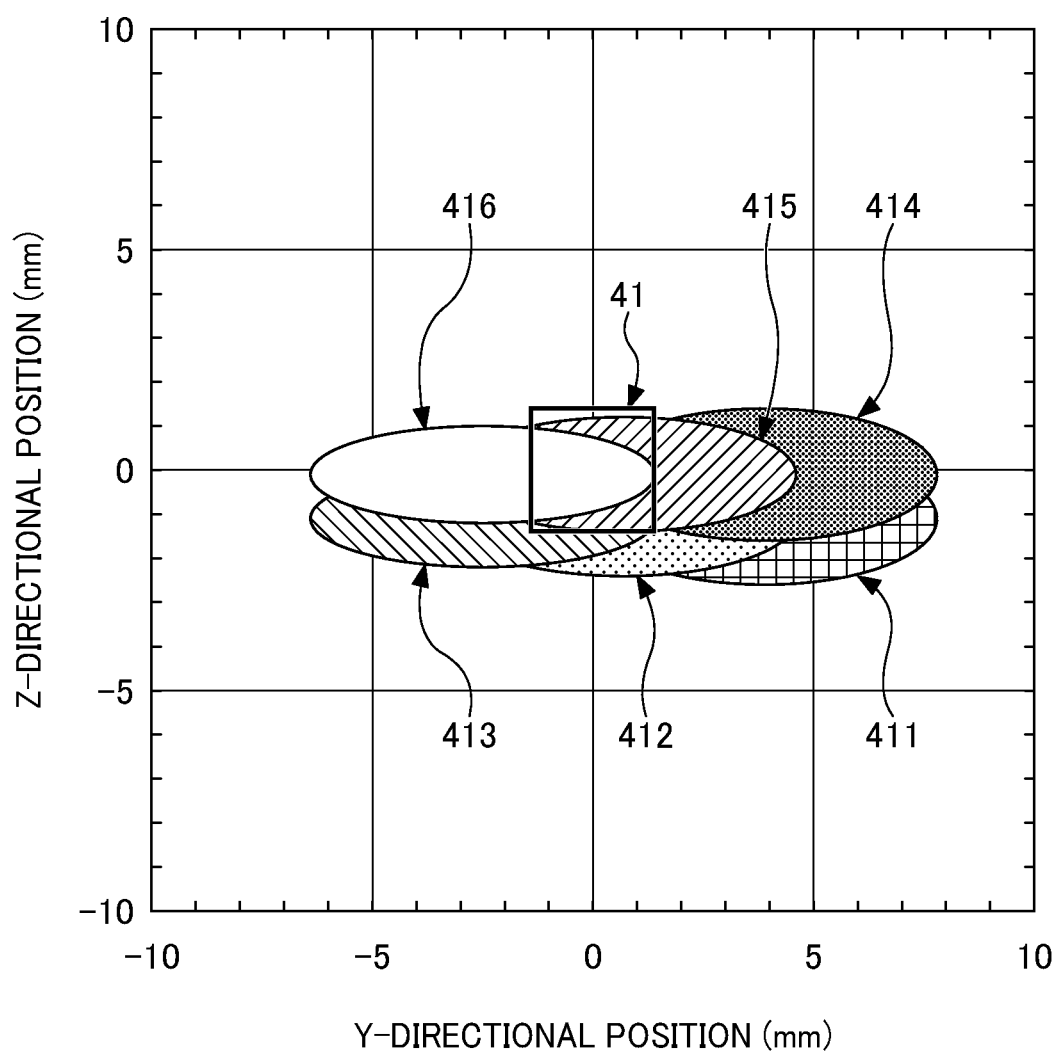
FIG. 8 is a first diagram of the position of a laser beam reflected off the eyeball after being emitted from the VCSEL array in FIG. 2.

FIG. 8 is a graph of incident positions of laser beams L4 striking on the light-receiving surface 41 after being emitted from all of the VCSEL elements 11 to 16 included in the VCSEL array 1. FIGS. 9 to 14 indicate the respective incident positions of the laser beams L4 emitted from the VCSEL elements 11 to 16.

Figure 9:
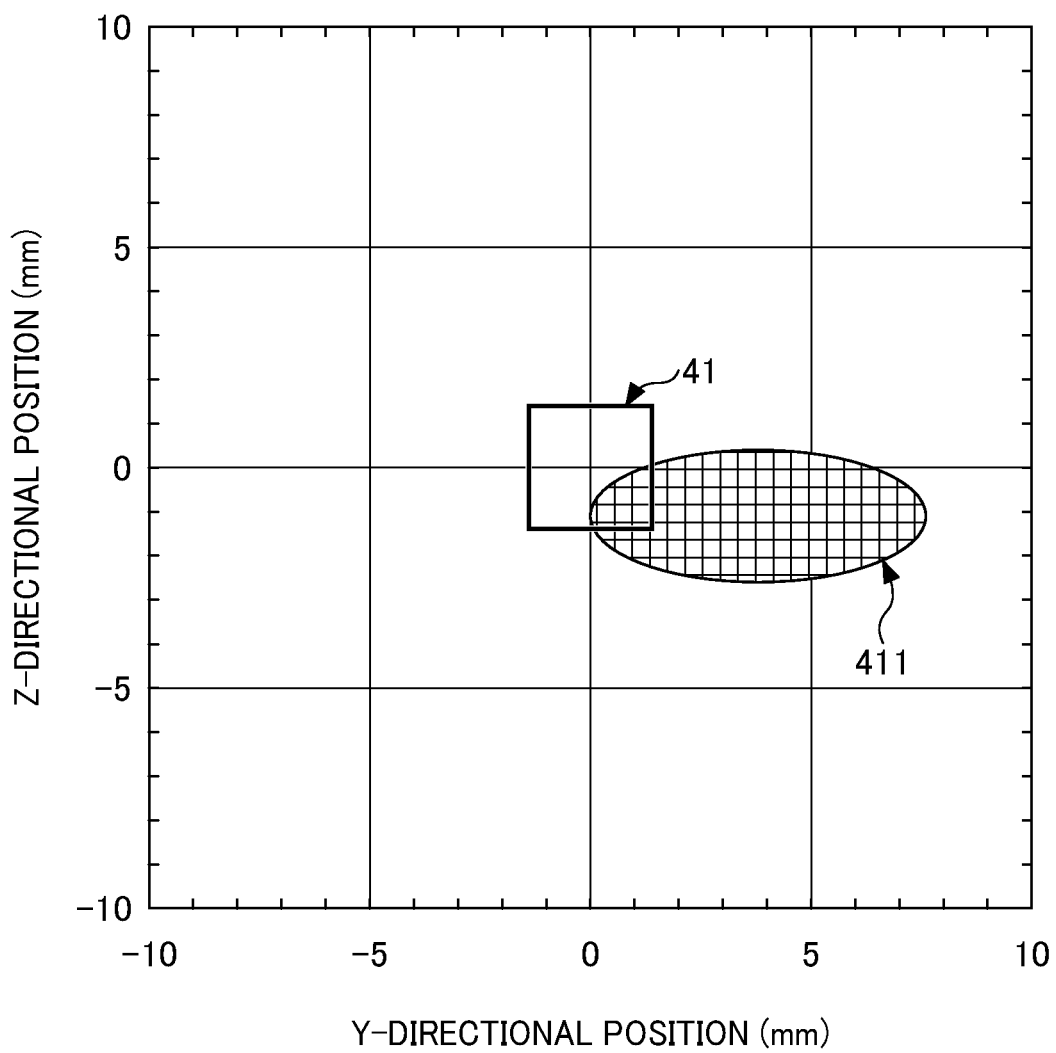
FIG. 9 is a second diagram of the position of a laser beam reflected off the eyeball after being emitted from the VCSEL array in FIG. 2.
Figure 10:
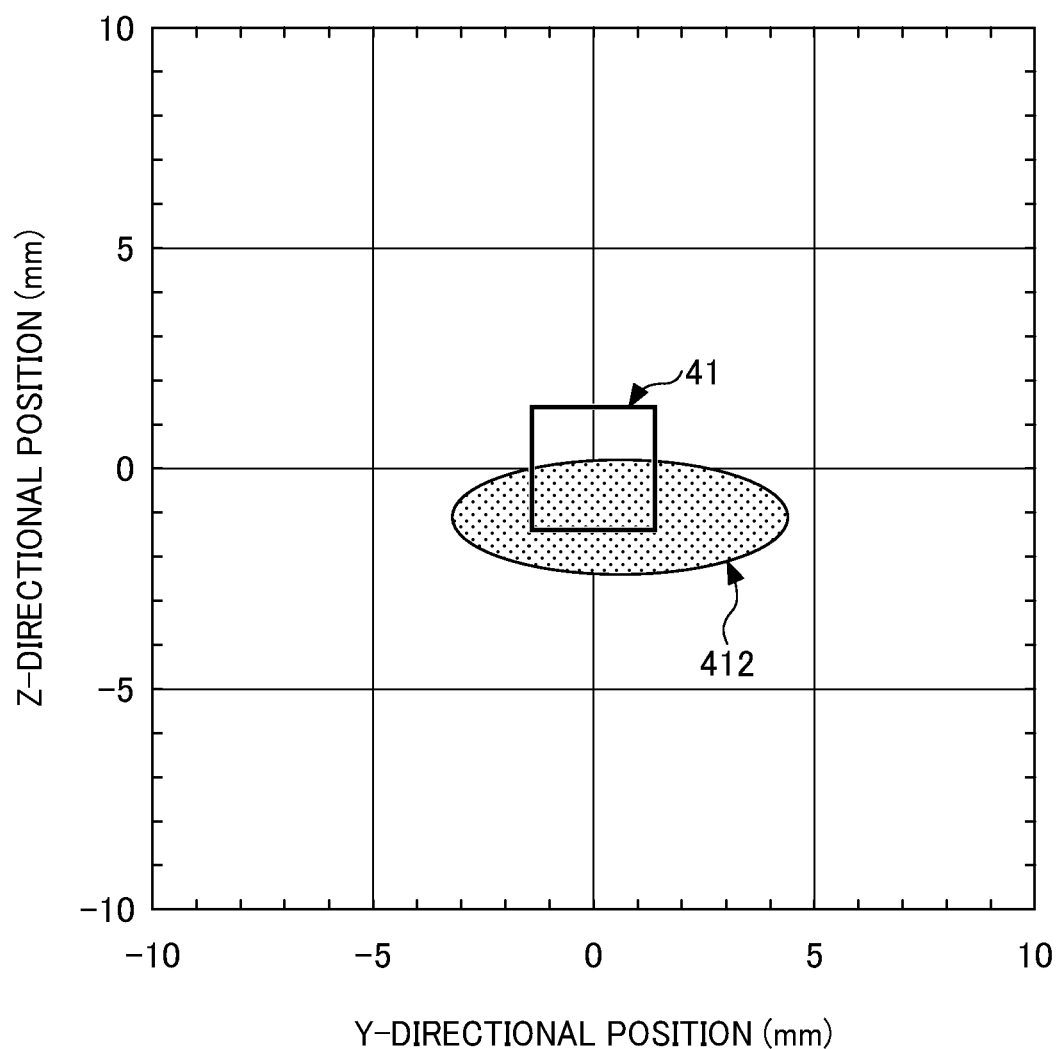
FIG. 10 is a third diagram of the position of a laser beam reflected off the eyeball after being emitted from the VCSEL array in FIG. 2.
Figure 11:
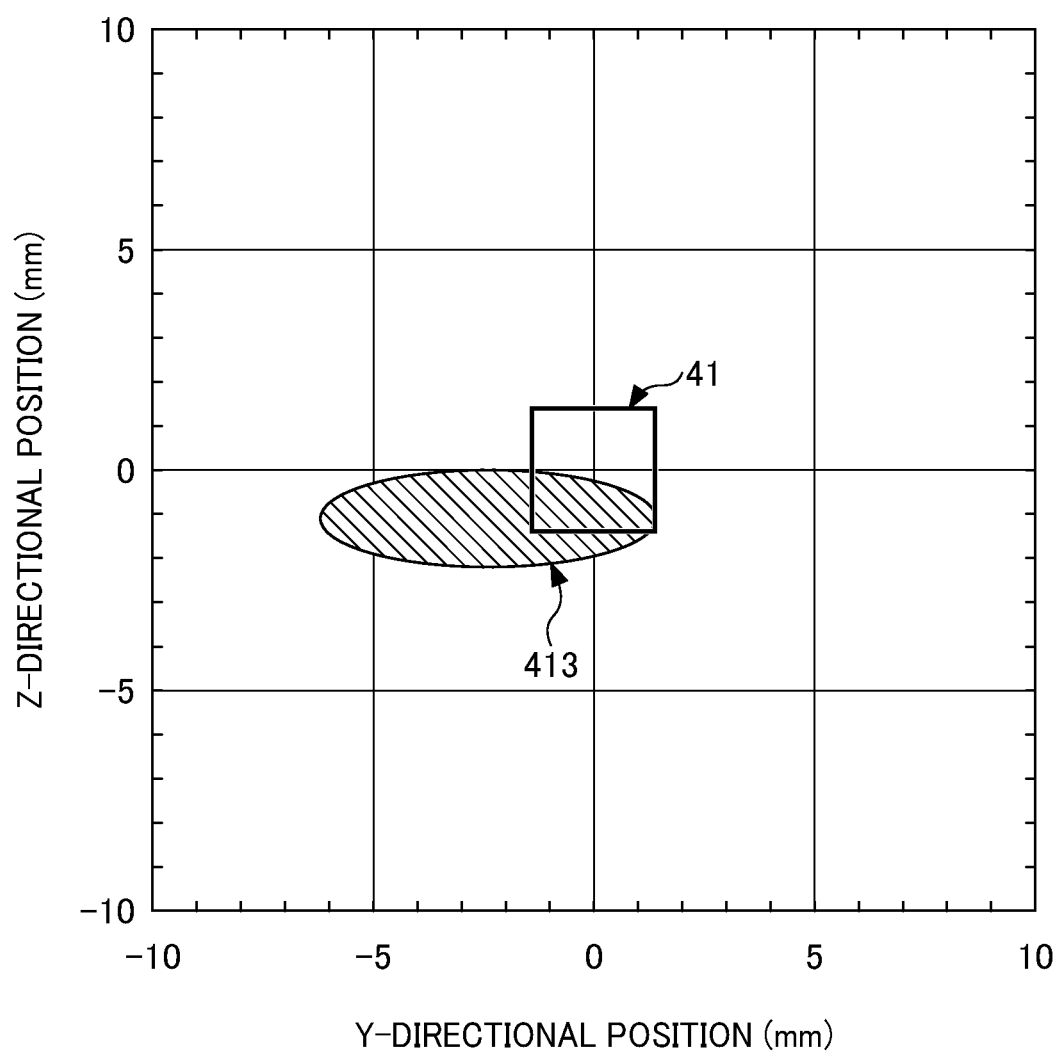
FIG. 11 is a fourth diagram of the position of a laser beam reflected off the eyeball after being emitted from the VCSEL array in FIG. 2.
Figure 12:
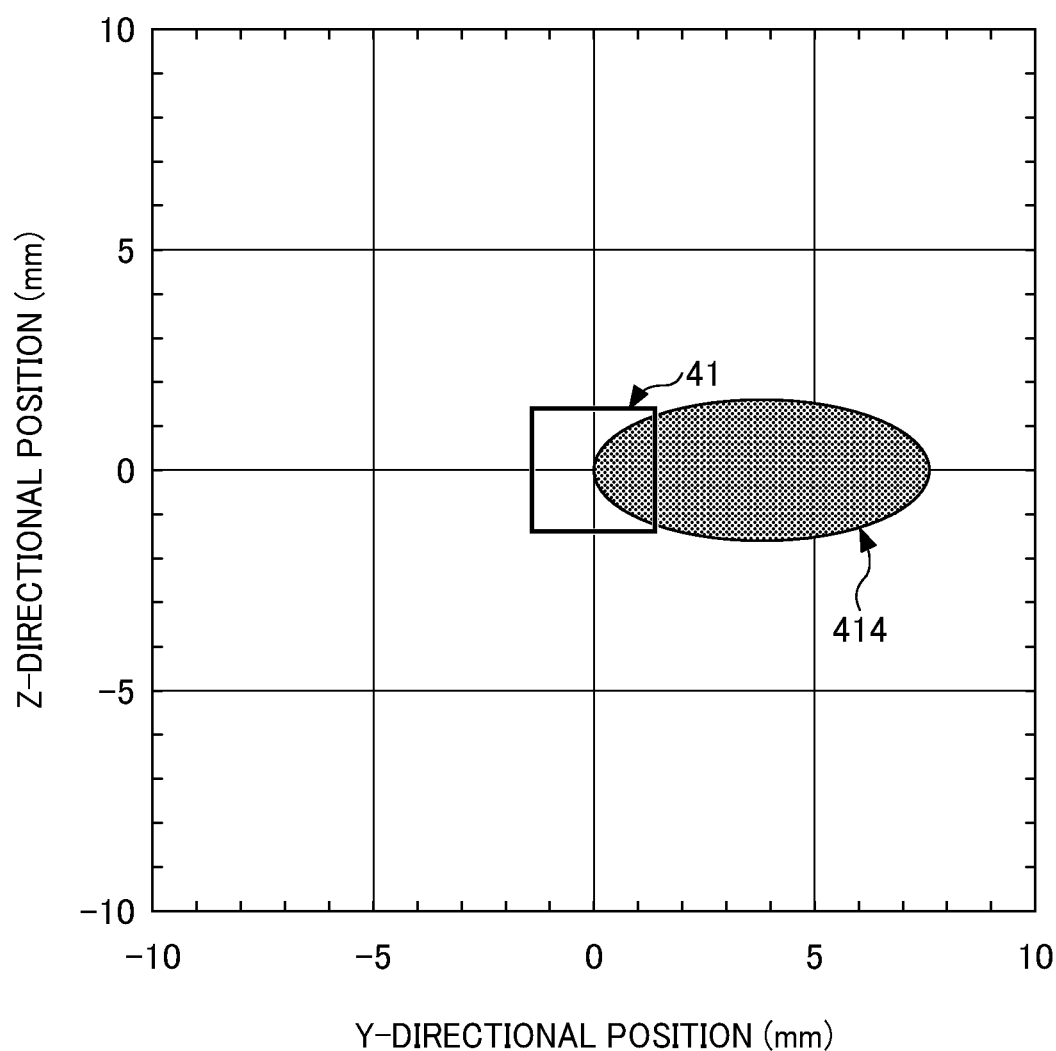
FIG. 12 is a fifth diagram of the position of a laser beam reflected off the eyeball after being emitted from the VCSEL array in FIG. 2.
Figure 13:
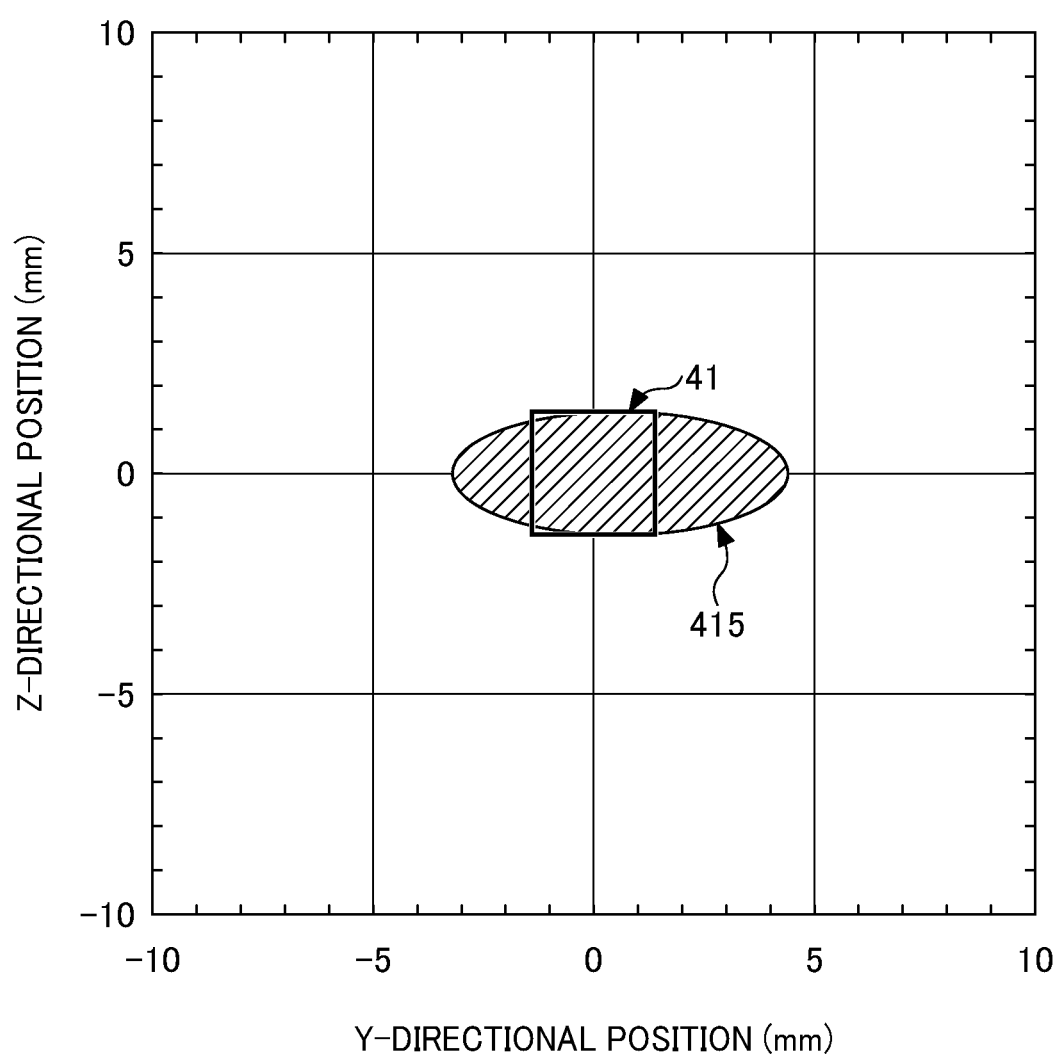
FIG. 13 is a sixth diagram of the position of a laser beam reflected off the eyeball after being emitted from the VCSEL array in FIG. 2.
Figure 14:
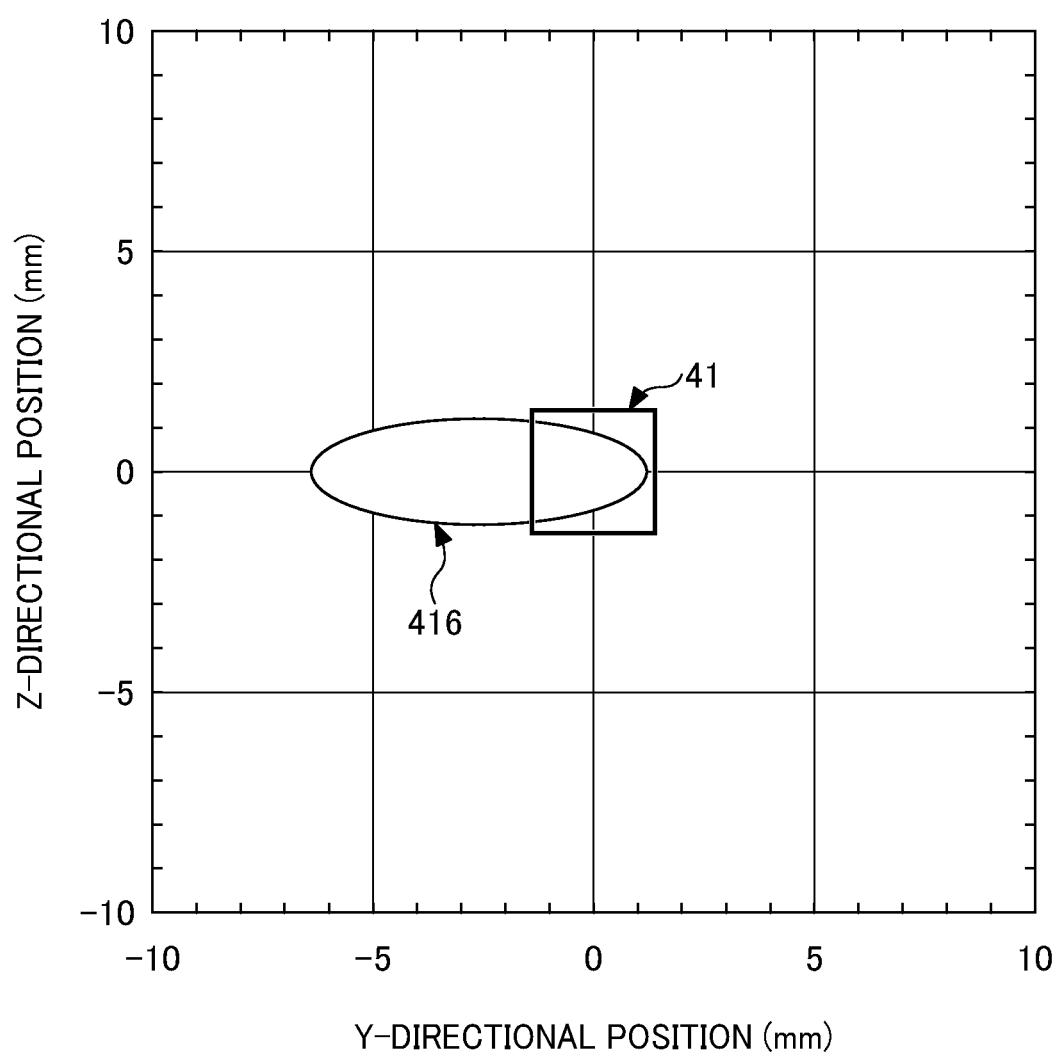
FIG. 14 is a seventh diagram of the position of a laser beam reflected off the eyeball after being emitted from the VCSEL array in FIG. 2.

FIG. 9 is a graph of the incident position of laser beams L4 on the light-receiving surface 41 after being emitted from the VCSEL element 11. FIG. 10 is a graph of the incident position of laser beams L4 on the light-receiving surface 41 after being emitted from the VCSEL element 12. FIG. 11 is a graph of the incident position of laser beams L4 on the light-receiving surface 41 after being emitted from the VCSEL element 13. FIG. 12 is a graph of the incident position of laser beams L4 on the light-receiving surface 41 after being emitted from the VCSEL element 14. FIG. 13 is a graph of the incident position of laser beams L4 on the light-receiving surface 41 after being emitted from the VCSEL element 15. FIG. 14 is a graph of the incident position of laser beams L4 on the light-receiving surface 41 after being emitted from the VCSEL element 16.

In FIGS. 8 to 14, the horizontal axis represents a Y-directional position (mm) in the Y-direction, and the vertical axis represents a Z-directional position (mm) in the Z-direction. In this optical simulation, the line-of-sight direction of the eyeball 30 is the direction in which the subject is facing forward where $\theta x$ is 0 ($\theta x=0$ degree) and $\theta z$ is 0 ($\theta z=0$ degree).

The center of the light-receiving surface 41 of the photodiode 4 represented by a square frame is located at a position of 0 mm in the Y-direction and a position of 0 mm in the Z-direction. Spots 411 to 416 represent beam spots of the laser beams L4 that have reached the vicinity of the light-receiving surface 41 after being emitted from the VCSEL elements 11 to 16.

The spots 411, 412, 413, 414, 415, and 416 represent beam spots based on the laser beams L emitted from the VCSEL element 11, the VCSEL element 12, the VCSEL element 13, the VCSEL element 14, the VCSEL element 15, and the VCSEL element 16, respectively.

As illustrated in FIGS. 8 to 14, a part of each of the spots 411 to 416 strikes on the light-receiving surface 41. This demonstrates that in the line-of-sight detection device 10, the laser beams L4 reflected off eyeball 30 after being emitted from the VCSEL elements 11 to 16 in the VCSEL array 1 can strike on the light-receiving surface 41.

The distance d (i.e., the center-to-center distance d) between adjacent spots all satisfies the following equation.

$$|h-w/2| \leq d \leq h+w/2$$

In FIGS. 8 to 14, a part of each of the spots 411 to 416 strikes on the light-receiving surface 41. In some examples, at least one entire spot of the spots 411 to 416 strikes on the light-receiving surface 41, which exhibits the intended operational effects of the line-of-sight detection device 10. In some other examples, at least two or more spots of the spots 411 to 416 strike on the light-receiving surface 41, which also exhibits the intended operational effects of the line-of-sight detection device 10.

Simulation of Detection of Line-of-Sight Direction

The following describes a method for simulating (hereinafter, referred to simply as a simulation method) detection of line-of-sight direction by the line-of-sight detection device 10.

Simulation Method

First, the light-intensity data samples corresponding to the VCSEL elements of the VCSEL array 1 are acquired for 61 line-of-sight data sets each indicating a prescribed line-of-sight direction where the degree of the inclination of the eyeball 30 ranges from −4 or greater and 4 or less (degrees) ($-4 \leq \theta x \leq 4$) and also ranges from −4 or greater and 4 or less (degrees) ($-4 \leq \theta y \leq 4$). Based on the samples acquired, an estimation model was created using canonical correlation analysis.

Next, a light-intensity data set for each of the 60 line-of-sight data sets that were not used in the creation of the estimation model were substituted into the created estimation model to obtain the estimated value of the line-of-sight data.

Then, the estimated value was compared with the correct value of the line-of-sight data.

Simulation Results

Figure 15:
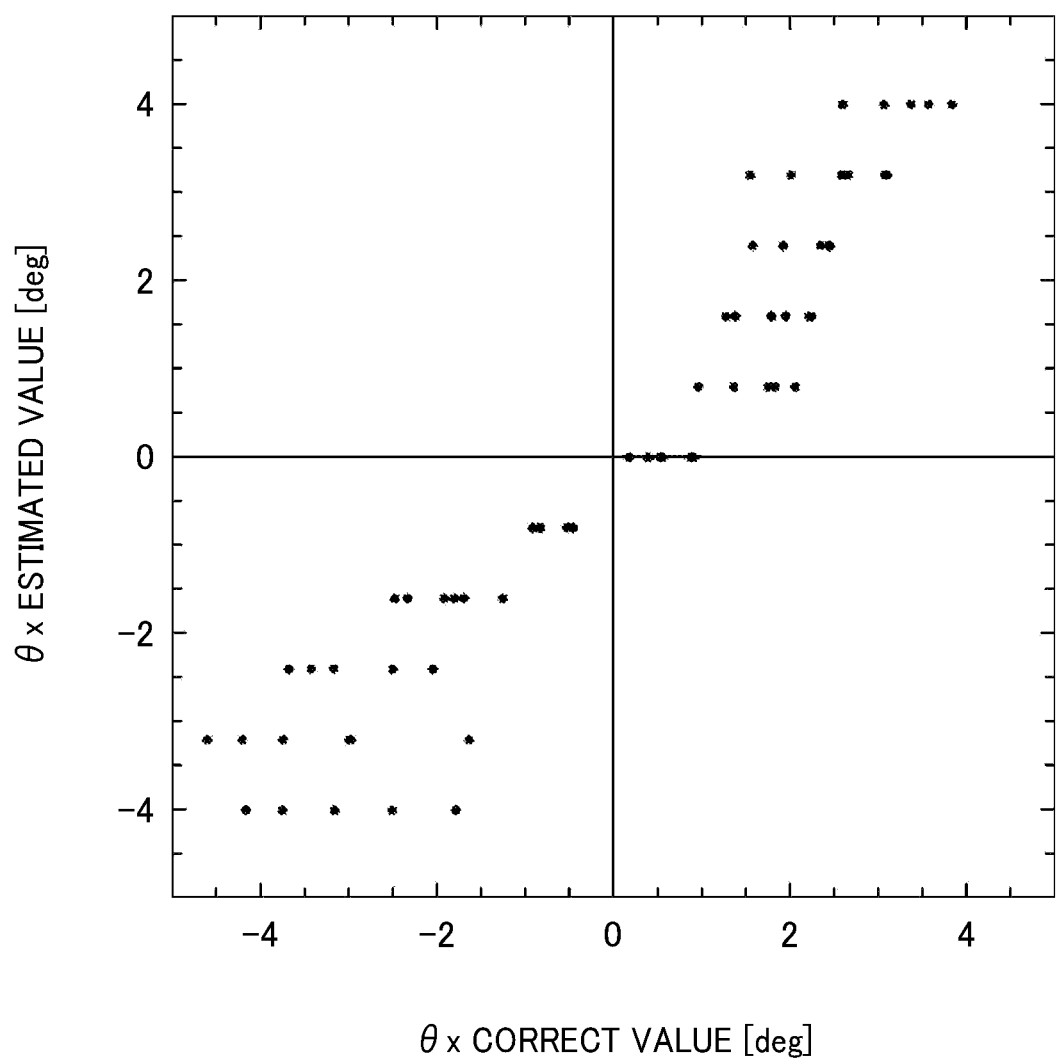
FIG. 15 is a first graph presenting simulation results of line-of-sight direction detection according to the first embodiment.
Figure 16:
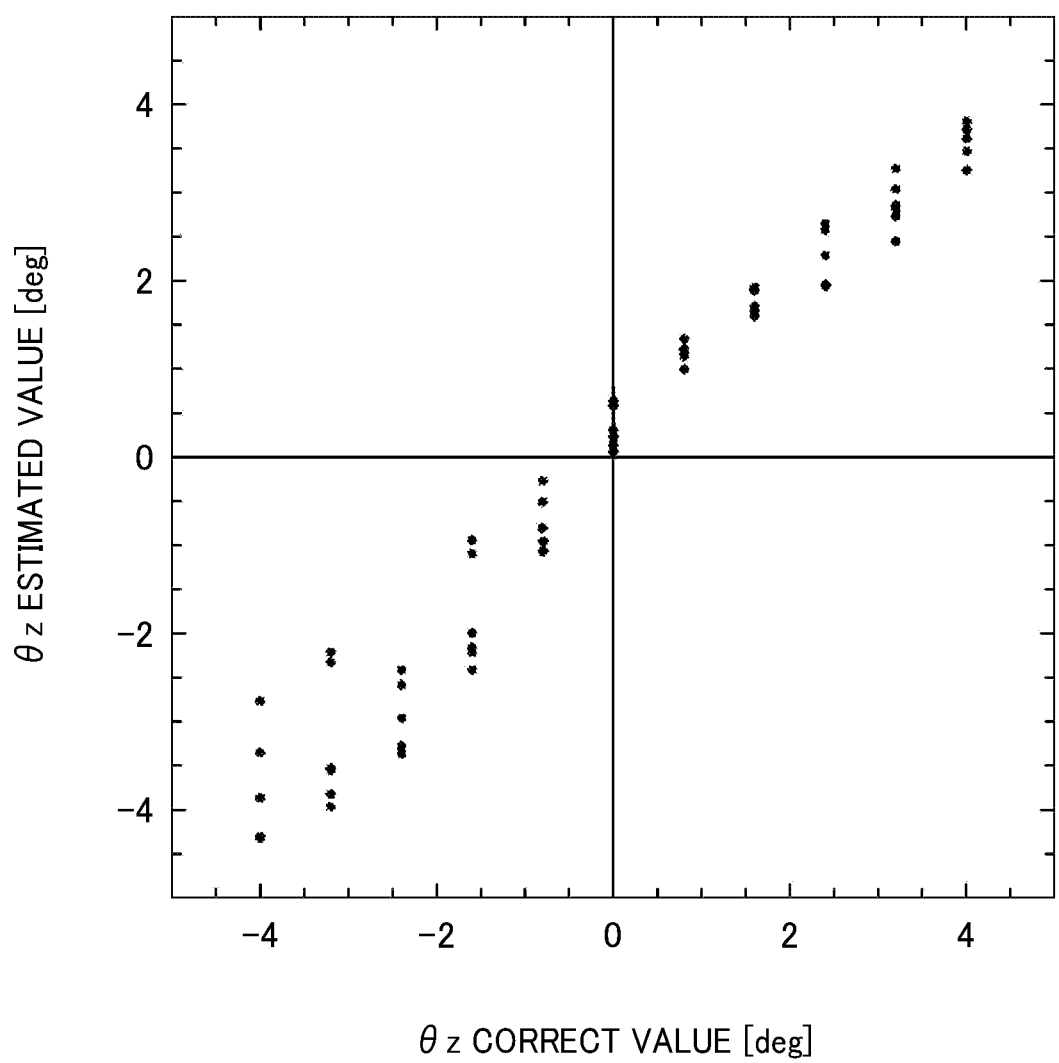
FIG. 16 is a second graph presenting simulation results of line-of-sight direction detection according to the first embodiment

FIGS. 15 and 16 are graphs presenting simulation results for line-of-sight direction detection by the line-of-sight detection device 10. FIG. 15 is a graph presenting simulation results for the line-of-sight direction $\theta x$ in the X-direction (i.e., the horizontal direction). FIG. 16 is a graph presenting simulation results for the line-of-sight direction $\theta z$ in the Z-direction (i.e., the vertical direction). In FIGS. 15 and 16, the horizontal axis represents the correct value of the line-of-sight direction, and the vertical axis represents the estimated value by the estimation unit 118.

As presented in FIGS. 15 and 16, it was found that there is a correlation between the correct value and the estimated value. The root mean square error (RMSE) $\Delta\theta x$ of the line-of-sight direction estimation results in the horizontal direction was 0.8 degrees, and the RMSE Δθz of the line-of-sight direction estimation results in the vertical direction was 0.6 degrees.

From the simulation results in FIGS. 15 and 16, it was found that the line-of-sight detection device 10 can estimate the line-of-sight direction based on the electrical signals Se output from the photodiode 4 and acquire the line-of-sight direction information Ed.

COMPARATIVE EXAMPLE AND MODIFICATION EXAMPLE

Comparative Example

Figure 17:
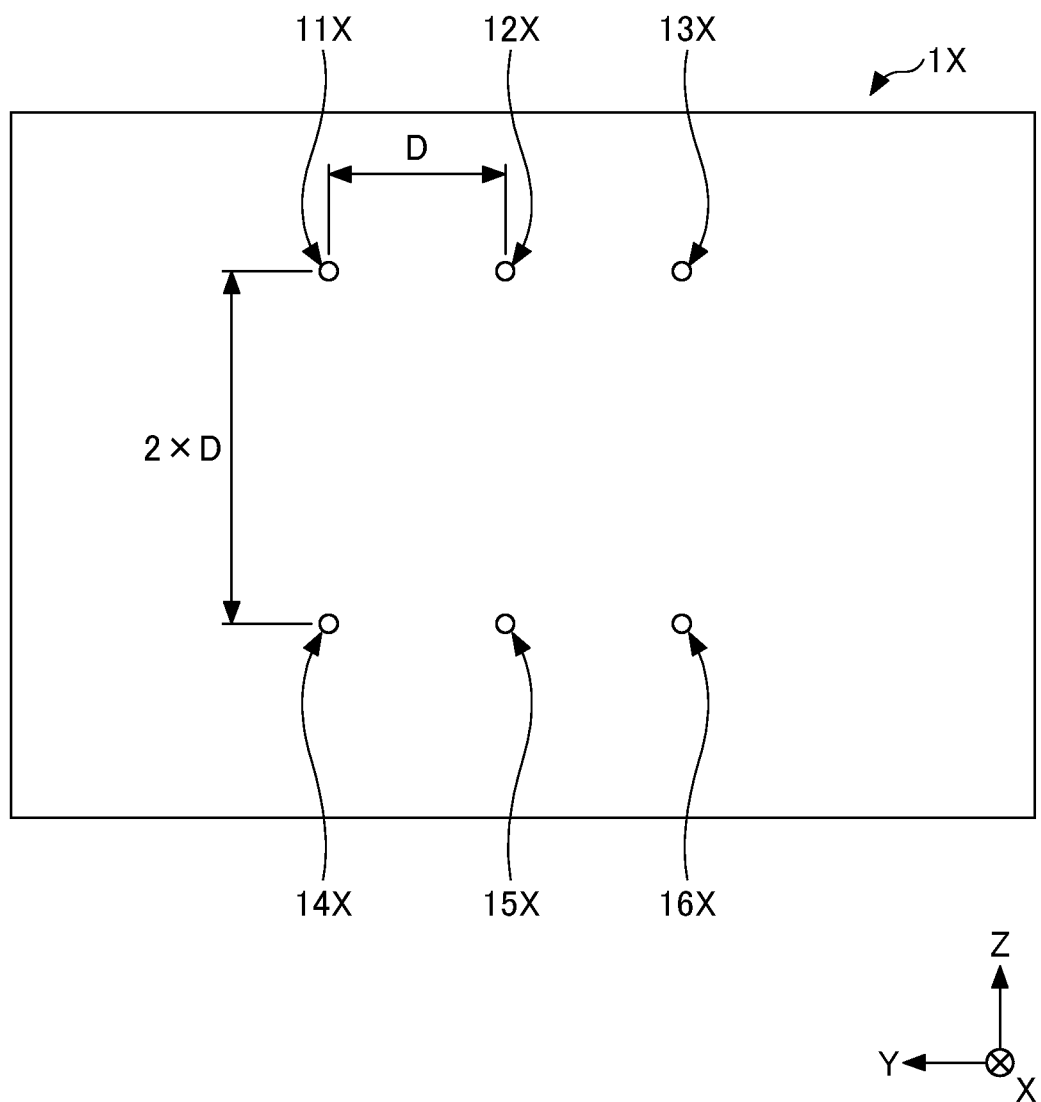
FIG. 17 is an illustration of an arrangement of a VCSEL array according to a comparative example.

FIG. 17 is an illustration of arrangement of VCSEL elements 11X to 16X included in a VCSEL array 1X according to a comparative example. This comparative example differs from at least one embodiment of the present disclosure in the arrangement of the VCSEL elements 11X to 16X and the divergence angle of each laser beam L4 striking on the photodiode 4.

Specifically, in the comparative example as illustrated in FIG. 17, a distance D is an interval between adjacent VCSEL elements of the VCSEL elements 11X to 16X in the Y-direction. Each distance between the VCSEL element 11X and the VCSEL element 14X; between the VCSEL element 12X and the VCSEL element 15X; and the VCSEL elements 13X and the VCSEL elements 16X in the Z-direction is twice the distance D.

In the comparative example, the divergence angle of each laser beam L4 striking on the photodiode 4 in the arrangement of the VCSEL array 1X as illustrated in FIG. 17 is smaller than the divergence angle φ according to an embodiment of the present disclosure.

In the comparative example, one light beam alone among multiple light beams L emitted from the VCSEL elements strikes on the light-receiving surface 41 after reflecting off the eyeball 30. In other words, in the comparative example, the photodiode 4 fails to receive multiple laser beams L4 reflected off eyeball 30 after being emitted from the multiple VCSEL elements.

Figure 18:
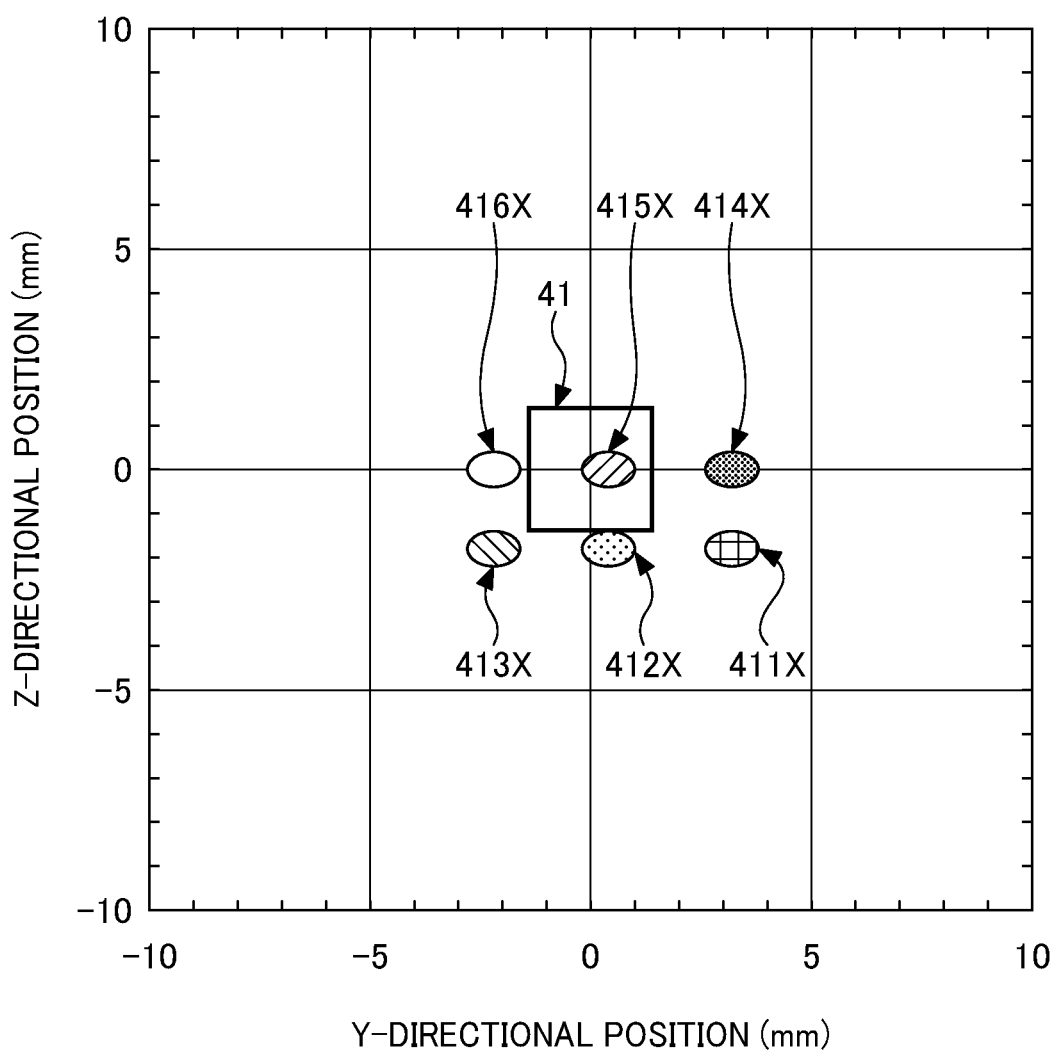
FIG. 18 is a diagram of the positions of the laser beams reflected off the eyeball after being emitted from the VCSEL array in FIG. 17.

FIG. 18 is a graph of optically simulated incident positions of laser beams L4 striking on the light-receiving surface 41 after being emitted from all of the VCSEL elements 11X to 16X included in the VCSEL array 1X.

Similarly to FIG. 8 described above, the horizontal axis represents the Y-directional position (mm) in the Y-direction, and the vertical axis represents the Z-directional position (mm) in the Z-direction. The line-of-sight direction of the eyeball 30 was the direction in which the subject is facing forward where θx is 0 (θx=0 degree) and θz is 0 (θz=0 degree).

In FIG. 18, the center of the light-receiving surface 41 of the photodiode 4 represented by a square frame is located at a position of 0 mm in the Y-direction and a position of 0 mm in the Z-direction. Spots 411X to 416X represent beam spots of the laser beams L4 that have reached the vicinity of the light-receiving surface 41 after being emitted from the VCSEL elements 11X to 16X and reflected off the eyeball 30.

The spots 411X, 412X, 413X, 414X, 415X, and 416X represent beam spots based on the laser beams L emitted from the VCSEL element 11X, the VCSEL element 12X, the VCSEL element 13X, the VCSEL element 14X, the VCSEL element 15X, and the VCSEL element 16X, respectively.

In the optical simulation according to the comparative example illustrated in FIG. 18, only the spot 415X out of the spots 411X to 416X strikes on the light-receiving surface 41.

Figure 19:
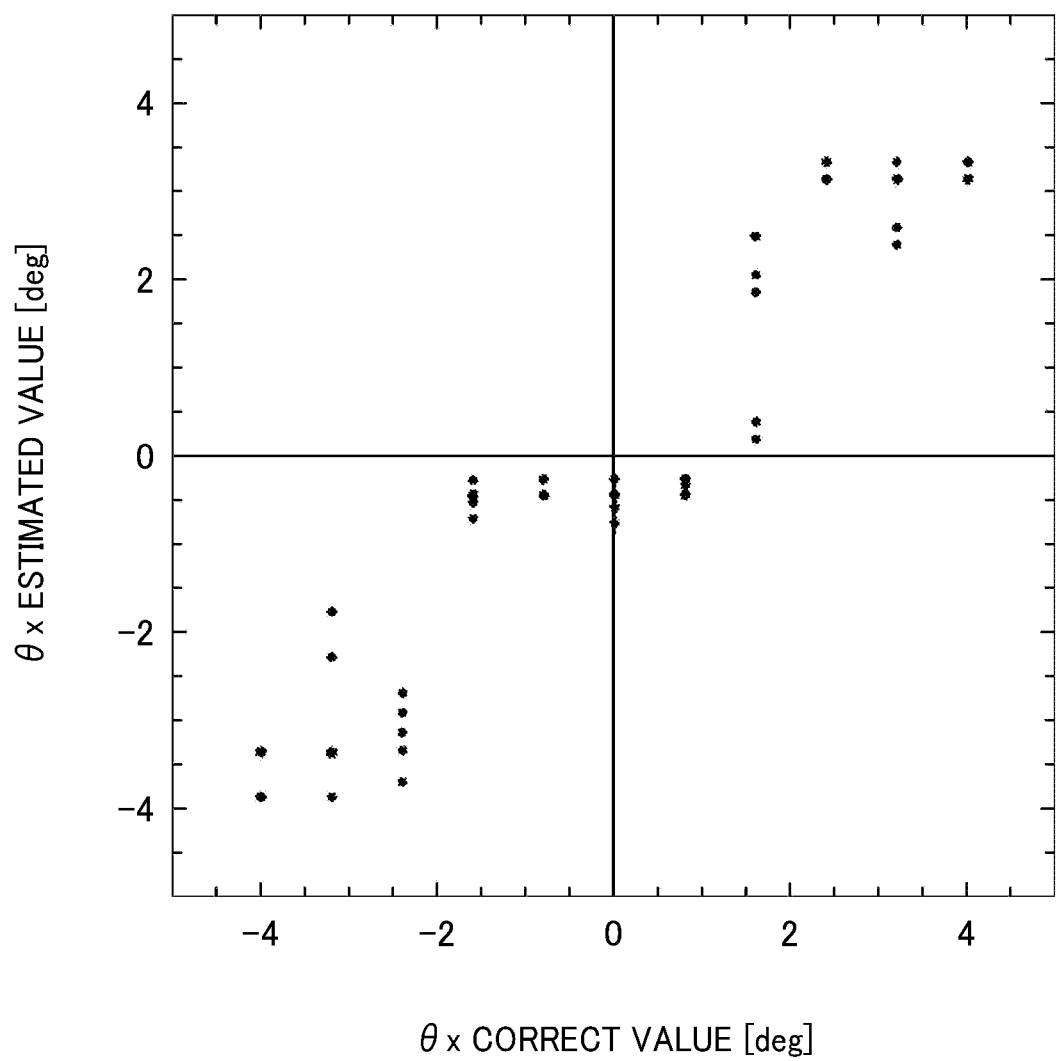
FIG. 19 is a first graph presenting simulation results of line-of-sight direction detection according to a comparative example.
Figure 20:
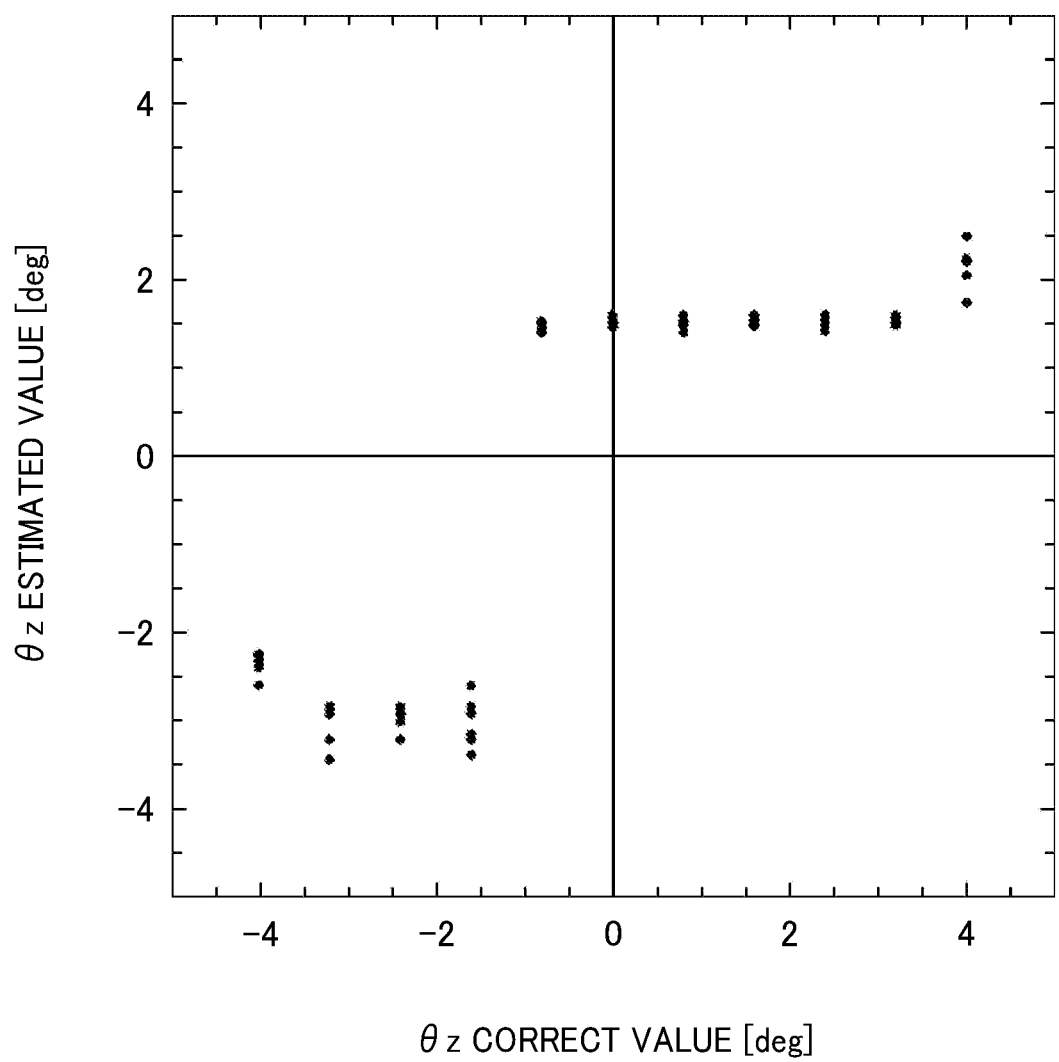
FIG. 20 is a second graph presenting simulation results of line-of-sight direction detection according to the comparative example.

FIGS. 19 and 20 are graphs presenting simulation results for line-of-sight direction detection according to a comparative example. FIG. 19 is a graph presenting simulation results for the line-of-sight direction ex in the X-direction. FIG. 20 is a graph presenting simulation results for the line-of-sight direction Oz in the Z-direction.

FIGS. 19 and 20 are viewed in the same manner as in FIGS. 15 and 16 described above, and the simulation method is also the same as the method for obtaining FIGS. 15 and 16 described above.

As presented in FIGS. 19 and 20, in the comparative example, a high correlation between the correct value and the estimated value was not obtained unlike the embodiment of the present disclosure. Particularly for the line-of-sight direction Oz in the Z-direction as illustrated in FIG. 20, the correlation between the correct value and the estimated value was low.

From the simulation results in FIGS. 19 and 20, it was found that in the comparative example, the line-of-sight direction cannot be accurately estimated based on the electrical signals Se output from the photodiode 4.

Modification

Figure 21:
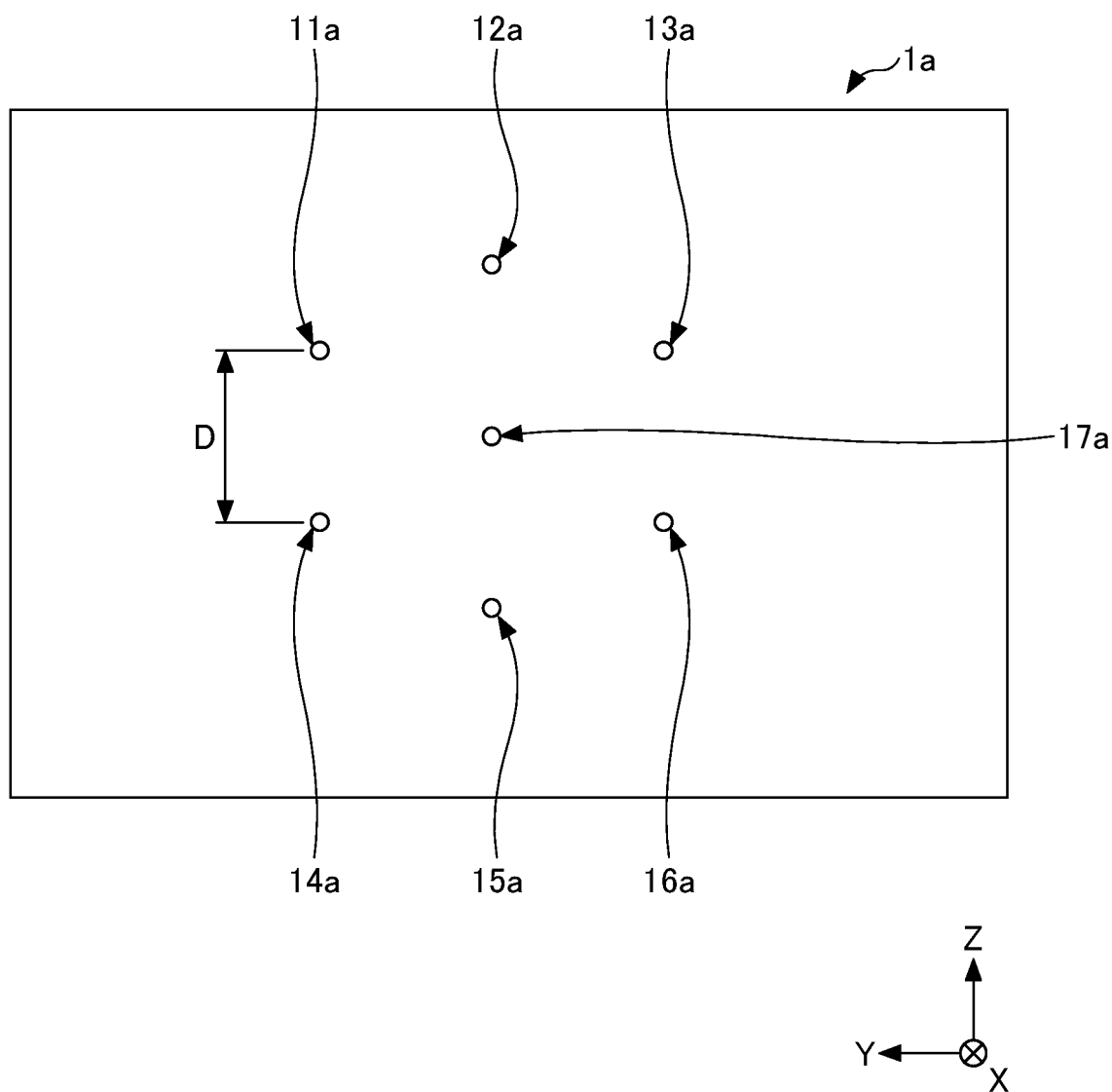
FIG. 21 is an illustration of an arrangement of a VCSEL array according to a modified example of an embodiment

FIG. 21 is an illustration of an arrangement of VCSEL elements 11a to 17a included in a VCSEL array 1a according to a modification of an embodiment of the present disclosure. The modified example in FIG. 21 differs from the first embodiment only in the arrangement of the VCSEL elements 11a to 17a.

Specifically, in the modified example, the VCSEL elements 11a to 17a are arranged in a hexagonal close-packed state in a plan view viewed in the −X-direction. Among the VCSEL elements 11a to 17a, the interval between adjacent VCSEL elements is the interval D.

Such an arrangement according to the modification of an embodiment also enables the photodiode 4 to receive multiple laser beams L4 reflected off the eyeball 30 after being emitted from multiple VCSEL elements of the VCSEL elements 11a to 17a.

Figure 22:
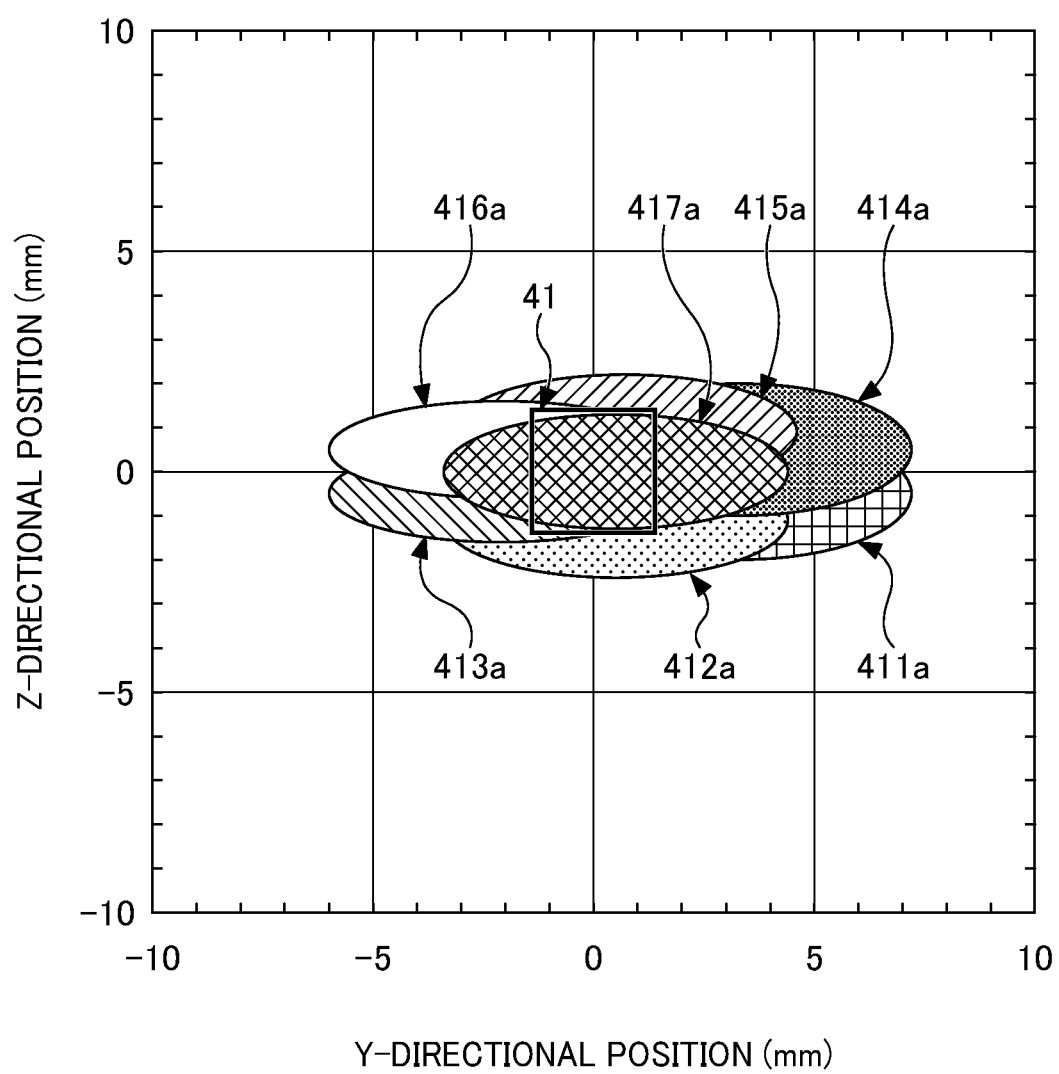
FIG. 22 is a first diagram of the position of a laser beam reflected off the eyeball after being emitted from the VCSEL array in FIG. 21.

FIG. 22 is a graph of optically simulated incident positions of laser beams L4 striking on the light-receiving surface 41 after being emitted from all of the VCSEL elements 11a to 17a included in the VCSEL array 1a. FIGS. 23 to 29 are graphs presenting the incident positions of the laser beams L4 emitted from the VCSEL elements 11a to 17a, respectively.

Figure 23:
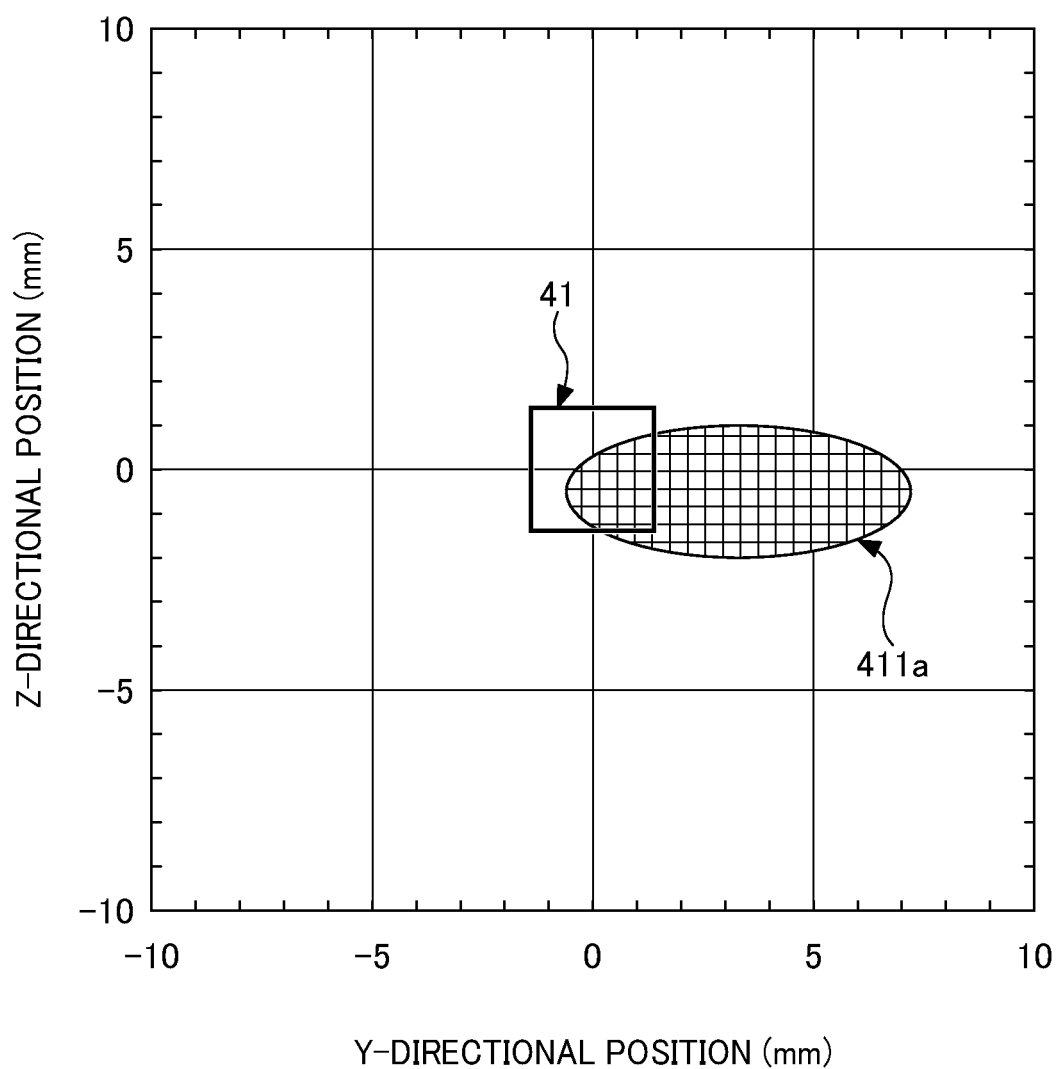
FIG. 23 is a second diagram of the position of a laser beam reflected off the eyeball after being emitted from the VCSEL array in FIG. 21.
Figure 24:
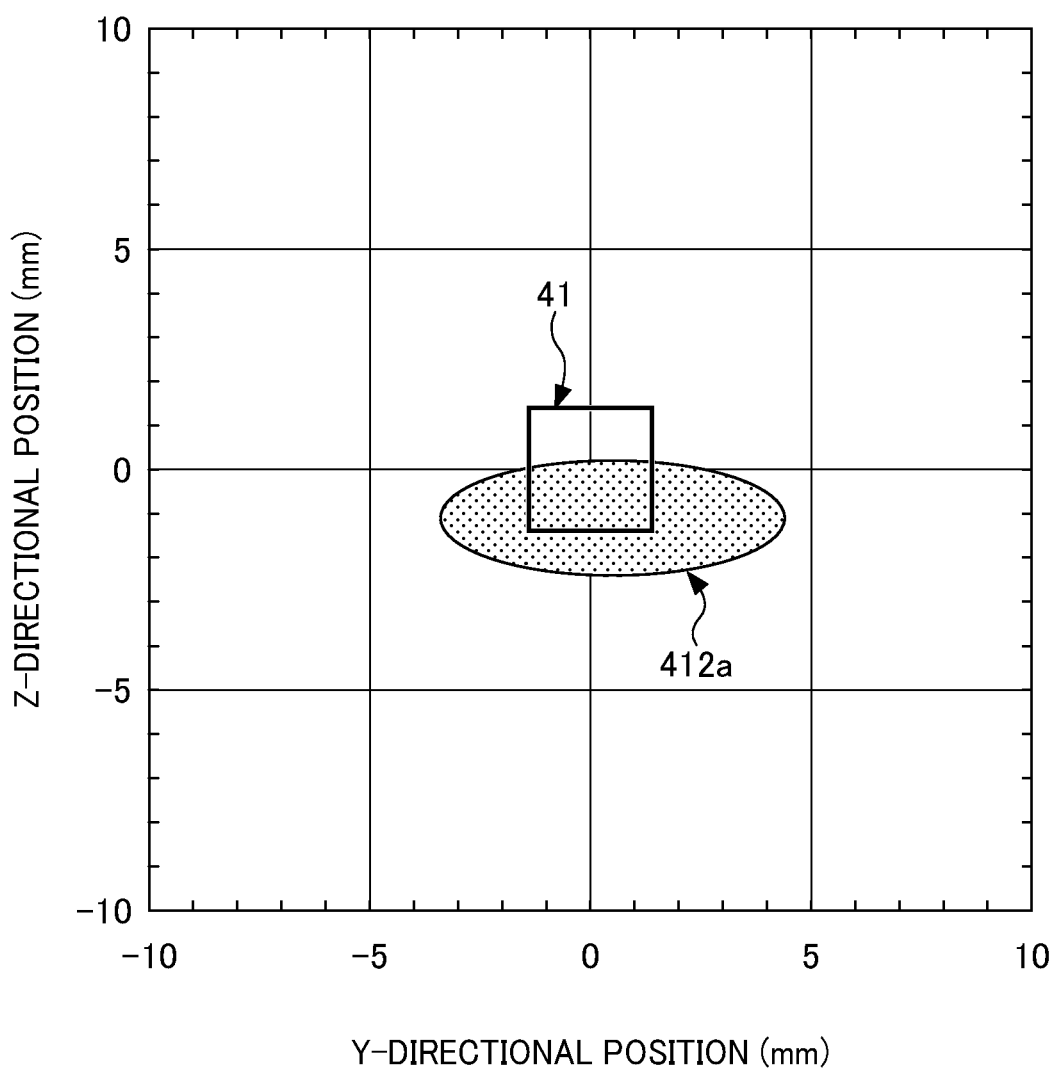
FIG. 24 is a third diagram of the position of a laser beam reflected off the eyeball after being emitted from the VCSEL array in FIG. 21.
Figure 25:
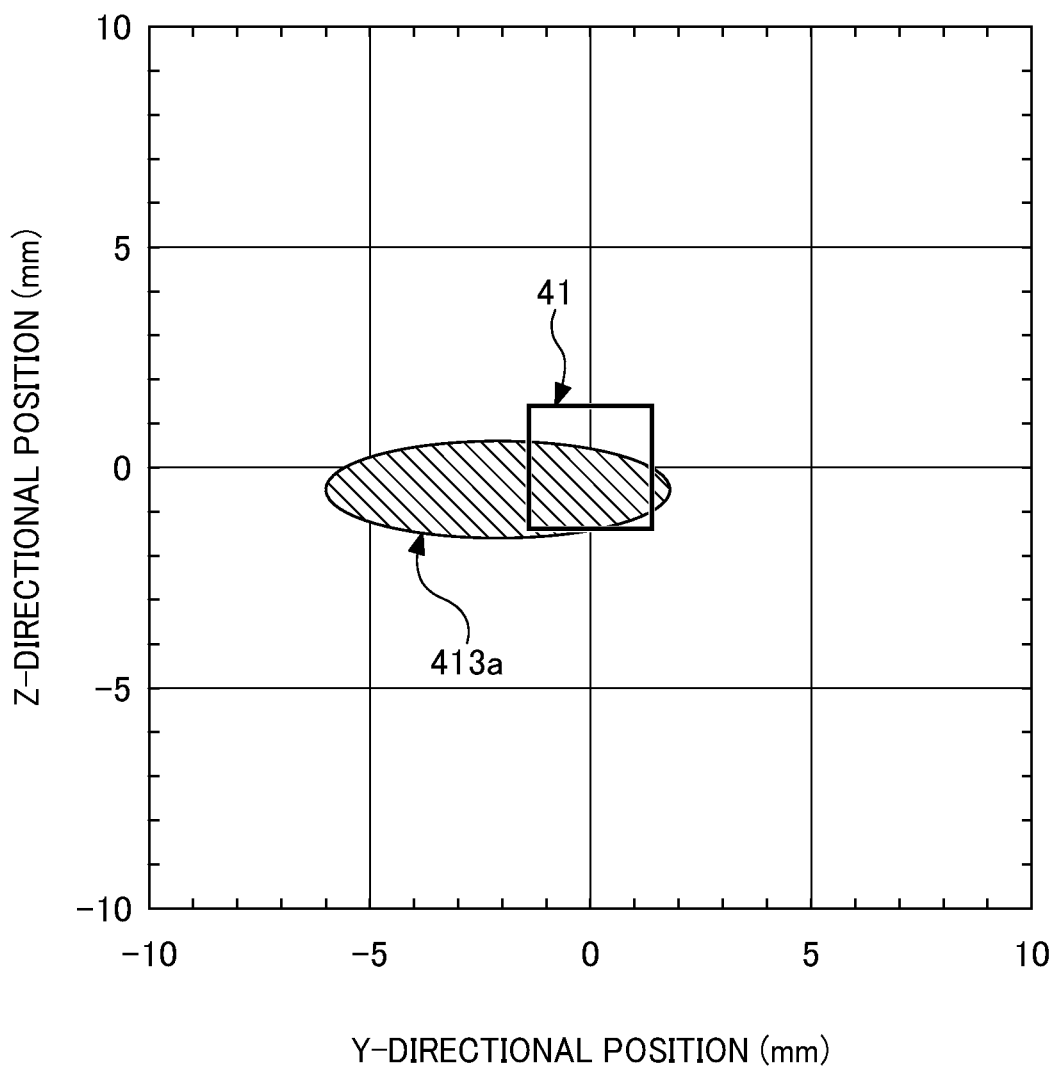
FIG. 25 is a fourth diagram of the position of a laser beam reflected off the eyeball after being emitted from the VCSEL array in FIG. 21
Figure 26:
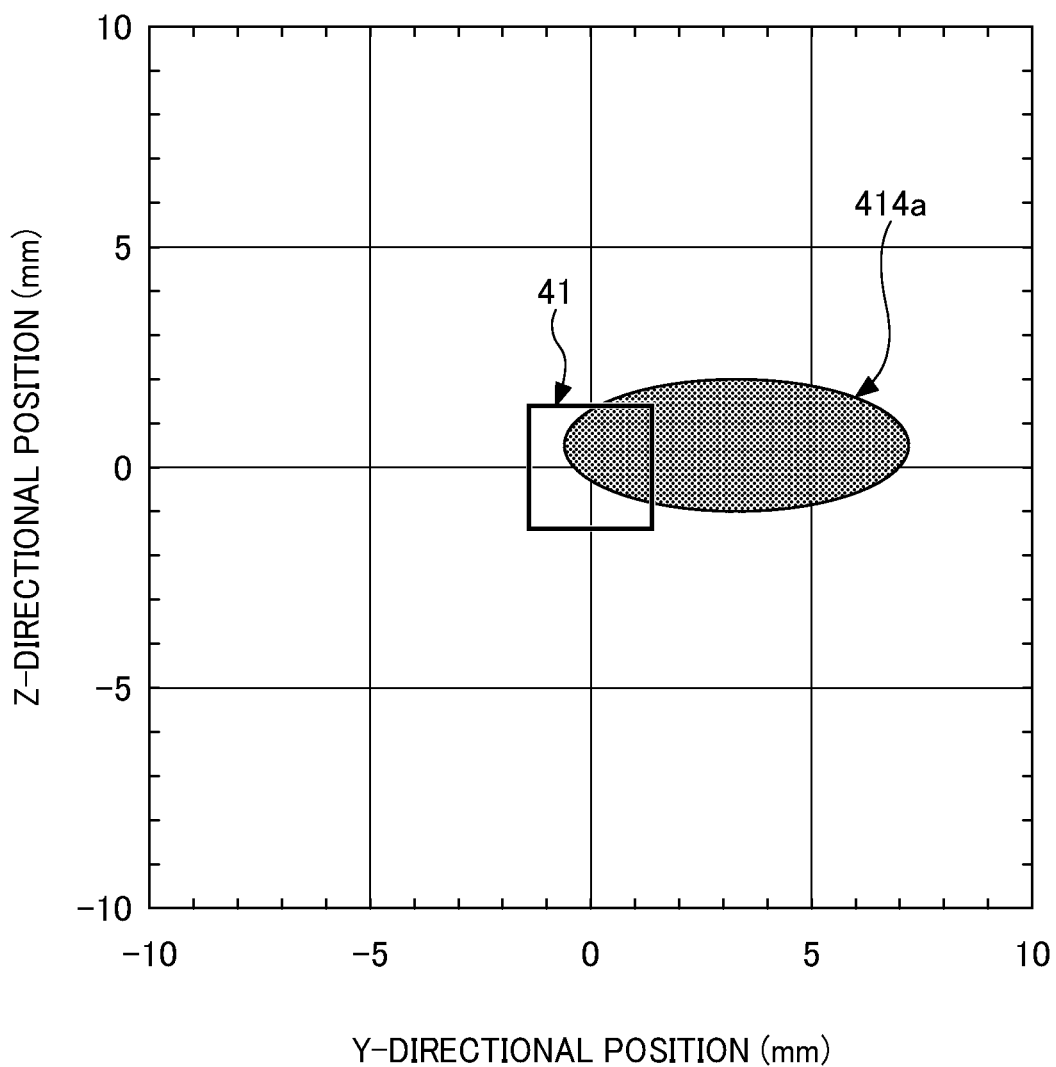
FIG. 26 is a fifth diagram of the position of a laser beam reflected off the eyeball after being emitted from the VCSEL array in FIG. 21.
Figure 27:
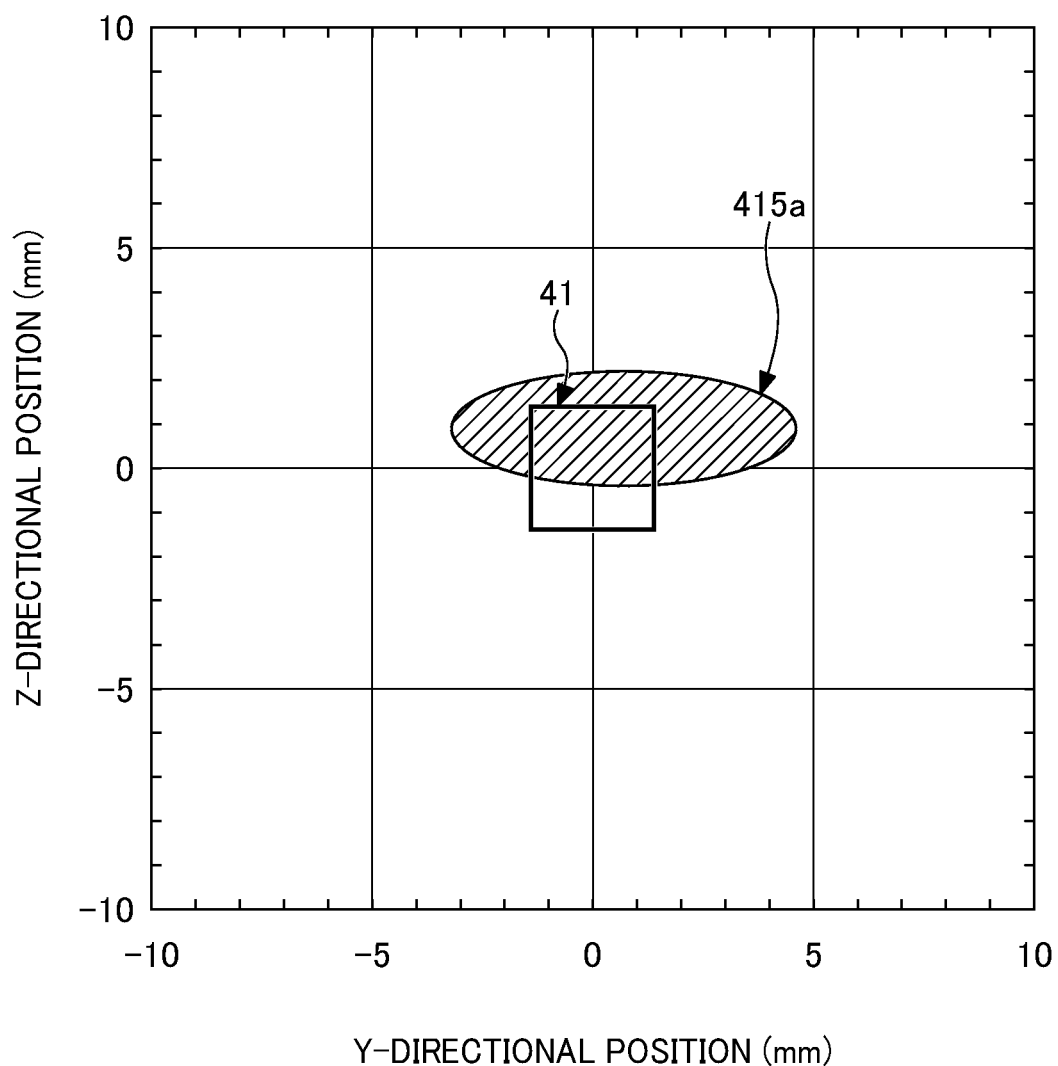
FIG. 27 is a sixth diagram of the position of a laser beam reflected off the eyeball after being emitted from the VCSEL array in FIG. 21.
Figure 28:
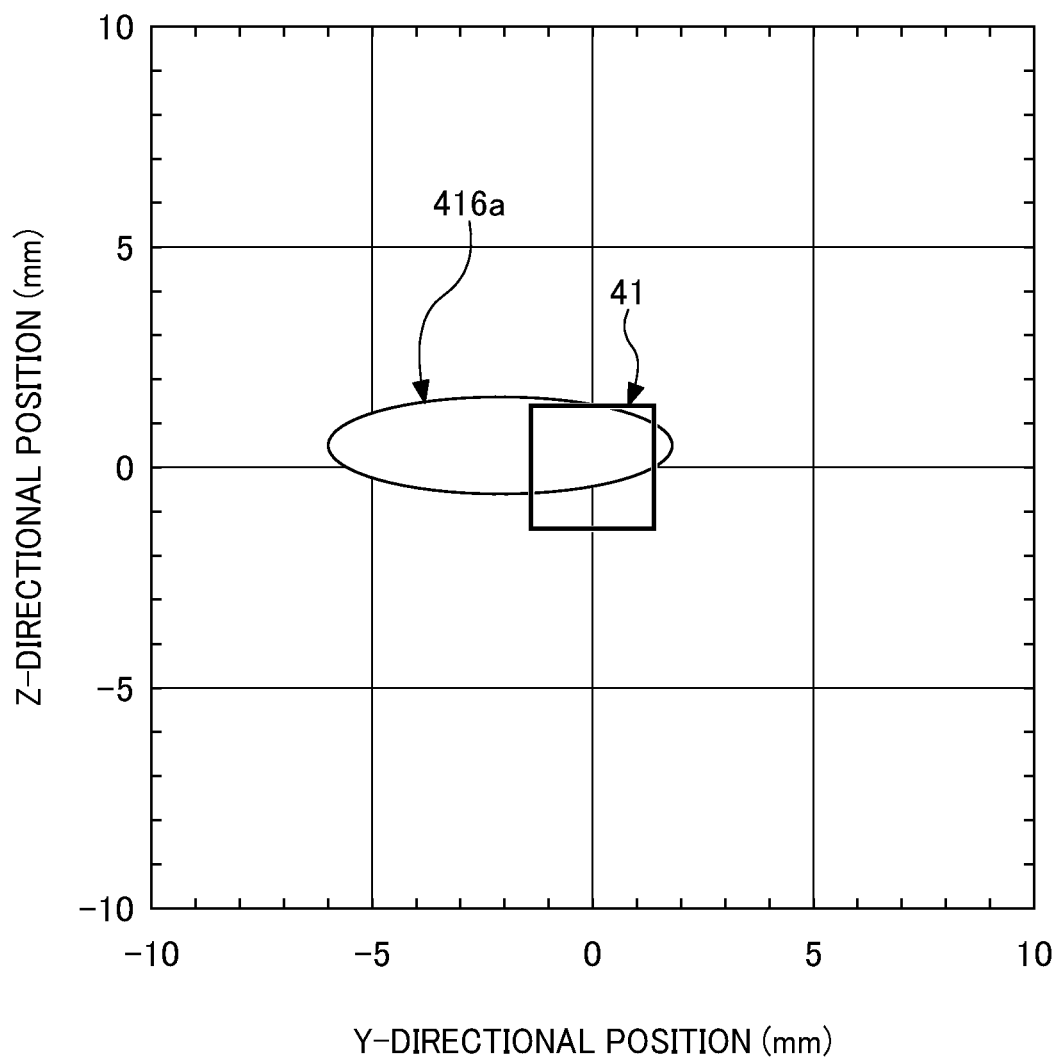
FIG. 28 is a seventh diagram of the position of a laser beam reflected off the eyeball after being emitted from the VCSEL array in FIG. 21.
Figure 29:
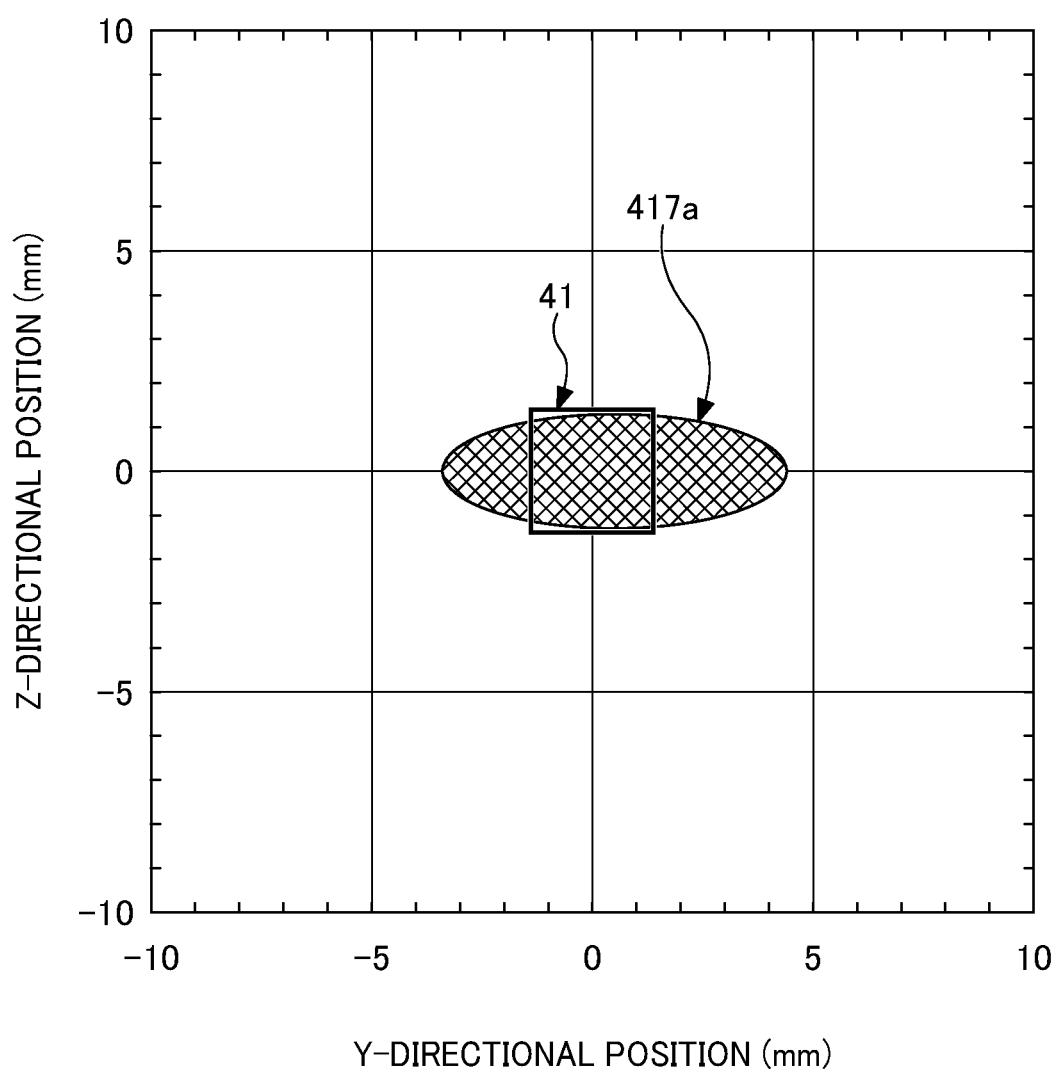
FIG. 29 is an eighth diagram of the position of a laser beam reflected off the eyeball after being emitted from the VCSEL array in FIG. 21.

FIG. 23 is a graph of the incident position of laser beams L4 on the light-receiving surface 41 after being emitted from the VCSEL element 11a. FIG. 24 is a graph of the incident position of laser beams L4 on the light-receiving surface 41 after being emitted from the VCSEL element 12a. FIG. 25 is a graph of the incident position of laser beams L4 on the light-receiving surface 41 after being emitted from the VCSEL element 13a. FIG. 26 is a graph of the incident position of laser beams L4 on the light-receiving surface 41 after being emitted from the VCSEL element 14a. FIG. 27 is a graph of the incident position of laser beams L4 on the light-receiving surface 41 after being emitted from the VCSEL element 15a. FIG. 28 is a graph of the incident position of laser beams L4 on the light-receiving surface 41 after being emitted from the VCSEL element 16a. FIG. 29 is a graph of the incident position of laser beams L4 on the light-receiving surface 41 after being emitted from the VCSEL element 17a.

In FIGS. 22 to 29, the horizontal axis represents a Y-directional position (mm) in the Y-direction, and the vertical axis represents a Z-directional position (mm) in the Z-direction. In this optical simulation, the line-of-sight direction of the eyeball 30 is the direction in which the subject is facing forward where θx is 0 (θx=0 degree) and θz is 0 (θz=0 degree).

The center of the light-receiving surface 41 of the photodiode 4 represented by a square frame is located at a position of 0 mm in the Y-direction and a position of 0 mm in the Z-direction. Spots 411a to 417a represent beam spots of the laser beams L4 that have reached the vicinity of the light-receiving surface 41 after being emitted from the VCSEL elements 11 to 17.

The spots 411a, 412a, 413a, 414a, 415a, 416a, and 417a represent beam spots based on the laser beams L emitted from the VCSEL element 11a, the VCSEL element 12a, the VCSEL element 13a, the VCSEL element 14a, the VCSEL element 15a, and the VCSEL element 16a, and the VCSEL element 17a, respectively.

In the optical simulation according to the modified example illustrated in FIG. 22, a part of each of the spots 411a to 416a strikes on the light-receiving surface 41. In FIGS. 23 to 29, a part of each of the spots 411a to 417a strikes on the light-receiving surface 41.

Figure 30:
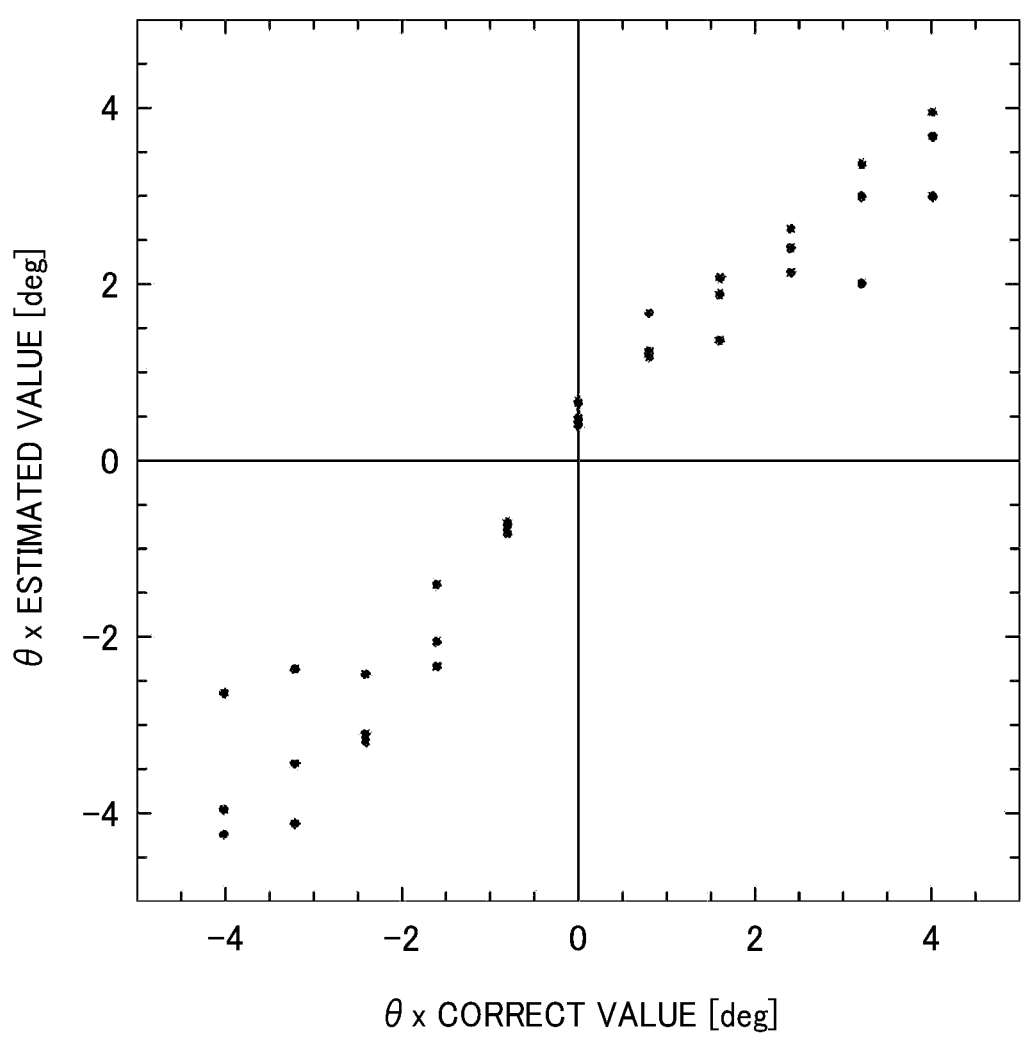
FIG. 30 is a first graph presenting simulation results of line-of-sight direction detection according to a modified example of an embodiment.
Figure 31:
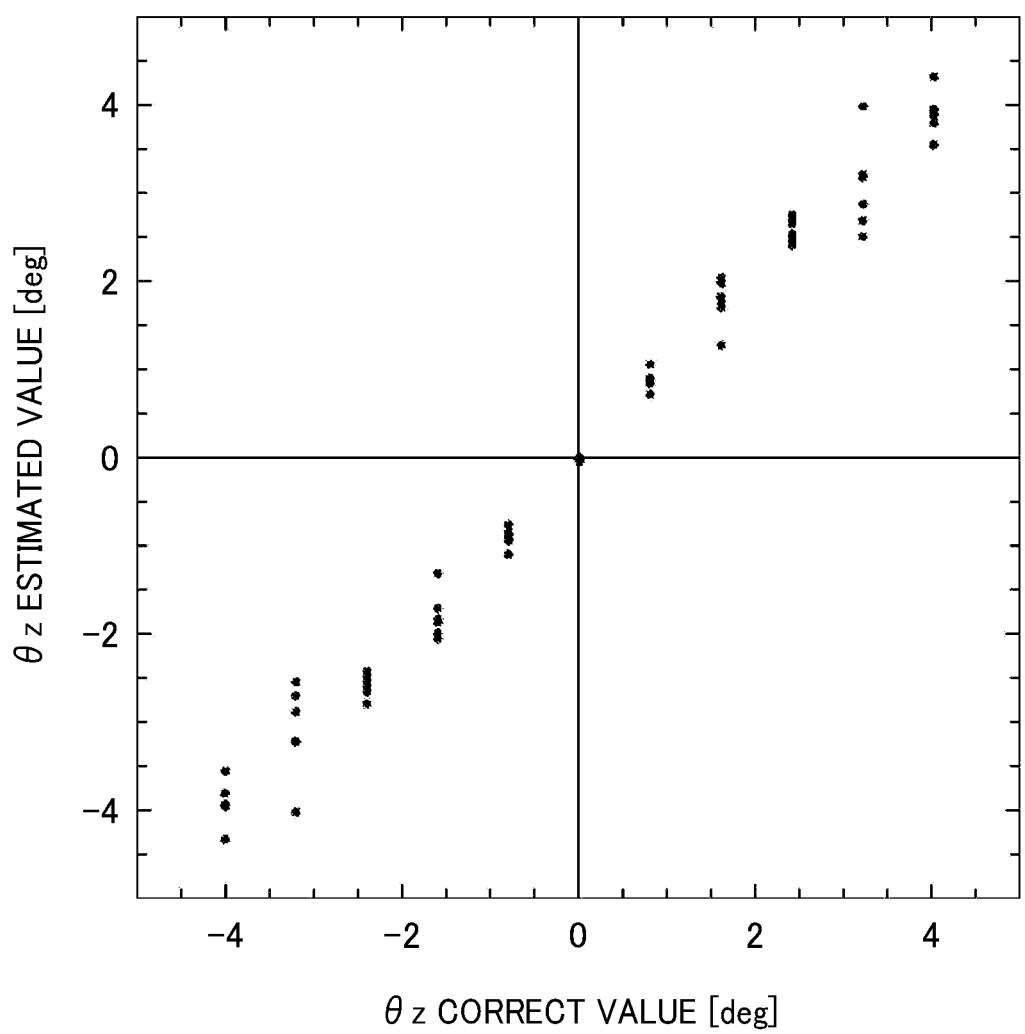
FIG. 31 is a second graph presenting simulation results of line-of-sight direction detection according to the modified example.

FIGS. 30 and 31 are graphs presenting simulation results for line-of-sight direction detection according to the modified example. FIG. 30 is a graph presenting simulation results for the line-of-sight direction θx in the X-direction. FIG. 31 is a graph presenting simulation results for the line-of-sight direction θz in the Z-direction.

FIGS. 30 and 31 are viewed in the same manner as in FIGS. 15 and 16 described above, and the simulation method is also the same as the method for obtaining FIGS. 15 and 16 described above.

As presented in FIGS. 30 and 31, it was found that there is a correlation between the correct value and the estimated value. The root mean square error (RMSE) Δθx of the line-of-sight direction estimation results in the horizontal direction was 0.6 degrees, and the RMSE Δθz of the line-of-sight direction estimation results in the vertical direction was 0.3 degrees.

From the simulation results in FIGS. 30 and 31, it was found that the line-of-sight detection device 10 including a VCSEL array 1a according to a modification of an embodiment of the present disclosure can estimate the line-of-sight direction based on the electrical signals Se output from the photodiode 4 and acquire the line-of-sight direction information Ed.

Operation and Effects of Line-of-sight detection Device 10

The following describes the operation and effects of the line-of-sight detection device 10.

Currently, technologies and products that are related to virtual reality (VR) and augmented reality (AR) attracts a lot of attention. In particular, the AR technology is expected to be applied not only to entertainment domain but also to a wide range of fields such as work support on the manufacturing floor and the clinical floor.

As a device or equipment that provides augmented reality (AR), glasses-type image display devices are under development. In particular, a retinal projection display that projects an image directly device on a human retina has an advantage that it is not always necessary for the eyes to focus on the projected image. Due to such a configuration, a clear AR image can be viewed steadily while focusing the eyes on an object in the exterior world. Further, in combination with a line-of-sight detection technologies or eye tracking technologies used to track the line-of-sight direction of the subject, the angle of view of the display can be increased, and the displayed image can be operated or manipulated by the line of sight.

In an eyeglass image display device, a line-of-sight detection device is used to detect the degree of the inclination of an eyeball and detects the line-of-sight direction of a person wearing the image display device. Another example of the line-of-sight detection device has a configuration that causes a micro-electromechanical systems (MEMS) mirror to scan a laser beam over eyeball to detect the light reflected from the eyeball scanned with the laser beam.

However, such a configuration using a MEMS mirror as a movable portion complicates the configuration of the line-of-sight detection device and the configuration of a drive circuit that stably drives the MEMS mirror.

The line-of-sight detection device 10 (an inclination detector) according to an embodiment of the present disclosure includes a VCSEL array 1 (multiple light emitters) and a photodiode (a photosensor) that receives laser beams L4 reflected off eyeball 30 (reflected off an object) after being emitted from the VCSEL array 1 and outputs electrical signals Se based on the light intensity of the laser beams L4 received by the photodiode. The line-of-sight detection device 10 also includes a processor 100 (an output unit) that outputs line-of-sight direction information Ed of the eyeball 30 (detection results for the degree of the inclination of the object) based on the electrical signals Se output from the photodiode 4.

The photodiode 4 receives multiple laser beams L4 reflected off the eyeball 30 (multiple light beams reflected off the object) after being emitted from multiple VCSEL elements under the conditions that the eyeball 30 remains inclined at substantially the same degree or substantially unchanged.

The line-of-sight detection device 10, which detects the degree of the inclination of eyeball 30 based on light beams L1 emitted from the VCSEL array 1, has a simple configuration that detects the degree of the inclination of the eyeball 30 without the use of a movable section such as a MEMS mirror and a driver that drives the movable section. The line-of-sight detection device 10 with a simple configuration allows a reduction in the size of the line-of-sight detection device 10 or a reduction in cost for manufacturing the line-of-sight detection device 10.

The line-of-sight detection device 10, which receives multiple laser beams L4 reflected off eyeball 30 after being emitted from the multiple VCSEL elements, allows the photodiode 10 to track the motion of eyeball 30 based on the electrical signals Se output from the photodiode 4. The line-of-sight detection device 10 has a simpler configuration of a photosensor and a simpler configuration of the drive unit that drives the photosensor than those that tracks the motion of the eyeball 30 using another photosensor such as position sensitive detector (PSD).

As described above, embodiments of the present disclosure provide an inclination detector with a simple configuration.

In the present embodiment, multiple VCSEL elements are arranged in the X-direction and the Y-direction (a prescribed direction) along the light-emitting surface 1A of the VCSEL array 1. Further, an equal interval D is set between adjacent VCSEL elements of the multiple VCSEL elements in each of the X-direction and the Y-direction on the VCSEL array 1. This enables the photodiode 4 to receive multiple laser beams L4 reflected off eyeball 30 after being emitted from the multiple VCSEL elements. As a result, the line-of-sight detection device 10 exhibits the above-described effects.

Since the VCSEL elements 11 to 16 are provided side by side in the Y-direction and the Z-direction (i.e., in two different directions), the line-of-sight detection device 10 can track the motion of the eyeball 30 around the Y-axis and the Z-axis. As a result, the line-of-sight detection device 10 can increase the detection range of the inclination of the eyeball 30 and the detection range of the line-of-sight direction by the line-of-sight detection device 10.

In the present embodiment, the laser beams L4 emitted from the multiple VCSEL elements in the VCSEL array 1 and reflected off the eyeball 30 at least partially overlap with each other on the light-receiving surface 41 of the photodiode 4. This enables the multiple laser beams L4 to strike on the light-receiving surface 41 at close intervals and thus enables the photodiode 4 to receive multiple laser beams L4 reflected off eyeball 30 after being emitted from the multiple VCSEL elements.

In the present embodiment, the distance D between adjacent VCSEL elements among the VCSEL elements 11 to 16 in the VCSEL array 1 is shorter than the length (or width) w of the light-receiving surface 41 of the photodiode 4 in each of the Y-direction and the Z-direction. This enables the multiple laser beams L4 to strike on the light-receiving surface 41 at close intervals and thus enables the photodiode 4 to receive multiple laser beams L4 reflected off eyeball 30 after being emitted from the multiple VCSEL elements.

In the present embodiment, the laser beams L4 reflected off the eyeball 30 diverge toward the photodiode 4. Such diverging laser beams increase their spot size and thus enable the photodiode 4 to more likely receive multiple laser beams L4 reflected off the eyeball 30 after being emitted from the multiple VCSEL elements. With an increase in the spot size of the laser beams L4, at least part of each of the laser beam L4 more likely strikes on the light-receiving surface 41, and thus the stability of the line-of-sight detection device 10 increases.

Figure 32:
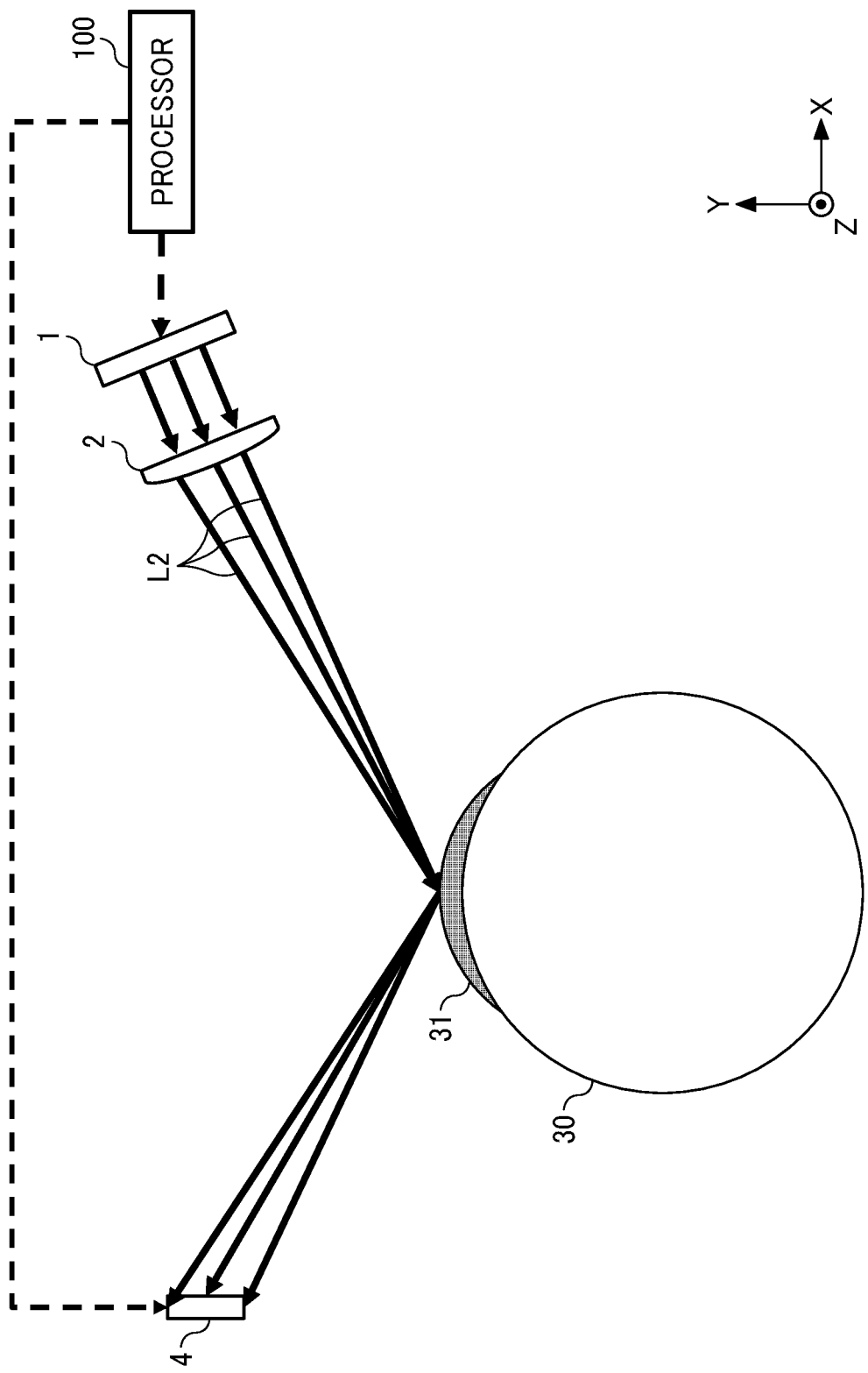
FIG. 32 is an illustration of a configuration without the use of a concave mirror.
Figure 33:
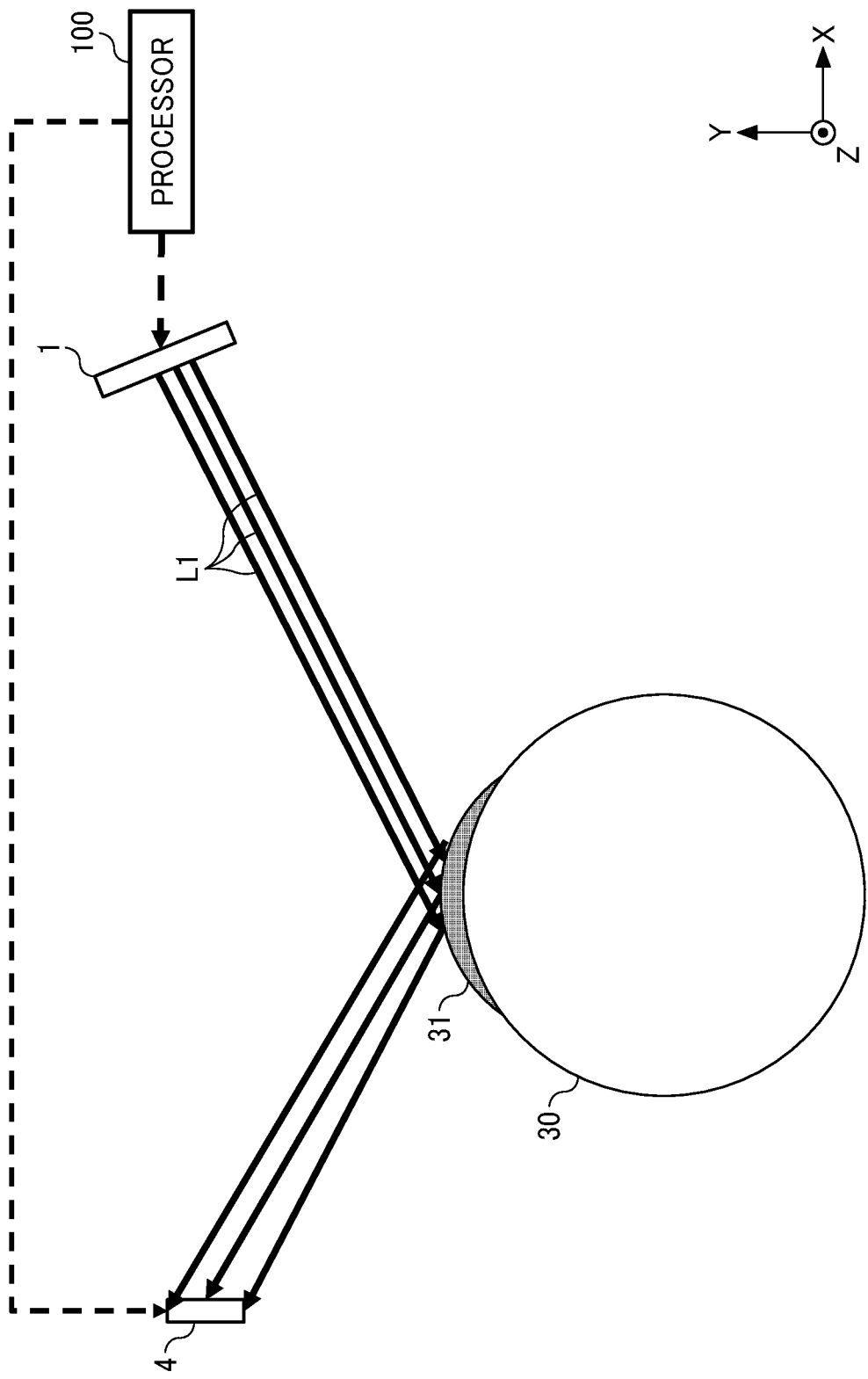
FIG. 33 is an illustration of a configuration without the use of a concave mirror and a lens.

In the present embodiment, the eyeball 30 is irradiated with the laser beam L3 converged by the concave mirror 3. However, no limitation is intended thereby. In the line-of-sight detection device 10 without the use of a concave mirror as illustrated in FIG. 32, the laser beams L2 converged by the lens 2 strikes on the eyeball 30. In the line-of-sight detection device 10 without the use of a concave mirror and a lens as illustrated in FIG. 33, the laser beams L1 emitted from the VCSEL array 1 directly strike on the eyeball 30. In FIG. 32, the laser beams L2 converged by the lens 2 strikes on the eyeball 30 without the use of a concave mirror. Since the laser beams emitted from the VCSEL array 1 strike on the eyeball 30 without passing the concave mirror, fewer optical elements are used, which can reduce the manufacturing cost. Using a concave mirror, however, allows the photodiode 4 to be disposed near the processor and thus enables a reduction in noise of signals output from the photodiode 4.

Second Embodiment

The following describes a line-of-sight detection device 10a according to a second embodiments of the present disclosure. In view of the first embodiment of the present disclosure as described above, like reference signs denote like elements, and redundant description may be omitted where appropriate. The same applies to other embodiments described below.

Functional Configuration Example of Processor 100a

Figure 34:
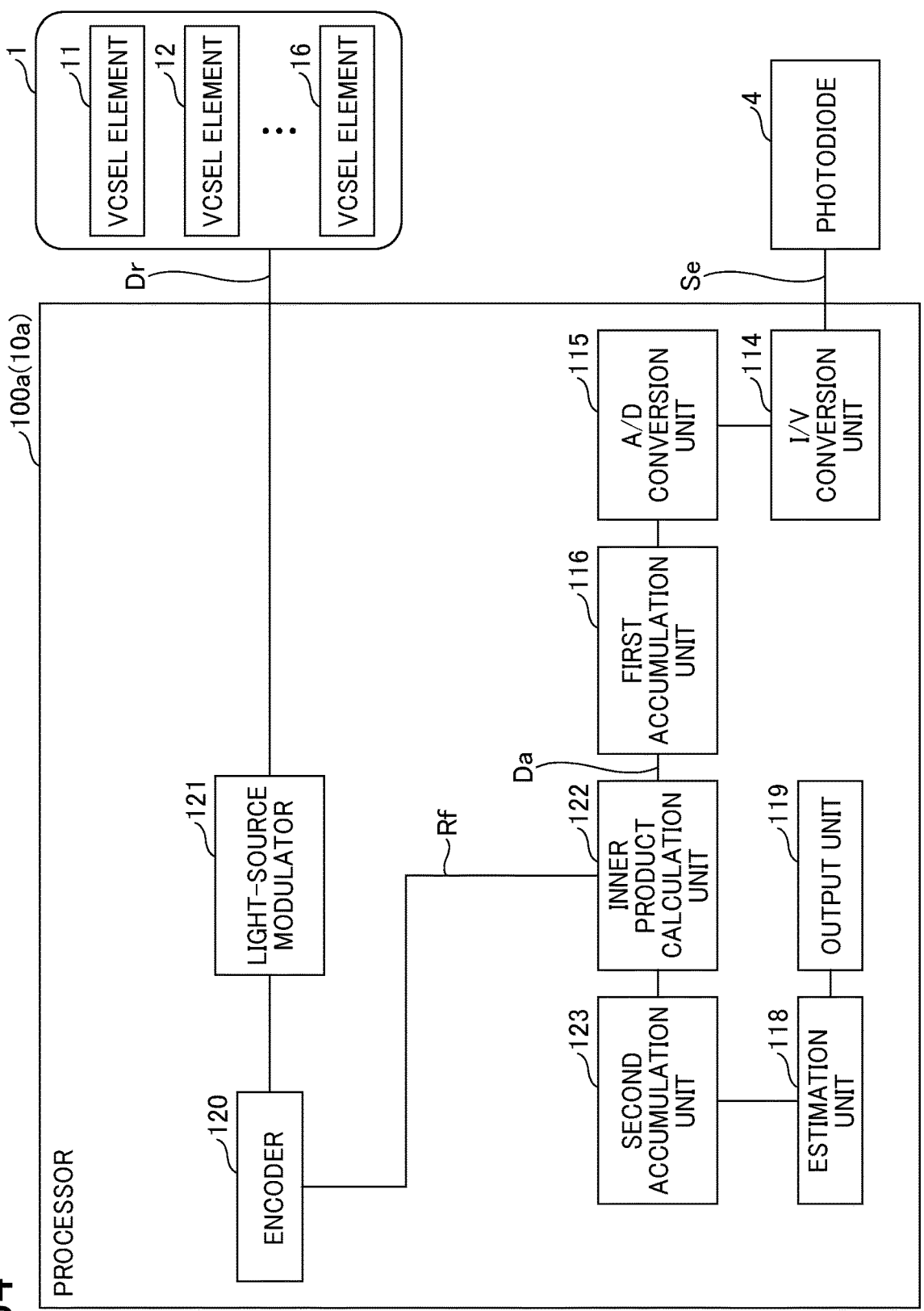
FIG. 34 is a block diagram of a functional configuration of the processor, according to a second embodiment.

FIG. 34 is a block diagram of the functional configuration of a processor 100a included in a line-of-sight detection device 10a according to an embodiment of the present disclosure. As illustrated in FIG. 34, the processor 100a includes an encoder 120, a light-source modulator 121, an inner product calculation unit 122, and a second accumulation unit 123.

The line-of-sight detection device 10a causes the light-source modulator 121 to control the light emission of the VCSEL array 1 so as to emit laser beams L time-modulated by the orthogonal code. Further, the line-of-sight detection device 10a causes the processor 100a to separately detect multiple time-modulated laser beams L4 based on the electrical signals Se output from the photodiode 4. This allows a reduction in the processing time and the processing load of processor 100a in the present embodiment. The present embodiment allows a higher accuracy of the line-of-sight detection while eliminating the influence of the background light irrespective of the light intensity of the laser beams L4 striking on eyeball 30 (i.e., even when the light intensity of the laser beams L4 striking on eyeball 30 is small).

The CPU 101 of the processor 100a executes program stored in the ROM 102 to implement the functions of the encoder 120 and the inner product calculation unit 122 and causes the light-source drive circuit 105 to implement the function of the light-source modulator 121. The processor 100a causes the RAM 103 to implement the function of the second accumulation unit 123.

The encoder 120 generates multiple encoded data sets, and then allocates the encoded data sets to the respective VCSEL elements of the VCSEL array 1 via the light-source modulator 121. The encoder 120 outputs the same data as the encoded data allocated to a VCSEL element, to the inner product calculation unit 122 as reference voltage data Rf to be used for the calculation of inner product by the inner product calculation unit 122.

The encoded data includes codes having orthogonality. This code is, for example, a Hadamard code. In the present embodiment, the Hadamard code refers to a coding scheme used for error detection and correction of the signal. In addition, different encoded signals are generated according to the positions of the VCSEL elements in the VCSEL array 1 and stored in an SSD 104 or the like. The encoder 120 allocate the encoded date acquired according to the positions of the VCSEL elements to a corresponding VCSEL element by referring to the SSD 104 or the like.

The light-source modulator 121 is an example of a controller that controls the VCSEL array 1 to emit laser beams L1 time-modulated by a code having orthogonality. Specifically, the light-source modulator 121 outputs the drive signal Dr current-modulated based on the encoded data input from the encoder 120 to each of the VCSEL elements, thus causing all the VCSEL elements to emit light beams in parallel while time-modulating the laser beams L1. The number of light-source modulators 121 is not limited to one, and the processor 100a may include light-source modulators 121 as many as the number of VCSEL elements included in the VCSEL array 1.

The inner product calculation unit 122 acquires digital voltage data Da for one cycle of the predetermined encoding pattern accumulated in the first accumulation unit 116 by referring to the first accumulation unit 116, and obtain an inner product of the digital voltage datum Da and the reference datum Rf input from the encoder 120. The inner product calculation unit 122 performs an inner product operation using all the encoded data sets used for encoding, and accumulates the inner product operation result in the second accumulation unit 123. The inner product calculation unit 122 can separately detect the digital voltage data Da corresponding to each VCSEL element by using the orthogonality of the encoded data by performing the inner product calculation using all the encoded data sets.

Processing Example by Processor 100a

Figure 35:
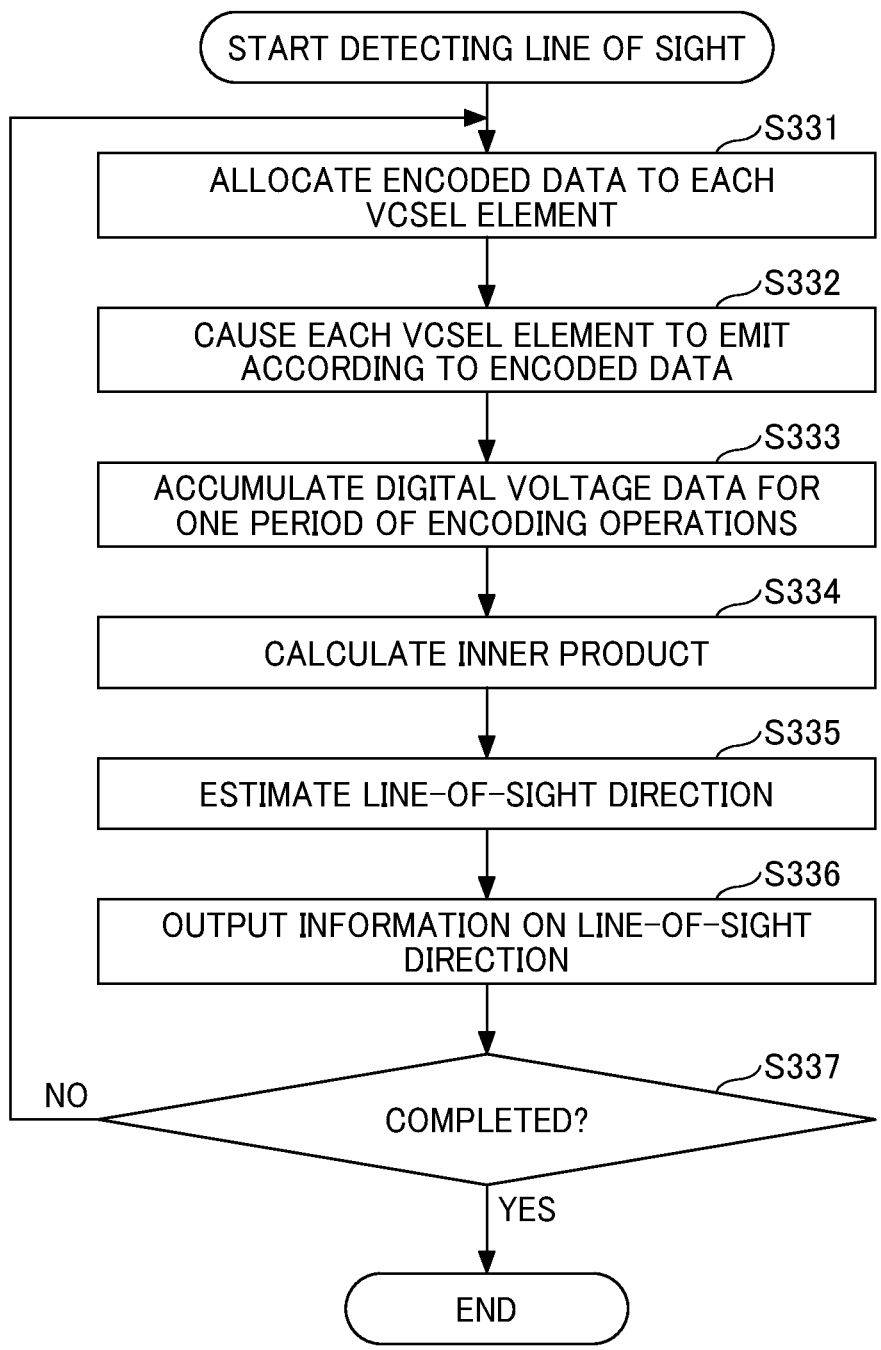
FIG. 35 is a flowchart of processes performed by the processor, according to the second embodiment.

FIG. 35 is a flowchart of processing performed by the processor 100a, according to an embodiment. The processor 100a starts the processing in FIG. 35, for example, in response to a start operation input signal by the user.

First, in step S331, the processor 100a causes the encoder 120 to generate multiple encoded data sets, and then allocates the encoded data sets to the respective VCSEL elements of the VCSEL array 1 via the light-source modulator 121. The encoder 120 outputs the reference data Rf to the inner product calculation unit 122.

Subsequently, in step S332, the processor 100a outputs the drive signal Dr temporally modulated by the light-source modulator 121 to the VCSEL array 1. The VCSEL device to which the drive signal Dr is applied emits the laser bream L1 in accordance with the drive signal Dr. The laser beam L1 reflected off eyeball 30 strikes on the photodiode 4 as a laser beam L4 after passing through the lens 2 and reflecting off the concave mirror 3. The photodiode 4 outputs an electrical signal Se according to the light intensity of the laser beam L4 received, to the processor 100a.

Subsequently, in step S333, the processor 100a converts the electrical signal Se output from the photodiode 4 into an analog voltage signal by the I/V conversion unit 114, and then converts the analog voltage signal into the digital voltage signal Da by the A/D conversion unit 115. The processor 100a causes the first accumulation unit 116 to accumulate the digital voltage data Da for one period of encoding operation in association with the VCSEL element that has emitted light.

Subsequently, in step S334, the processor 100a causes the inner product calculation unit 122 to acquire digital voltage data Da for one cycle of the predetermined encoding pattern accumulated in the first accumulation unit 116 by referring to the first accumulation unit 116, and obtain an inner product of the digital voltage datum Da and the reference datum Rf input from the encoder 120. The inner product calculation unit 122 performs an inner product operation using all the encoded data sets used for encoding, and accumulates the inner product operation result in the second accumulation unit 123.

Subsequently, in step S335, the processor 100a causes the estimation unit 118 to obtain the line-of-sight direction information Ed by calculation using six digital voltage data sets Da corresponding to the VCSEL elements 11 to 16 accumulated in the second accumulation unit 123 and an estimation model created in advance.

Subsequently, in step S336, the processor 100a outputs the line-of-sight direction information Ed acquired by the estimation unit 118 to the external device via the output unit 119.

Subsequently, in step S337, the processor 100a determines whether or not to end the processing in FIG. 35. For example, the processor 100a determines whether or not to end the processing in response to an end operation input signal or the like by the user.

When the processor 100a determines to end the process (YES in step S337), the processor 100a ends the processing.

When the processor 100a determines to not end the process (NO in step S337), the processor 100a performs the processes in step S331 and the subsequent steps again.

Through the processing in FIG. 35, the processor 100a outputs the line-of-sight direction information Ed based on the degree of inclination of the eyeball 30.

Operation and Effects of Line-of-sight detection Device 10a

As described above, the line-of-sight detection device 10a includes the light-source modulator 121 (a controller) that controls the light emission of the VCSEL array 1 so as to emit laser beams L time-modulated by the orthogonal code. The processor 100a separately detects multiple time-modulated laser beams L4 based on the electrical signals Se output from the photodiode 4. The code having orthogonality is, for example, a Hadamard code.

The line-of-sight detection device 10a separately detects the laser beams L4 and thus reduces the processing time and the processing load of processor 100a. The line-of-sight detection device 10a that separately detects the laser beams L4 and thus eliminates the influence of background light. This allows a higher accuracy of the line-of-sight detection irrespective of the light intensity of the laser beams L4 striking on eyeball 30 (i.e., even when the light intensity of the laser beams L4 striking on eyeball 30 is small).

Effects other than those described above are the same as those of the first embodiment.

Third Embodiment

The following describes a line-of-sight detection device 10b according to a third embodiments of the present disclosure.

Functional Configuration Example of Processor 100b

Figure 36:
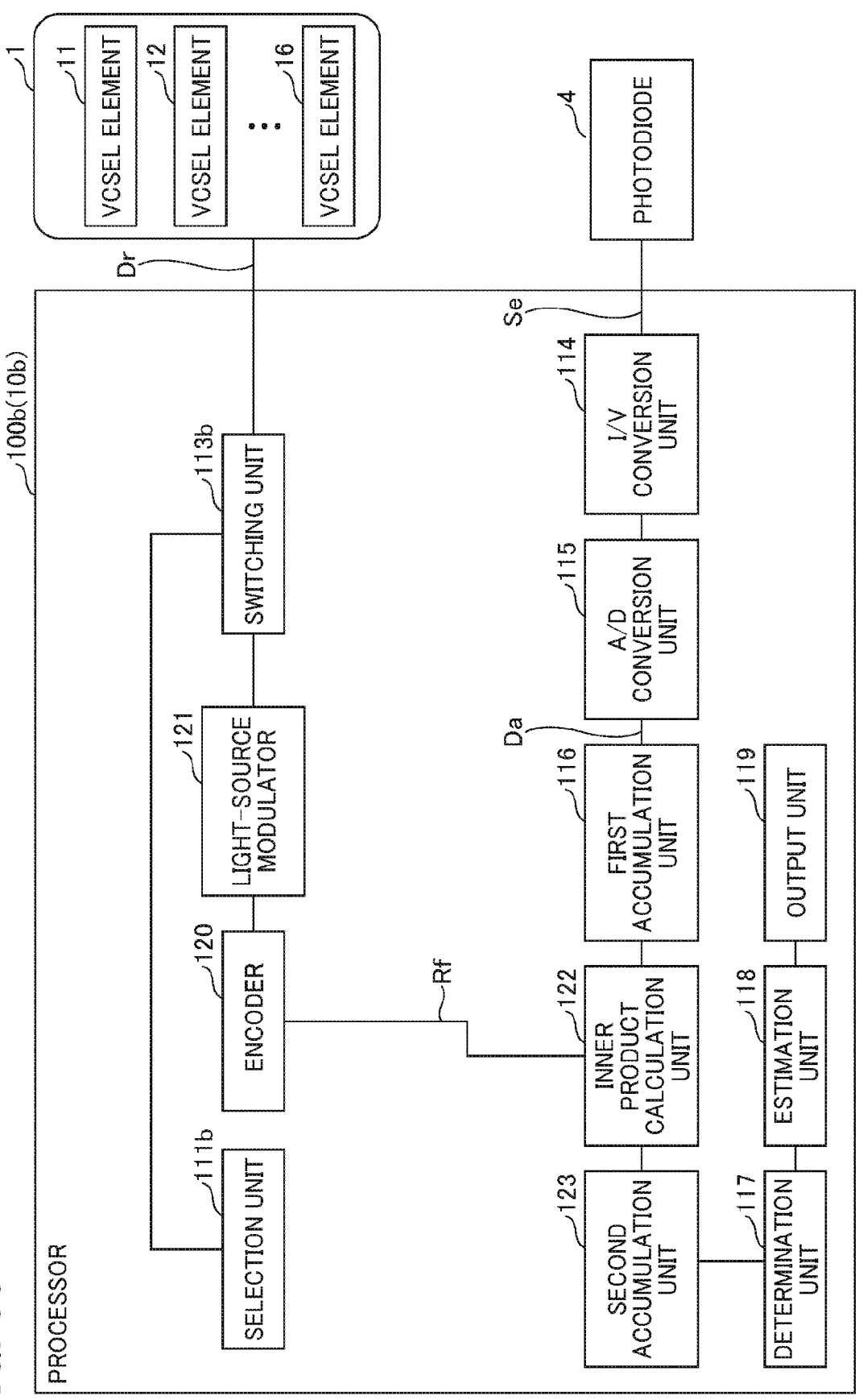
FIG. 36 is a block diagram of a functional configuration of the processor, according to a third embodiment.

FIG. 36 is a block diagram of the functional configuration of a processor 100b included in a line-of-sight detection device 10b according to an embodiment of the present disclosure. As illustrated in FIG. 36, the processor 100a includes a selection unit 111b and a switching unit 113b.

In the present embodiment, multiple VCSEL elements included in the VCSEL array 1 are divided into multiple groups, and the light-source modulator 121 controls light emission of the VCSEL array 1 so that the multiple groups of VCSEL elements emit laser beams on a group by group basis. As a result, the line-of-sight detection device 10b reduces the number of VCSEL elements that are caused to emit light in parallel and reduces the amount (light intensity) of laser beams L striking on the eyeball 30.

In the present disclosure, the "group" is a collection of multiple VCSEL elements included in the VCSEL array 1. For example, if the VCSEL elements 11 to 16 are divided into two groups, one group includes the VCSEL elements 11, 13 and 15 and the second group includes the VCSEL elements 12, 14 and 16. When the VCSEL elements 11 to 16 are divided into three groups, each of the three groups includes two VCSEL elements. The number of VCSEL elements constituting one group may be one or more and five or less.

The encoded data may be prepared as many as the number of VCSEL elements included in each group.

Different groups of VCSEL elements may not be separately detected, and thus may be allocated with the same encoded data.

The number of groups in the line-of-sight detection device 10b and the groups of the respective VCSEL elements 11 to 16 are predetermined.

The selection unit 111b selects a group to emit light from among the groups of the VCSEL elements 11 to 16, and outputs information indicating the selected group to the switching unit 113b.

The switching unit 113b switches the connection between the light-source modulator 121 and each of the VCSEL elements so that the light-source modulator 121 outputs the drive signal Dr to the selected group. After the digital voltage datum Da is accumulated in the first accumulation unit 116, the switching unit 113b switches from the VCSEL element that has emitted light (the selected VCSEL element) to another VCSEL element that has not emitted light so as to output the drive signal Dr to said another group that have not emitted light.

Processing Example by Processor 100b

Figure 37:
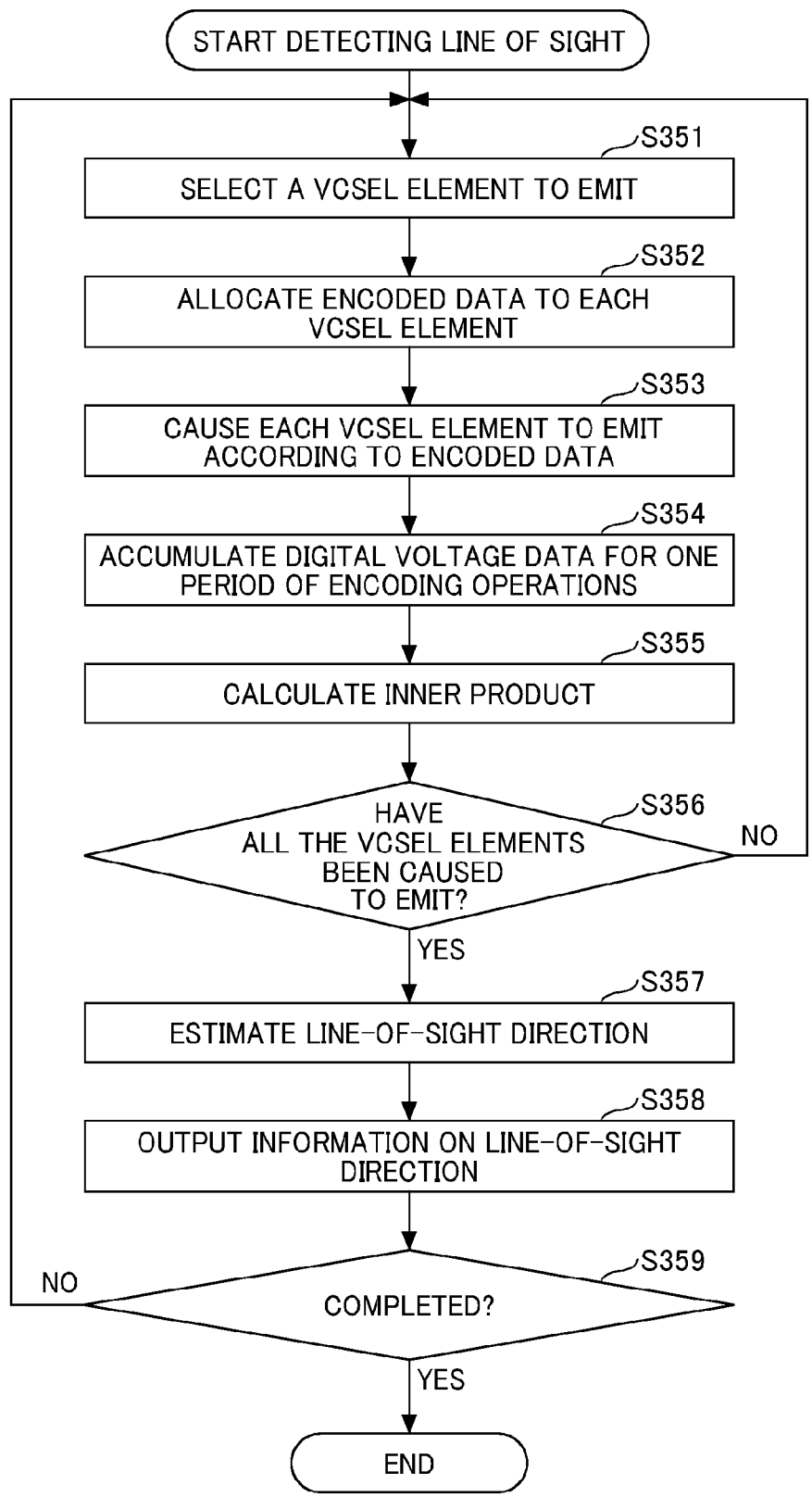
FIG. 37 is a flowchart of processes performed by the processor, according to the third embodiment.

FIG. 37 is a flowchart of processing performed by the processor 100b, according to an embodiment. The processor 100b starts the processing in FIG. 37, for example, in response to a start operation input signal by the user.

In step S351, the processor 100b causes the selection unit 111b to select a group of VCSEL elements to emit light from among the groups of VCSEL elements outputs information indicating the selected group to the switching unit 113b.

Subsequently, in step S352, the processor 100b causes the encoder 120 to generate multiple encoded data sets, and then, assigns the encoded data sets to the respective VCSEL elements of the VCSEL array 1 via the light-source modulator 121 and outputs the reference data set Rf to the inner product calculation unit 122.

Subsequently, in step S353, the processor 100b outputs the drive signal Dr temporally modulated by the light-source modulator 121 to the VCSEL array 1. The VCSEL device to which the drive signal Dr is applied emits the laser bream L1 in accordance with the drive signal Dr. The laser beam L1 reflected off eyeball 30 strikes on the photodiode 4 as a laser beam L4 after passing through the lens 2 and reflecting off the concave mirror 3. The photodiode 4 outputs an electrical signal Se according to the light intensity of the laser beam L4 received, to the processor 100b.

Subsequently, in step S354, the processor 100b converts the electrical signal Se output from the photodiode 4 into an analog voltage signal by the I/V conversion unit 114, and then converts the analog voltage signal into the digital voltage signal Da by the A/D conversion unit 115. The processor 100a causes the first accumulation unit 116 to accumulate the digital voltage data Da for one period of encoding operation in association with the VCSEL element that has emitted light.

Subsequently, in step S355, the processor 100b causes the inner product calculation unit 122 to acquire digital voltage data Da for one cycle of the predetermined encoding pattern accumulated in the first accumulation unit 116 by referring to the first accumulation unit 116, and obtain an inner product of the digital voltage datum Da and the reference datum Rf input from the encoder 120. The inner product calculation unit 122 performs an inner product operation using all the encoded data sets used for encoding, and accumulates the inner product operation result in the second accumulation unit 123.

Subsequently, in step S356, the processor 100b causes the determination unit 117 to determine whether all the VCSEL elements 11 to 16 are caused to emit light.

In step S356, when the determination unit 117 determines that all the VCSEL elements 11 to 16 are not caused to emit light (NO in step S356), the processor 100b performs the processes in step S351 and the subsequent steps again. In this case, the processor 100b causes the selection unit 111b to select a group of VCSEL elements that have not yet emitted light, and causes the selected group of the VCSEL elements to emit light.

When the determination unit 117 determines that all the VCSEL elements 11 to 16 are caused to emit light (YES in step S356), the processor 100b causes the estimation unit 118 to obtain the line-of-sight direction information Ed by calculation using six digital voltage data sets Da corresponding to the VCSEL elements 11 to 16 accumulated in the second accumulation unit 123 and an estimation model created in advance in step S357.

Subsequently, in step S358, the processor 100b outputs the line-of-sight direction information Ed obtained by the estimation unit 118 to the external device via the output unit 119.

Subsequently, in step S359, the processor 100b determines whether or not to end the processing in FIG. 37. For example, the processor 100b determines whether or not to end the processing in response to an end operation input signal or the like by the user.

When the processor 100b determines to end the process (YES in step S359), processor 100b ends the processing. When the processor 100b determines to not end the process (NO in step S359), the processor 100b performs the processes in step S351 and the subsequent steps again.

Through the processing in FIG. 37, the processor 100b outputs the line-of-sight direction information Ed based on the degree of inclination of the eyeball 30.

Line-of-Sight Detection Device 10b

As described above, in the present embodiment, multiple VCSEL elements included in the VCSEL array 1 are divided into multiple groups, and the light-source modulator 121 controls light emission of the VCSEL array 1 so that the multiple groups of VCSEL elements emit laser beams on a group by group basis.

For example, with more VCSEL elements to be caused to emit light, the light intensity of laser beams L1 striking on the eyeball 30 after being emitted from the VCSEL array 1 increases. This is undesirable from the viewpoint of safety. As a result, the line-of-sight detection device 10b, which causes groups of multiple VCSEL elements included in the VCSEL array 1 to emit light on a group by group basis, reduces the number of VCSEL elements that are caused to emit light in parallel and reduces the amount (light intensity) of laser beams L striking on the eyeball 30. This configuration of an embodiment of the present disclosure provides a highly safe line-of-sight detection device 10b.

Effects other than those described above are the same as those of the first and second embodiments.

Fourth Embodiment

Figure 38:
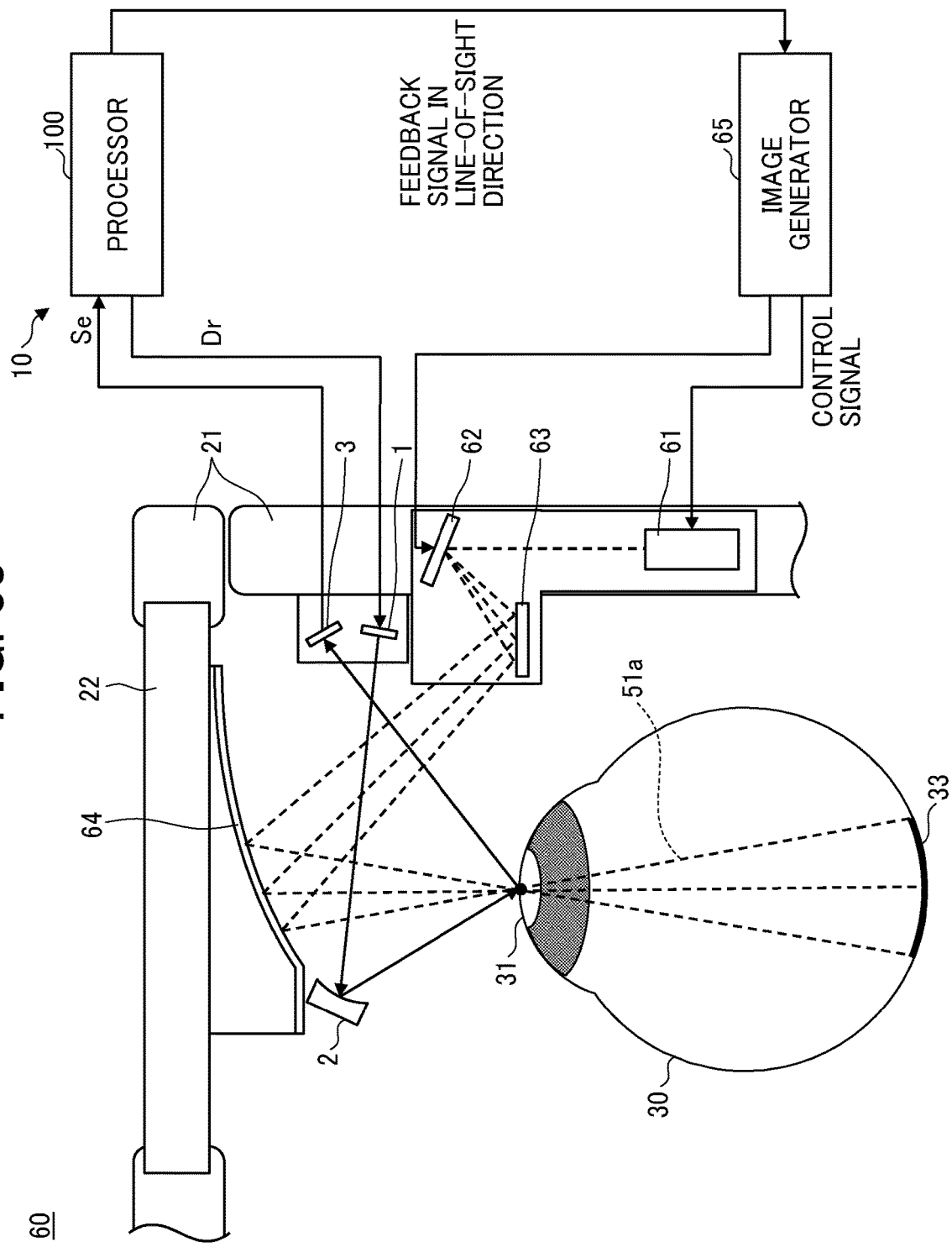
FIG. 38 is an illustration of an overall configuration of a retinal projection display according to a first embodiment.

A retinal projection display device 60 according to a fourth embodiment is described. FIG. 38 is a diagram illustrating a configuration of the retinal projection display device 60 according to the second embodiment of the present disclosure.

As illustrated in FIG. 38, the retinal projection display device 60 includes a red, green, and blue (RGB) laser source 61, a scanning mirror 62, a plane mirror 63, a half mirror 64, an image generator 65, and the line-of-sight detection device 10 according to the first embodiment as described above.

The RGB laser source 61 modulates laser beams of three RGB colors in terms of time, and outputs the modulated laser beams. The scanning mirror 62 performs two-dimensional scanning with light from the RGB laser source 61. The scanning mirror 62 is a micro-electromechanical systems (MEMS) mirror or the like. However, the scanning mirror 62 is not limited thereto, and may be any configuration including a reflecting portion that provides scanning with light, such as a polygon mirror or a galvano-mirror. The MEMS mirror is advantageous in terms of reduction in size and weight. The driving system of the MEMS mirror may employ any system, such as an electrostatic system, a piezoelectric system, or an electromagnetic system.

The plane mirror 63 reflects scanning light from the scanning mirror 62 toward the half mirror 64. The half mirror 64 transmits a portion of incident light and reflects another portion of the incident light toward an eyeball 30.

The half mirror 64 has a concave curved-surface shape. The half mirror 64 causes the reflected light to converge to a portion near a cornea 31 of an eyeball 30 and to be focused at a position of a retina 33. Thus, an image formed with scanning light is projected on the retina 33. Light 51a indicated by broken lines in the drawing represents light to form an image on the retina 33. The ratio of the light intensity of reflected light to the light intensity of transmitted light provided by the half mirror 64 does not have to be 1:1.

The line-of-sight detection device 10 sends to the image generator 65 a feedback signal indicating the inclination of the eyeball 30 in the line-of-sight direction.

The image generator 65 has a deflection angle control function for the scanning mirror 62 and a light emission control function for the RGB laser source 61. The image generator 65 receives a feedback signal indicating the line-of-sight direction from the line-of-sight detection device 10. The feedback signal indicating the line-of-sight direction corresponds to the information Ed about the line-of-sight direction (or information on the line of sight detected). Moreover, the image generator 65 controls the deflection angle of the scanning mirror 62 and the light emission of the RGB laser source 61 according to the line-of-sight direction detected by the line-of-sight detection device 10, and rewrites the angle of projection of the image or the image data. With such a configuration, an image that reflects the results of eye tracking, which indicate the changes in line-of-sight direction caused by eye motion, can be formed on the retina 33.

However, the retinal projection display device 60 is not limited to an apparatus (e.g., a head-mounted display, or a wearable terminal) that is directly mounted on the head of a "person", and may be an apparatus that is indirectly mounted on the head of a "person" via a member such as a securing portion (head-mounted display device). Alternatively, a binocular retinal projection display including a pair of retinal projection display devices 60 for left and right eyes may be used.

In the present embodiment, the retinal projection display device 60 includes the line-of-sight detection device 10. However, no limitation is indicated thereby, and the retinal projection display device 60 may include the line-of-sight detection device 10a or 10b.

Although the embodiments of the present disclosure have been described above, the present disclosure is not limited to such specific embodiments, and various modifications and changes can be made without departing from the spirit and scope of the present disclosure as set forth in the appended claims.

For example, the line-of-sight detection device 10 can be used in a virtual reality (VR) display device. The human visual field is classified into a central visual field which can be recognized with high resolution and a peripheral visual field which can be recognized with low resolution. A technique of reducing the drawing load of a virtual reality image by using such property to increase the resolution of the central portion of the virtual reality image while decreasing the resolution of the peripheral portion is called foveated rendering. Particularly by combining the foveated rendering with the line-of-sight detection device, it is possible to dynamically change the high-resolution region in accordance with the line of sight of the user, and even if the line of sight of the user moves, it is possible to recognize the virtual reality image without a sense of discomfort due to a difference in resolution. The virtual reality display apparatus including the line-of-sight detection device 10 can implement the foveated rendering technology with a simple configuration. This achieves a virtual reality display device which is light in weight and low in power consumption, and allows a user to enjoy a virtual reality image for a long time without feeling a load.

Furthermore, the object is not limited to the eyeball 30, and the embodiment may be applied to any three-dimensional object having a curvature. For example, in the above-described embodiments of the present disclosure, the device that detects the degree of inclination of the eyeball 30 serves as an optical device. For example, an optical device may be mounted on a robot hand, and the degree of inclination of the robot hand according to the present embodiment that serves as the object may be detected.

The disclosure may be also employed for an optometric apparatus having a function of detecting an inclination of an eyeball or a pupil position (cornea). The optometric apparatus represents an apparatus capable of performing various inspections, such as an eyesight inspection, an ocular refractive-power inspection, an ocular tension inspection, and an ocular axial length inspection. The optometric apparatus is an apparatus that can inspect an eyeball in a non-contact manner. The optometric apparatus includes a support that supports the face of a subject, an ocular inspection window, a display that provides displaying to cause the direction of the eyeball of the subject (the direction of line of sight) to be constant during the ocular inspection, a controller, and a measurement section. It is required for the subject to look at a single point without moving the eyeball (line of sight) to increase measurement accuracy of the measurement section. The subject fixes the face to the support portion, and gazes at a displayed object displayed on the display through the ocular inspection window. At this time, when the inclination position of the eyeball is detected, an inclination-position detecting device for an eyeball according to the embodiment can be used. The inclination-position detecting device for the eyeball is disposed on a lateral side of the measurement section not to interrupt measurement. Information on the inclination position (line of sight) of the eyeball obtained by the eyeball inclination-position detecting device can be fed back to the controller and can perform measurement in accordance with the inclination-position information.

The line-of-sight detection device 10 can also be used in an educational environment. For example, it is possible to know which test question the user spends time on from the line-of-sight information of the user during the writing test.

Based on such information, the teacher can provide appropriate feedback to the user's test results. The line-of-sight detection device with a simple configuration according to embodiments of the present disclosure can reduce a load on a user. In addition, since the line of sight can be detected in the wearable form, the above-described effects can be obtained with respect to the test paper and the teaching material which are paper media.

The line-of-sight detection device 10 according to the present embodiment may be applied to the user-condition estimation apparatus that estimates the condition of the subject based on one item of information about the degree of inclination of the eyeball 30, the pupil position, the cornea position, or the line-of-sight direction information. As the user-condition estimation device, for example, a fatigue level estimation device that estimates a mental fatigue level of the user is exemplified. The configuration of the present embodiment includes a line-of-sight detection device 10, and a level-of-fatigue estimation unit that estimates the level of mental fatigue based on the user's line-of-sight direction information detected by the line-of-sight detection device 10. For example, a method of estimating the level of mental fatigue of a subject, using a level-of-fatigue estimation unit, is known in the art (see, for example, Tseng, V. W S., Valliappan, N., Ramachandran, V. et al. (2021). Digital biomarker of mental fatigue. npj Digit. Med. 4, 47). According to such a known method, the level of mental fatigue can be estimated by performing a task of tracking the path of an object displayed on a monitor with eyes for several minutes and measuring the motion of the line of sight during such tracking of path. Moreover, the level-of-fatigue estimation apparatus that has the line-of-sight detection device 10 can estimate the level of attention of the subject with a simple configuration. For example, such a level-of-fatigue estimation apparatus according to an embodiment may be provided with a notifying unit configured to provide a notification that prompts a subject to take a break based on the estimated degree of mental fatigue.

In addition, as another user-condition estimation device, for example, an attention level estimation device that estimates an attention level of a user is exemplified. The configuration of the present embodiment includes a line-of-sight detection device 10 and an attention level estimation unit (or a condition estimation unit) that estimates an attention level of a user based on information on a line-of-sight direction detected by the line-of-sight detection device. As a method of estimating the attention level of a subject using an attentional level estimation unit, for example, a method is known in the art in which the micro vibration of the eyeball, which is referred to as microsaccades, is detected to estimate the attention level of the subject based on the frequency of occurrence of such microsaccades. According to Pastukhov. A., & Braun J. (2010). Rare but precious: microsaccades are highly informative about attentional allocation. Vision Res. 2010 Jun. 11, 50 (12). 1173-84, the involuntary eye movement during fixation indicates the micro vibration of the eyeball 30 with the amplitude of about ±3.0 degrees, which occurs when a subject watches or observes a certain object (30), and the microsaccades are known as the fast movement whose amplitude is relatively side among various kinds of involuntary eye movement during fixation. Since the line-of-sight detection device 10 can measure the degree of the inclination of the eyeball at high speed and with high accuracy, the line-of-sight detection device 10 can detect a microsaccade with higher accuracy than a conventional line-of-sight detection device.

Moreover, the attention level estimation apparatus that includes the line-of-sight detection device 10 can estimate the attention level of the subject with a simple configuration.

Further, the attention level estimation device according to the present embodiment can be employed in a driver-assistance system. A configuration of a driver-assistance system according to the present embodiment includes the above-described attention level estimation device and an operation control unit that controls an operation of a mobile object based on the attention level estimated by the attention level estimation device. For example, when the attention level of a subject that is estimated by the user-condition estimation apparatus is lower than a predetermined reference value, the operation control unit controls the operation mode of the mobile object such as a vehicle, so as to switch from the manual drive mode to the automatic drive mode. The driver-assistance system including the line-of-sight detection device 10 can perform driving assistance with a simple configuration.

The attention level estimation device according to the present embodiment can also be used to evaluate publications such as educational materials and instruction manuals. For example, it is possible to evaluate which part of the teaching material the user pays attention to and concentrates on by the attention level estimation device. Based on the result, the content and layout of the teaching material can be improved. The line-of-sight detection device with a simple configuration according to embodiments of the present disclosure can reduce a load on a user. In addition, since the line of sight can be detected in the wearable form, the above-described effects can be obtained with respect to the test paper and the teaching material which are paper media.

In such embodiments of the present disclosure, one item of information about the degree of inclination of the eyeball 30, the pupil position, the cornea position, or the line-of-sight direction information that are detected by the line-of-sight detection device 10 may be used by an estimation unit and the two or more image generators. With such a configuration, a simple and compact line-of-sight detection device is achieved.

For example, the degree of inclination of the eyeball 30, the pupil position, the cornea position, or the line-of-sight direction information that are detected by the line-of-sight detection device 10 may be used as a feedback signal for the image generator of the retinal projection display device, and may also be used to estimate the level of fatigue by the level-of-fatigue estimation unit of the level-of-fatigue estimation apparatus.

In this case, the image generation unit and the fatigue level estimation unit may be provided in the same information processing unit or may be provided separately.

Embodiments of the present disclosure also include a method for detecting the degree of inclination of a three-dimensional object. An embodiment of the present disclosure provides a method of detecting a degree of inclination of an object performed by an inclination detector. The method includes: causing multiple light emitters to emit light; receiving light reflected from the object after being emitted from the multiple light emitters and outputting an electrical signal based on light intensity of the light received, using a photosensor; and outputting a result of detection of a degree of inclination of the object based on the electrical signal, using an output unit. The object remains inclined at substantially the same degree during the emitting of the light from the multiple light emitters and the receiving of the light reflected from the object. With such a method of detecting the degree of inclination of the three-dimensional object, functions similar to those implemented by the above line-of-sight detection device can be implemented.

Embodiments of the present disclosure includes a method of detecting a line of sight. An embodiment of the present disclosure provides a method of detecting a line of sight performed by a line-of-sight detection device. The method includes causing multiple light emitters to emit light; receiving light reflected from the object after being emitted from the multiple light emitters and outputting an electrical signal based on light intensity of the light received, using a photosensor; outputting a result of detection of a degree of inclination of the object based on the electrical signal, using an output unit. The object remains inclined at substantially the same degree during the emitting of the light from the multiple light emitters and the receiving of the light reflected from the object. With such a method of detecting a line-of-sight, functions similar to those implemented by the above line-of-sight detection device (10) can be implemented.

In addition, the numbers such as ordinal numbers and quantities used above are all examples for specifically describing the technology of the present invention, and the present invention is not limited to the exemplified numbers. In addition, the relation of connection between the components are illustrated for specifically describing the technology of the present invention, and the relation of connection for implementing the function of the present disclosure is not limited thereto.

The functions of the embodiments described above can be achieved by one or multiple processing circuits. Herein, the "processing circuit" in the present specification includes a processor programmed to execute each function by software like a processor implemented by an electronic circuit, and a device such as an application specific integrated circuit (ASIC), a digital signal processor (DSP), a field programmable gate array (FPGA), or a conventional circuit module designed to execute each function described above.

Aspects of the present invention are as follows:

In Aspect 1, inclination detector includes: multiple light emitters configured to emit multiple beams to an object; a photosensor having a light-receiving surface; and an output unit. The photosensor is configured to: receive the multiple beams reflected from the object on the light-receiving surface; and output an electrical signal based on light intensity of the multiple beams received on the light-receiving surface. The output unit is configured to output a result of detection of a degree of inclination of the object based on the electrical signal output from the photosensor. The photosensor is disposed at a position at which the light intensity of the multiple beams that is emitted from the multiple light emitters, reflected at the object, and received at the photosensor changes according to the degree of inclination of the object.

According to Aspect 2, in the inclination detector of Aspect 1, a conditional expression below is satisfied:

$$|h - w/2| \le d \le h + w/2$$

where w is a width of the light-receiving surface of the photosensor in a prescribed direction, d is a center-to-center distance between adjacent beams of the multiple beams on the light-receiving surface, and h is a radius of each of the beams on the light-receiving surface.

According to Aspect 3, in the inclination detector of Aspect 1, the multiple light emitters emit multiple laser beams in parallel.

According to Aspect 4, in the inclination detector of Aspect 1 or 2, the multiple light emitters are arranged at equal intervals in a prescribed direction along a light-emitting surface of the multiple light emitters.

According to Aspect 5, in the inclination detector of any one of Aspect 1 to Aspect 4, the multiple light emitters are arranged in each of two different directions along a light-emitting surface of the multiple light emitters.

According to Aspect 6, in the inclination detector of any one of Aspect 1 to Aspect 5, the multiple light emitters are arranged at intervals in prescribed directions along a light-emitting surface of the multiple light emitters, and each of the intervals is shorter than a length of a light-receiving surface of the photosensor in the prescribed directions.

According to Aspect 7, in the inclination detector of any one of Aspect 1 to Aspect 6, the beams reflected from the object diverge toward the photosensor.

According to Aspect 8, a diameter of the beams reflected from the object is longer than a length of the light-receiving surface of the photosensor in a prescribed direction.

According to Aspect 9, the inclination detector of any one of Aspect 1 to Aspect 8, further comprising a controller configured to control the multiple light emitter to emit beams time-modulated by a code having orthogonality. The output unit separately detects the time-modulated beams based on the electrical signal output from the photosensor.

According to Aspect 10, the code is a Hadamard code.

According to Aspect 11, the multiple light emitters are divided into multiple groups. The controller controls the multiple light emitters to emit beams on a group-by-group basis. According to Aspect 12, a line-of sight detection device incudes the inclination detector of any one of Aspect 1 to Aspect 11 configured to detect a line of sight of an eyeball as the object based on the result of detection of the degree of the inclination of the object.

According to Aspect 13, a retina projection display includes the line-of-sight detection device of Aspect 12.

According to Aspect 14, a head-mounted display device includes the line-of-sight detection device of Aspect 12.

According to Aspect 15, an optometric apparatus comprising the line-of-sight detection device of Aspect 12.

According to Aspect 16, a virtual-reality display apparatus includes the line-of-sight detection device of Aspect 12.

According to Aspect 17, a user-condition estimation device includes: the line-of-sight detection device of Aspect 12 configured to detect a line-of-sight direction; and a condition estimation unit configured to estimate a condition of a user based on information on the line-of-sight direction detected by the line-of-sight detection device.

According to Aspect 18, in the user-condition estimation device of Aspect 17, the condition estimation unit estimates the condition of the user based on frequency of occurrence of micro vibration of the eyeball.

According to Aspect 19, in the user-condition estimation device of Aspect 17 or 18, the condition of the user includes at least one of fatigue level or attention level of the user.

According to Aspect 20, a driver-assistance system includes: the user-condition estimation device according to any one of Aspect 17 to Aspect 19; and an operation control unit configured to control an operation of a mobile object driven by a user based on the condition estimated by the user-condition estimation device.

According to Aspect 21, a method of detecting a degree of inclination of an object performed by an inclination detector includes: emitting multiple beams to an object, using multiple light emitters; receiving the multiple beams reflected from the object on a light-receiving surface of a photosensor; and outputting an electrical signal based on light intensity of the multiple beams received on the light-receiving surface; and outputting a result of detection of a degree of inclination of the object based on the electrical signal output from the photosensor. The photosensor is disposed at a position at which the light intensity of the multiple beams that are emitted from the multiple light emitters, reflected at the object, and received at the photosensor changes according to the degree of inclination of the object.

According to Aspect 22, a method of detecting a line-of-sight performed by a line-of-sight detection device includes: emitting multiple beams to an object, using multiple light emitters; receiving the multiple beams reflected from the object on a light-receiving surface of a photosensor; and outputting an electrical signal based on light intensity of the multiple beams received on the light-receiving surface; and outputting a result of detection of a degree of inclination of the object based on the electrical signal output from the photosensor. The photosensor is disposed at a position at which the light intensity of the multiple beams that are emitted from the multiple light emitters, reflected at the object, and received at the photosensor changes according to the degree of inclination of the object.

According to Aspect 23, an inclination detector includes: multiple light emitters configured to emit multiple beams to an object; a photosensor; and an output unit. The photosensor is configured to receive the multiple beams reflected from the object and output an electrical signal based on light intensity of the multiple beams received. The output unit is configured to output a result of detection of a degree of inclination of the object based on the electrical signal output from the photosensor. The object remains inclined at substantially the same degree.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, a personal digital assistant, a Wireless Application Protocol (WAP) or third-generation (3G)-compliant mobile telephone, and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a Transmission Control Protocol/Internet Protocol (TCP/IP) signal carrying computer code over an IP network, such as the Internet. The carrier medium also includes a storage medium for storing processor readable code such as a floppy disk, a hard disk, a compact disc read-only memory (CD-ROM), a magnetic tape device, or a solid state memory device.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

REFERENCE SIGNS LIST 1, 1a VCSEL array (an example of multiple light emitters)
2 Lens
3 Concave mirror
4 Photodiode (an example of a photosensor)
41 Light-receiving surface
411 to 416, 411a to 417a Spot
10 Line-of-sight detection device (an example of a inclination detector)
11 to 16, 11a to 16a VCSEL elements
1A, 11A to 16A Light-emitting surface
30 Eyeball (an example of an object)
31 Cornea
100 Processor
101 CPU
102 ROM
103 RAM
104 SSD
105 Light-source drive circuit
106 I/V conversion circuit
107 A/D conversion circuit
108 Input-output I/F
111 Selection unit
112 Light-source drive unit
113 Switching unit
114 I/V conversion unit
115 A/D conversion unit
116 First accumulation unit
117 Determination unit
118 Estimation unit
119 Output unit
120 Encoder
121 Light-source modulator
122 Inner product calculation unit
123 Second accumulation unit
D Interval
e Overlap region
W Width
Φ Divergence angle
Da Digital voltage data
Dr Drive signal
Ed Line-of-sight direction information
Se Electrical signal
L, L1, L2, L3, L4, L41, L41a, L42 Laser beam
Q Focal position
Rf reference data

The invention claimed is:

1. An inclination detector, comprising:
multiple light emitters to emit multiple beams to an object;
a photosensor having a light-receiving surface to:
receive the multiple beams reflected from the object on the light-receiving surface; and
output an electrical signal based on light intensity of the multiple beams received on the light-receiving surface; and
output circuitry configured to output a result of detection of a degree of inclination of the object based on the electrical signal output from the photosensor,
wherein the photosensor is disposed at a position at which the light intensity of the multiple beams that are emitted from the multiple light emitters, reflected at the object, and received at the photosensor changes according to the degree of the inclination of the object,
wherein a conditional expression below is satisfied:

$$|h - w/2| \le d \le h + w/2$$

where
w is a width of the light-receiving surface of the photosensor in a predetermined direction,
d is a center-to-center distance between adjacent beams of the multiple beams on the light-receiving surface, and
h is a radius of each of the beams on the light-receiving surface.

2. The inclination detector according to claim 1, wherein the multiple light emitters emit multiple beams in parallel.

3. The inclination detector according to claim 1, wherein the multiple light emitters are at equal intervals in a predetermined direction along a light-emitting surface of the multiple light emitters.

4. The inclination detector according to claim 1, wherein the multiple light emitters are disposed in each of two different directions along a light-emitting surface of the multiple light emitters.

5. The inclination detector according to claim 1, wherein:
the multiple light emitters are at intervals in predetermined directions along a light-emitting surface of the multiple light emitters, and
each of the intervals is shorter than a length of a light-receiving surface of the photosensor in the predetermined directions.

6. The inclination detector according to claim 1, wherein the beams reflected from the object diverge toward the photosensor.

7. The inclination detector according to claim 1, wherein a diameter of the beams reflected from the object is longer than a length of the light-receiving surface of the photosensor in a predetermined direction.

8. The inclination detector according to claim 1, further comprising:
control circuitry configured to control the multiple light emitters to emit beams time-modulated by a code having orthogonality,
wherein the output circuitry separately detects the time-modulated beams based on the electrical signal output from the photosensor.

9. The inclination detector according to claim 8, wherein the code is a Hadamard code.

10. The inclination detector according to claim 8, wherein:
the multiple light emitters are divided into multiple groups, and
the control circuitry controls the multiple light emitters to emit beams on a group-by-group basis.

11. A line-of sight detection device comprising:
the inclination detector according to claim 1 configured to detect a line of sight of an eyeball as the object based on the result of detection of the degree of the inclination of the object.

12. A retina projection display comprising the line-of-sight detection device according to claim 11.

13. A head-mounted display device comprising the line-of-sight detection device according to claim 11.

14. A virtual-reality display apparatus comprising the line-of-sight detection device according to claim 11.

15. A user-condition estimation device comprising:
the line-of-sight detection device according to claim 11 configured to detect a line-of-sight direction; and
condition estimation circuitry configured to estimate a condition of a user based on information on the line-of-sight direction detected by the line-of-sight detection device.

16. The user-condition estimation device according to claim 15, wherein:
the condition estimation circuitry estimates the condition of the user based on frequency of occurrence of micro vibration of the eyeball.

17. The user-condition estimation device according to claim 15, wherein:
the condition of the user includes at least one of fatigue level or attention level of the user.

18. A driver-assistance system comprising:
the user-condition estimation device according to claim 15; and
operation control circuitry configured to control an operation of a mobile object driven by a user based on the condition estimated by the user-condition estimation device.

19. A method of detecting a line-of-sight, comprising:
emitting multiple beams to an object, using multiple light emitters;
receiving the multiple beams reflected from the object on a light-receiving surface of a photosensor;
outputting an electrical signal based on light intensity of the multiple beams received on the light-receiving surface; and
outputting a result of detection of a degree of inclination of the object based on the electrical signal output from the photosensor,
wherein the photosensor is disposed at a position at which the light intensity of the multiple beams that are emitted from the multiple light emitters, reflected at the object, and received at the photosensor changes according to the degree of the inclination of the object,
wherein a conditional expression below is satisfied:

$$|h-w/2|\le d\le h+w/2$$

where
w is a width of the light-receiving surface of the photosensor in a predetermined direction,
d is a center-to-center distance between adjacent beams of the multiple beams on the light-receiving surface, and
h is a radius of each of the beams on the light-receiving surface.

20. The method according to claim 19, wherein:
the emitting multiple beams emit the multiple beams in parallel.

21. An inclination detector, comprising:
multiple light emitters to emit multiple beams to an object;
a photosensor having a light-receiving surface to:
receive the multiple beams reflected from the object on the light-receiving surface; and
output an electrical signal based on light intensity of the multiple beams received on the light-receiving surface; and
output circuitry configured to output a result of detection of a degree of inclination of the object based on the electrical signal output from the photosensor,
wherein the photosensor is disposed at a position at which the light intensity of the multiple beams that are emitted from the multiple light emitters, reflected at the object, and received at the photosensor changes according to the degree of the inclination of the object, the inclination detector further comprising:

control circuitry configured to control the multiple light emitters to emit beams time-modulated by a code having orthogonality, wherein the output circuitry separately detects the time-modulated beams based on the electrical signal output from the photosensor.

\* \* \* \* \*